United States Patent
Mun et al.

(10) Patent No.: US 10,027,999 B2
(45) Date of Patent: *Jul. 17, 2018

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Chulkyu Mun, Seoul (KR); Jaehyung Kim, Seoul (KR); Hochul Jung, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/634,532

(22) Filed: Jun. 27, 2017

(65) Prior Publication Data
US 2017/0332111 A1  Nov. 16, 2017

Related U.S. Application Data

(63) Continuation of application No. 15/025,055, filed as application No. PCT/KR2014/008971 on Sep. 25, 2014, now Pat. No. 9,723,341.
(Continued)

(51) Int. Cl.
*H04N 7/16* (2011.01)
*H04N 21/2383* (2011.01)
(Continued)

(52) U.S. Cl.
CPC ....... *H04N 21/2383* (2013.01); *H04B 7/0413* (2013.01); *H04H 20/33* (2013.01);
(Continued)

(58) Field of Classification Search
CPC ............. H04N 21/234; H04N 21/2343; H04N 21/234309; H04N 21/234345; H04N 21/236; H04N 21/23655; H04N 21/2365
See application file for complete search history.

(56) References Cited

U.S. PATENT DOCUMENTS 5,404,172 A * 4/1995 Berman .................. H03K 5/007
                                                    348/461
5,553,222 A * 9/1996 Milne ............... G06F 17/30017
                                                    375/E7.006
(Continued)

FOREIGN PATENT DOCUMENTS

CA     2819221 A1    5/2012
CN   101599946 A   12/2009
(Continued)

OTHER PUBLICATIONS

"Digital Video Broadcasting (DVB); Implementation guidelines for a second generation digital terrestrial television broadcasting system (DVB-T2)", Technical Specification, ETSI TS 102 831, V1.2.1, Aug. 2012, pp. 1-244, XP-14075047.
(Continued)

*Primary Examiner* — Pankaj Kumar
*Assistant Examiner* — Timothy Newlin
(74) *Attorney, Agent, or Firm* — Birch, Stewart, Kolasch & Birch, LLP

(57) ABSTRACT

A method for transmitting broadcast signals by an apparatus for transmitting broadcast signals, the method includes encoding data corresponding to each of data pipes; encoding signaling data; building at least one signal frame including
(Continued)

the encoded data and the encoded signaling data; modulating data of the at least one signal frame by an Orthogonal Frequency Division Multiplex (OFDM) scheme; performing Peak to Average Power Ratio (PAPR) reduction for the modulated data using a tone reservation algorithm based on a Fast Fourier Transform (FFT) size; and transmitting time domain broadcast signals carrying the modulated data of the at least one signal frame, wherein the at least one signal frame comprises signaling symbols and data symbols, wherein a set of carriers in the signaling symbols and a set of carriers in the data symbols are reserved for the PAPR reduction, respectively.

12 Claims, 55 Drawing Sheets

Related U.S. Application Data

(60) Provisional application No. 61/890,851, filed on Oct. 14, 2013, provisional application No. 61/889,045, filed on Oct. 10, 2013, provisional application No. 61/889,046, filed on Oct. 10, 2013, provisional application No. 61/883,906, filed on Sep. 27, 2013.

(51) Int. Cl.
  *H04N 21/2389* (2011.01)
  *H04H 20/33* (2008.01)
  *H04L 27/26* (2006.01)
  *H04B 7/0413* (2017.01)

(52) U.S. Cl.
  CPC ...... *H04L 27/2602* (2013.01); *H04L 27/2618* (2013.01); *H04N 21/2389* (2013.01)

(56) References Cited

U.S. PATENT DOCUMENTS

| | | | | |
|---|---|---|---|---|
| 5,655,144 | A * | 8/1997 | Milne | G06F 17/30017 375/E7.01 |
| 5,937,138 | A * | 8/1999 | Fukuda | G11B 20/00007 348/E5.112 |
| 9,723,341 | B2 * | 8/2017 | Mun | H04N 21/2383 |
| 2004/0244058 | A1 * | 12/2004 | Carlucci | G06F 3/0482 725/135 |
| 2005/0105555 | A1 * | 5/2005 | Oshima | H04L 29/06027 370/469 |
| 2007/0091919 | A1 * | 4/2007 | Sandoval | H04N 21/235 370/466 |
| 2007/0201516 | A1 * | 8/2007 | Lee | H04L 1/0047 370/538 |
| 2007/0211759 | A1 * | 9/2007 | Tada | H04J 3/047 370/474 |
| 2008/0187279 | A1 * | 8/2008 | Gilley | G06Q 30/02 386/250 |
| 2009/0249393 | A1 * | 10/2009 | Shelton | H04N 5/445 725/39 |
| 2009/0313293 | A1 * | 12/2009 | Setlur | G06F 17/2247 |
| 2010/0189424 | A1 * | 7/2010 | Doehla | G11B 27/10 386/241 |
| 2010/0262628 | A1 * | 10/2010 | Singer | H04N 21/21805 707/803 |
| 2011/0231520 | A1 * | 9/2011 | Ha | H04N 21/23439 709/219 |
| 2012/0005303 | A1 * | 1/2012 | Hwang | H04N 21/23614 709/217 |
| 2012/0146827 | A1 * | 6/2012 | Reitmeier | H04N 5/40 341/152 |
| 2012/0147266 | A1 * | 6/2012 | Sridharan | H04N 5/126 348/515 |
| 2012/0147903 | A1 | 6/2012 | Bao et al. | |
| 2012/0317303 | A1 * | 12/2012 | Wang | H04L 65/4076 709/231 |
| 2012/0327879 | A1 * | 12/2012 | Stadelmeier | H04B 7/0689 370/329 |
| 2013/0064314 | A1 | 3/2013 | Ko et al. | |
| 2013/0195205 | A1 * | 8/2013 | Wang | H04N 19/70 375/240.26 |
| 2013/0219431 | A1 | 8/2013 | Hong et al. | |
| 2013/0235952 | A1 | 9/2013 | Ko et al. | |
| 2014/0019593 | A1 * | 1/2014 | Reznik | H04L 65/60 709/219 |
| 2014/0269843 | A1 * | 9/2014 | Schaffner | H04B 1/69 375/139 |

FOREIGN PATENT DOCUMENTS

| | | |
|---|---|---|
| CN | 102783050 A | 11/2012 |
| KR | 10-2011-0095907 A | 8/2011 |
| WO | WO 2011/096767 A2 | 8/2011 |
| WO | WO 2011/096866 A2 | 8/2011 |
| WO | WO 2014/175606 A1 | 10/2014 |

OTHER PUBLICATIONS

Dai et al., "Next Generation Digital Television Terrestrial Broadcasting Systems: Key Technologies and Research Trends," IEEE Communications Magazine, IEEE Service Center, vol. 50, No. 6, Jun. 2012, pp. 150-158, XP-11446111.

* cited by examiner

FIG. 13

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|     FRU_PHY_PROFILE | 3 |
|     FRU_FRAME_LENGTH | 2 |
|     FRU_GI_FRACTION | 3 |
|     RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 14

| Content | Bits |
|---|---|
| FIC_FLAG | 1 |
| AUX_FLAG | 1 |
| NUM_DP | 6 |
| for i = 1:NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1:NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1:NUM_DP | |
|     DP_ID | 6 |
|     DP_START | 15 (or 13) |
|     DP_NUM_BLOCK | 10 |
|     RESERVED | 8 |
| end | |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1:NUM_AUX | |
|     AUX_PRIVATE_DYN | 48 |
| end | |
| CRC 32 | 32 |

FIG. 26

| Reception Mode | Network Configuration |
|---|---|
| Fixed Rooftop (Directional-ant., 10m) | MFN, SFN |
| (Handheld) Portable — Fixed (Omi-ant., ~1.5m) | MFN, SFN |
| (Handheld) Portable — Pedestrian (Omi-ant., ~1.5m) | MFN, SFN |
| (Handheld) Mobile ; (Omi-ant., ~1.5m) | MFN, SFN |

| Reception Mode | | Network configuration | Guard interval | Guard interval (a) | Guard interval (b) |
|---|---|---|---|---|---|
| Fixed Rooftop (Directional-ant., 10m) | | MFN | NG_a1,NG_a2,... | (25us,50us) + L_alpha1 | (30us,60us) + L_beta1 |
| | | SFN | NG_b1,NG_b2,... | (200us,400us) + L_alpha1 | (240us,480us) + L_beta1 |
| (Handheld) Portable | Fixed: (Omni-ant., ~1.5m) | MFN | NG_c1,NG_c2,... | 100us + L_alpha1 | 120us + L_beta1 |
| | | SFN | NG_d1,NG_d2,... | (200us,400us) + L_alpha2 | (240us,480us) + L_beta2 |
| | Pedestrian: (Omni-ant., ~1.5m) | MFN | NG_e1,NG_e2,... | 100us + L_alpha1 | 120us + L_beta1 |
| | | SFN | NG_f1,NG_f2,... | (200us,400us) + L_alpha2 | (240us,480us) + L_beta2 |
| (Handheld) Mobile: (Omni-ant., ~1.5m) | | MFN | NG_g1,NG_g2,... | 100us + L_alpha1 | 120us + L_beta1 |
| | | SFN | NG_h1,NG_h2,... | (200us,400us) + L_alpha2 | (240us,480us) + L_beta2 |

(B)

| Reception Mode | | Network configuration | Vehicle speed | Vehicle speed (a) |
|---|---|---|---|---|
| Fixed Rooftop (Directional-ant., 10m) | | MFN | Quasi static | Quasi static |
| | | SFN | Quasi static | Quasi static |
| (Handheld) Portable | Fixed: (Omni-ant., ~1.5m) | MFN | Quasi static | Quasi static |
| | | SFN | Quasi static | Quasi static |
| | Pedestrian: (Omni-ant., ~1.5m) | MFN | <V_p_a1 km/h | <3km/h + V_alpha1 |
| | | SFN | <V_p_b1 km/h | <3km/h + V_beta1 |
| (Handheld) Mobile: (Omni-ant., ~1.5m) | | MFN | V_m_a1 km/h ~ V_m_a2 km/h | 3km/h +V_alpha1 ~ 200km/h +V_alpha2 |
| | | SFN | V_m_b1 km/h ~ V_m_b2 km/h | 3km/h +V_beta1 ~ 200km/h +V_beta2 |

FIG. 29

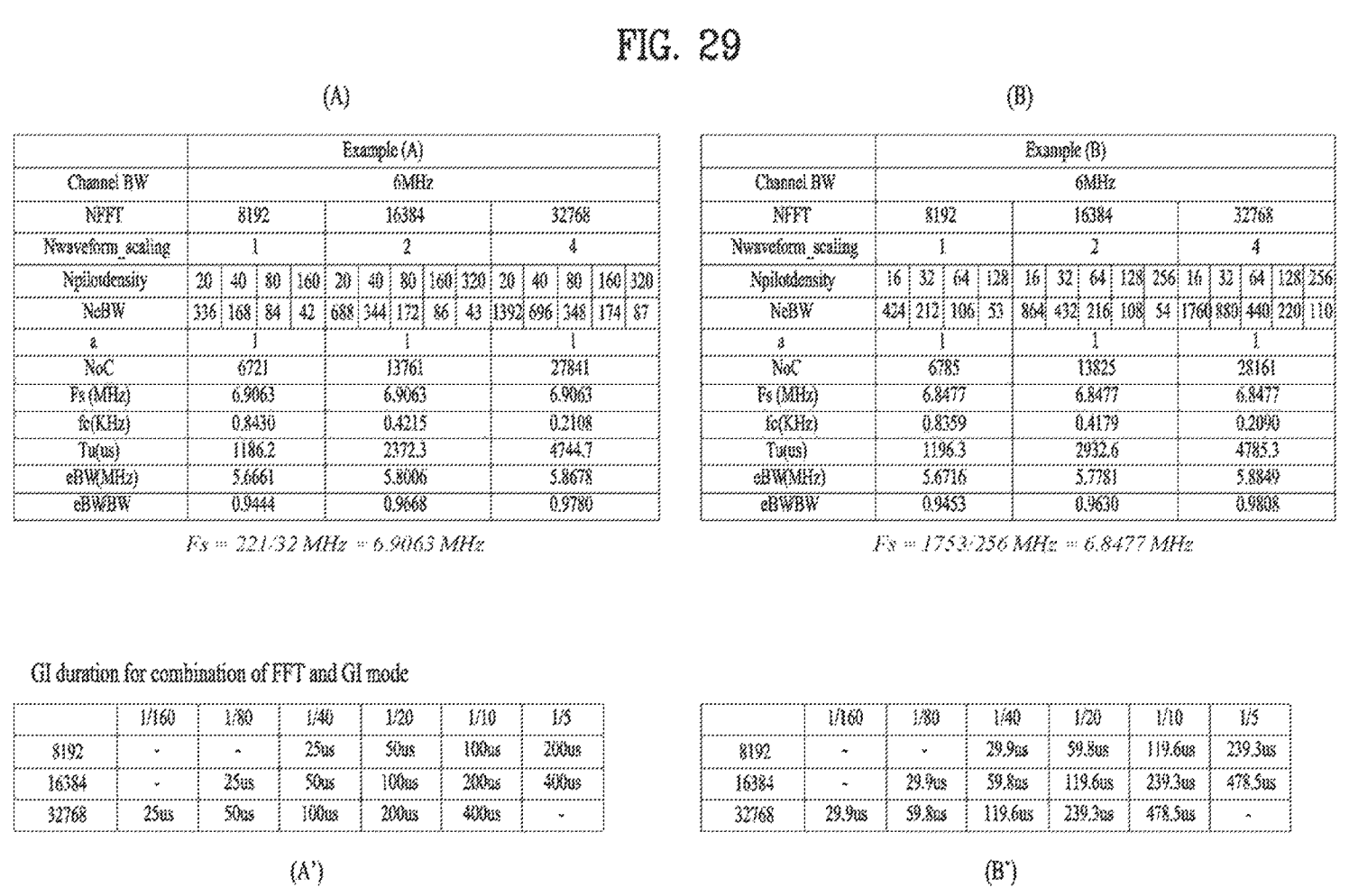

(A) Example (A)

| Channel BW | 6MHz | | | | | | | | | | | | | | |
|---|---|---|---|---|---|---|---|---|---|---|---|---|---|---|---|
| NFFT | 8192 | | | | | 16384 | | | | | | 32768 | | | |
| Nwaveform_scaling | 1 | | | | | 2 | | | | | | 4 | | | |
| Nptsdensity | 20 | 40 | 80 | 160 | 20 | 40 | 80 | 160 | 320 | 20 | 40 | 80 | 160 | 320 |
| NcBW | 336 | 168 | 84 | 42 | 688 | 344 | 172 | 86 | 43 | 1392 | 696 | 348 | 174 | 87 |
| a | 1 | | | | | 1 | | | | | | 1 | | | |
| NoC | 6721 | | | | | 13761 | | | | | | 27841 | | | |
| Fs(MHz) | 6.9063 | | | | | 6.9063 | | | | | | 6.9063 | | | |
| fc(KHz) | 0.8430 | | | | | 0.4215 | | | | | | 0.2108 | | | |
| Tu(us) | 1186.2 | | | | | 2372.3 | | | | | | 4744.7 | | | |
| eBW(MHz) | 5.6661 | | | | | 5.8006 | | | | | | 5.8678 | | | |
| eBWBW | 0.9444 | | | | | 0.9668 | | | | | | 0.9780 | | | |

$F_S = 221/32\ MHz = 6.9063\ MHz$ (B) Example (B)

| Channel BW | 6MHz | | | | | | | | | | | | | | |
|---|---|---|---|---|---|---|---|---|---|---|---|---|---|---|---|
| NFFT | 8192 | | | | | 16384 | | | | | | 32768 | | | |
| Nwaveform_scaling | 1 | | | | | 2 | | | | | | 4 | | | |
| Nptsdensity | 16 | 32 | 64 | 128 | 16 | 32 | 64 | 128 | 256 | 16 | 32 | 64 | 128 | 256 |
| NcBW | 424 | 212 | 106 | 53 | 864 | 432 | 216 | 108 | 54 | 1760 | 880 | 440 | 220 | 110 |
| a | 1 | | | | | 1 | | | | | | 1 | | | |
| NoC | 6785 | | | | | 13825 | | | | | | 28161 | | | |
| Fs(MHz) | 6.8477 | | | | | 6.8477 | | | | | | 6.8477 | | | |
| fc(KHz) | 0.8359 | | | | | 0.4179 | | | | | | 0.2090 | | | |
| Tu(us) | 1196.3 | | | | | 2392.6 | | | | | | 4785.3 | | | |
| eBW(MHz) | 5.6716 | | | | | 5.7781 | | | | | | 5.8849 | | | |
| eBWBW | 0.9453 | | | | | 0.9630 | | | | | | 0.9808 | | | |

$F_S = 1753/256\ MHz = 6.8477\ MHz$

GI duration for combination of FFT and GI mode (A')

| | 1/160 | 1/80 | 1/40 | 1/20 | 1/10 | 1/5 |
|---|---|---|---|---|---|---|
| 8192 | - | - | 25us | 50us | 100us | 200us |
| 16384 | - | 25us | 50us | 100us | 200us | 400us |
| 32768 | 25us | 50us | 100us | 200us | 400us | - |

(B')

| | 1/160 | 1/80 | 1/40 | 1/20 | 1/10 | 1/5 |
|---|---|---|---|---|---|---|
| 8192 | - | - | 29.9us | 59.8us | 119.6us | 239.3us |
| 16384 | - | 29.9us | 59.8us | 119.6us | 239.3us | 478.5us |
| 32768 | 29.9us | 59.8us | 119.6us | 239.2us | 478.5us | - |

Example(A)

(A)

| BW (MHz) | 5 | | | 6 | | | 7 | | | 8 | | |
|---|---|---|---|---|---|---|---|---|---|---|---|---|
| NFFT | 8192 | 16384 | 32768 | 8192 | 16384 | 32768 | 8192 | 16384 | 32768 | 8192 | 16384 | 32768 |
| Fs (MHz) | 5.7552 | 5.7552 | 5.7552 | 6.9063 | 6.9063 | 6.9063 | 8.0573 | 8.0573 | 8.0573 | 9.2083 | 9.2083 | 9.2083 |
| fc (KHz) | 0.7025 | 0.3513 | 0.1756 | 0.8430 | 0.4215 | 0.2108 | 0.9836 | 0.4918 | 0.2459 | 1.1241 | 0.5620 | 0.2810 |
| Tu (us) | 1423.4 | 2846.8 | 5693.6 | 1186.2 | 1186.2 | 4744.7 | 1016.7 | 2033.4 | 4066.9 | 889.6 | 1779.3 | 3558.5 |
| NoC | 6721 | 13761 | 27841 | 6721 | 13761 | 27841 | 6721 | 13761 | 27841 | 6721 | 13761 | 27841 |
| eBW (MHz) | 4.7218 | 4.8338 | 4.8899 | 5.6661 | 5.8006 | 5.8678 | 6.6105 | 6.7674 | 6.8458 | 7.5548 | 7.7341 | 7.8238 |
| eBW/BW | 0.9444 | 0.9668 | 0.9780 | 0.9444 | 0.9668 | 0.9780 | 0.9444 | 0.9668 | 0.9780 | 0.9444 | 0.9668 | 0.9780 |

Example(B-1)

(B-1)

| BW (MHz) | 5 | | | 6 | | | 7 | | | 8 | | |
|---|---|---|---|---|---|---|---|---|---|---|---|---|
| NFFT | 8192 | 16384 | 32768 | 8192 | 16384 | 32768 | 8192 | 16384 | 32768 | 8192 | 16384 | 32768 |
| Fs (MHz) | 5.7064 | 5.7658 | 5.7658 | 6.8477 | 6.8477 | 6.8477 | 7.9889 | 7.9889 | 7.9889 | 9.1302 | 9.1302 | 9.1302 |
| fc (KHz) | 0.7025 | 0.3513 | 0.1756 | 0.8430 | 0.4215 | 0.2108 | 0.9836 | 0.4918 | 0.2459 | 1.1241 | 0.5620 | 0.2786 |
| Tu (us) | 1435.6 | 2841.6 | 5683.2 | 1196.3 | 2392.6 | 4785.3 | 1025.4 | 2050.8 | 4101.7 | 897.2 | 1794.5 | 3589.0 |
| NoC | 6785 | 13825 | 28161 | 6785 | 13825 | 28161 | 6785 | 13825 | 28161 | 6785 | 13825 | 28161 |
| eBW (MHz) | 4.7263 | 4.8652 | 4.9551 | 5.6716 | 5.7781 | 5.8849 | 6.6168 | 6.7411 | 6.8657 | 7.5621 | 7.7042 | 7.8466 |
| eBW/BW | 0.9453 | 0.9730 | 0.9910 | 0.9453 | 0.9630 | 0.9808 | 0.9453 | 0.9630 | 0.9808 | 0.9453 | 0.9630 | 0.9808 |

Example(B-2)

(B-2)

| BW (MHz) | 5 | | | 6 | | | 7 | | | 8 | | |
|---|---|---|---|---|---|---|---|---|---|---|---|---|
| NFFT | 8192 | 16384 | 32768 | 8192 | 16384 | 32768 | 8192 | 16384 | 32768 | 8192 | 16384 | 32768 |
| Fs (MHz) | 5.7031 | 5.7031 | 5.7031 | 6.8438 | 6.8438 | 6.8438 | 7.9844 | 7.9844 | 7.9844 | 9.1250 | 9.1250 | 9.1250 |
| fc (KHz) | 0.6962 | 0.3481 | 0.1740 | 0.8354 | 0.4177 | 0.2089 | 0.9747 | 0.4873 | 0.2437 | 1.1139 | 0.5569 | 0.2785 |
| Tu (us) | 1436.4 | 2872.8 | 5745.6 | 1197.0 | 2394.0 | 4788.0 | 1026.0 | 2052.0 | 4104.0 | 897.8 | 1795.5 | 3591.0 |
| NoC | 6785 | 13825 | 28161 | 6785 | 13825 | 28161 | 6785 | 13825 | 28161 | 6785 | 13825 | 28161 |
| eBW (MHz) | 4.7236 | 4.8124 | 4.9013 | 5.6683 | 5.7748 | 5.8816 | 6.6130 | 6.7373 | 6.8618 | 7.5578 | 7.6998 | 7.8421 |
| eBW/BW | 0.9453 | 0.9730 | 0.9803 | 0.9447 | 0.9625 | 0.9803 | 0.9447 | 0.9625 | 0.9803 | 0.9447 | 0.9625 | 0.9803 |

Example(B-3)

(B-3)

| BW (MHz) | 5 | | | 6 | | | 7 | | | 8 | | |
|---|---|---|---|---|---|---|---|---|---|---|---|---|
| NFFT | 8192 | 16384 | 32768 | 8192 | 16384 | 32768 | 8192 | 16384 | 32768 | 8192 | 16384 | 32768 |
| Fs (MHz) | 5.7031 | 5.7031 | 5.7031 | 6.8438 | 6.8438 | 6.8438 | 7.9844 | 7.9844 | 7.9844 | 9.1250 | 9.1250 | 9.1250 |
| fc (KHz) | 0.6962 | 0.3481 | 0.1740 | 0.8354 | 0.4177 | 0.2089 | 0.9747 | 0.4873 | 0.2437 | 1.1139 | 0.5569 | 0.2785 |
| Tu (us) | 1436.4 | 2872.8 | 5745.6 | 1197.0 | 2394.0 | 4788.0 | 1026.0 | 2052.0 | 4104.0 | 897.8 | 1795.5 | 3591.0 |
| NoC | 6785 | 13825 | 28161 | 6785 | 13825 | 28161 | 6785 | 13825 | 28161 | 6785 | 13825 | 28161 |
| eBW (MHz) | 4.7236 | 4.8124 | 4.9013 | 5.6683 | 5.7748 | 5.8816 | 6.6130 | 6.7373 | 6.8618 | 7.5578 | 7.6998 | 7.8421 |
| eBW/BW | 0.9453 | 0.9730 | 0.9803 | 0.9447 | 0.9625 | 0.9803 | 0.9447 | 0.9625 | 0.9803 | 0.9447 | 0.9625 | 0.9803 |

(C)

| | 5MHz | 6MHz | 7MHz | 8MHz |
|---|---|---|---|---|
| Scaling factor | 5/6 | 1 | 7/6 | 8/6 |
| Fs (A) | 1105/192 | 221/32 | 1547/192 | 221/24 |
| Fs (B - 1) | 8765/1536 | 1753/256 | 12271/1536 | 1753/192 |
| Fs (B - 2) | 365/64 | 219/32 | 511/64 | 73/8 |
| Fs (B - 3) | 365/64 | 219/32 | 511/64 | 73/8 |

FIG. 33

| Reception Mode | | Network configuration | NFFT | Guard interval (a) | Guard interval (b) | Vehicle speed |
|---|---|---|---|---|---|---|
| Fixed Rooftop | | MFN | 16k, 32k | (25us,50us) + Lalpha1 | (30us,60us) + Lbeta1 | Quasi static |
| | | SFN | | (200us,480us) + Lalpha2 | (240us,480us) + Lbeta2 | Quasi static |
| (Handheld) Portable | Fixed | MFN | 8k, 16k, 32k | 100us + Lalpha1 | 120us + Lbeta1 | Quasi static |
| | | SFN | | (200us,480us) + Lalpha2 | (240us,480us) + Lbeta2 | Quasi static |
| | Pedestrian | MFN | | 100us − Lalpha1 | 120us + Lbeta1 | <3km/h − Valpha1 |
| | | SFN | | (200us,480us) + Lalpha2 | (240us,480us) + Lbeta2 | <3km/h + Vbeta1 |
| (Handheld) Mobile (Omni-ant., ~1.5m) | | MFN | 8k, 16k | 10us + Lalpha1 | 120us + Lbeta1 | 3km/h + Valpha1 ~ 200km/h + Valpha2 |
| | | SFN | | (200us,480us) + Lalpha2 | (240us,480us) + Lbeta2 | 3km/h + Vbeta1 ~ 200km/h + Vbeta2 |

FIG. 35

Pilot Pattern

| Density | PP pattern | Dx | Dy (SISO, MIXO-1) | Dy (MIXO-2) |
|---|---|---|---|---|
| 16 | PP5-4 | 5 | – | 16 |
|  | PP10-2 | 10 | 2 | 4 |
| 32 | PP5-8 | 5 | – | 16 |
|  | PP10-4 | 10 | – | 8 |
|  | PP20-2 | 20 | 2 | 4 |
| 64 | PP10-8 | 10 | – | 16 |
|  | PP20-4 | 20 | – | 8 |
|  | PP40-2 | 40 | 2 | 4 |
| 128 | PP20-8 | 20 | – | 16 |
|  | PP40-4 | 40 | – | 8 |
|  | PP80-2 | 80 | 2 | 4 |
| 256 | PP40-8 | 40 | – | 16 |
|  | PP80-4 | 80 | – | 8 |
|  | PP160-2 | 160 | 2 | 4 |

(A)

Pilot pattern configuration for SISO and MIXO-1 (more overhead version)

| PP mode | 30us | 60us | 120us | 240us | 480us |
|---|---|---|---|---|---|
| 8192 | PP40-2 | PP20-4 | PP10-2 | – | – |
|  | PP40-4 | PP20-8 | PP10-4 | PP5-4 | – |
|  | PP40-8 | PP20-8 | PP10-8 | PP5-8 | – |
| 16384 | PP80-2 | PP40-4 | PP20-2 | PP10-2 | – |
|  | PP80-4 | PP40-4 | PP20-4 | PP10-4 | PP5-4 |
| 32768 | PP160-2 | PP80-2 | PP40-2 | PP20-2 | PP10-2 |

(B)

Pilot pattern configuration for MIXO-2 (less mobility version)

| PP mode | 30us | 60us | 120us | 240us | 480us |
|---|---|---|---|---|---|
| 8192 | PP40-4 | PP20-4 | PP10-4 | – | – |
|  | PP40-8 | PP20-8 | PP10-8 | PP5-8 | – |
|  | PP40-16 | PP20-16 | PP10-16 | PP5-16 | – |
| 16384 | PP80-4 | PP40-4 | PP20-4 | PP10-4 | – |
|  | PP80-8 | PP40-8 | PP20-8 | PP10-8 | PP5-8 |
| 32768 | PP160-4 | PP80-4 | PP40-4 | PP20-4 | PP10-4 |

(A) Pilot Pattern - type (B-2)

| Dx | PP mode | Dy (SISO, MIXO-1) | Density |
|---|---|---|---|
| 4 | PP4-2 | 2 | 8 |
| 4 | PP4-4 | 4 | |
| 8 | PP8-2 | 2 | 16 |
| 8 | PP8-4 | 4 | 32 |
| 16 | PP16-2 | 2 | |
| 16 | PP16-4 | 4 | 64 |
| 32 | PP32-2 | 2 | |
| 32 | PP32-4 | 4 | 128 |
| 64 | PP64-2 | 2 | |
| 64 | PP64-4 | 4 | 256 |
| 128 | PP128-2 | 2 | |

(B) Pilot pattern configuration for SISO - base/hand-held profile (more pilot overhead version)

| PP mode | 30us | 60us | 120us | 240us |
|---|---|---|---|---|
| 8192 | PP32-2 | PP16-2 | PP8-2 | PP4-2 |
| | PP32-4 | PP16-4 | PP8-4 | PP4-4 |
| 16384 | PP64-2 | PP32-2 | PP16-2 | PP8-2 |
| | PP64-4 | PP32-4 | PP16-4 | PP8-4 |
| 32768 | PP128-2 | PP64-2 | PP32-2 | PP16-2 |

(C) Pilot pattern configuration for MIMO-advanced profile (more pilot overhead version)

| PP mode | 30us | 60us | 120us | 240us |
|---|---|---|---|---|
| 16384 | PP64-2 | PP32-2 | PP16-2 | PP8-2 |
| | PP64-4 | PP32-4 | PP16-4 | PP8-4 |
| 32768 | PP128-2 | PP64-2 | PP32-2 | PP16-2 |

FIG. 44

(A) Normal data symbol

| | PP4-2 | PP4-4 | PP8-2 | PP8-4 | PP16-2 | PP16-4 | PP32-2 | PP32-4 | PP64-2 | PP64-4 | PP128-2 |
|---|---|---|---|---|---|---|---|---|---|---|---|
| SISO | 1.4475 | 1.5067 | 1.5395 | 1.8056 | 1.8466 | 2.1564 | 2.2046 | 2.5710 | 2.6268 | 3.0594 | 3.1273 |
| MIMO | - | - | 1.2728 | 1.5067 | 1.5395 | 1.8056 | 1.8466 | 2.1564 | 2.2046 | 2.5710 | 2.6268 |

(B) FSS/FES

| | Dx4 | Dx8 | Dx16 | Dx32 | Dx64 | Dx128 |
|---|---|---|---|---|---|---|
| SISO | 1.1045 | 1.3675 | 1.6553 | 1.9850 | 2.3685 | 2.8231 |
| MIMO | - | 1.1045 | 1.3675 | 1.6553 | 1.9850 | 2.3685 |

FIG. 45

Normal data symbol (A)
| | PP4-2 | PP4-4 | PP8-2 | PP8-4 | PP16-2 | PP16-4 | PP32-2 | PP32-4 | PP64-2 | PP64-4 | PP128-2 |
|---|---|---|---|---|---|---|---|---|---|---|---|
| SISO | 1.26 | | 1.52 | | 1.83 | | 2.18 | | 2.60 | | 3.09 |
| MIMO | - | -/1.26 | | 1.52 | | 1.83 | | 2.18 | | 2.60 | |

FSS/FES (B)
| | Dx4 | Dx8 | Dx16 | Dx32 | Dx64 | Dx128 |
|---|---|---|---|---|---|---|
| SISO | 1.10 | 1.37 | 1.66 | 1.99 | 2.37 | 2.82 |
| MIMO | - | 1.10 | 1.37 | 1.66 | 1.99 | 2.37 |

FIG. 46

Normal data symbol (A)
| | PP4-2 | PP4-4 | PP8-2 | PP8-4 | PP16-2 | PP16-4 | PP32-2 | PP32-4 | PP64-2 | PP64-4 | PP128-2 |
|---|---|---|---|---|---|---|---|---|---|---|---|
| SISO | 5/4 | | 6/4 | | 9/5 | | 13/6 | | 18/7 | | 18/6 |
| MIMO | - | -/5/4 | | 6/4 | | 9/5 | | 13/6 | | 18/7 | |

FSS/FES (B)
| | Dx4 | Dx8 | Dx16 | Dx32 | Dx64 | Dx128 |
|---|---|---|---|---|---|---|
| SISO | 10/9 | 4/3 | 5/3 | 6/3 | 7/3 | 14/5 |
| MIXO | - | 10/9 | 4/3 | 5/3 | 6/3 | 7/3 |

FIG. 51

| FFT size | Reserved carrier indices (normal data symbol), TR_normal(n) |
|---|---|
| 8K | 62 85 178 194 202 327 391 538 590 693 780 887 1066 1075 1158 1229 1303 1436 1439 1506 1682 1692 1727 1742 1764 1962 1995 2019 2319 2621 2662 2791 2843 2875 2876 2955 3027 3124 3294 3578 3581 3607 3629 3746 3829 4095 4227 4274 4279 4335 4647 4802 4823 4838 4994 5060 5062 5237 5286 5326 5420 5426 5460 5734 5885 6180 6269 6276 6484 6490 6591 6653 |
| 16K | 13 86 117 120 323 394 604 663 821 1021 1046 1054 1103 1118 1158 1195 1197 1260 1286 1323 1502 1598 1830 1992 1999 2010 2088 2283 2314 2358 2518 2580 3160 3327 3430 3498 3629 3679 3688 3990 3994 4043 4103 4130 4136 4236 4253 4500 4651 4691 4754 4812 4835 5182 5336 5458 5464 5475 5566 5597 5695 5917 6035 6036 6163 6187 6362 6485 6517 6914 6938 7239 7352 7455 7511 7545 7758 7789 7817 7819 7966 8183 8189 8207 8237 8252 8307 8390 8423 8435 8525 8596 8803 8939 8987 8990 8995 9453 9606 9687 9915 10250 10261 10324 10531 10597 10605 10632 10642 10726 10790 10846 10942 10983 11022 11191 11317 11349 11413 11421 11481 11526 11609 11708 11752 11769 12013 12024 12092 12098 12195 12563 12644 13066 13074 13141 13241 13277 13362 13386 13459 13474 13495 13611 |
| 32K | 38 158 425 428 627 729 731 732 751 909 936 964 1001 1074 1233 1279 1340 1487 1502 1535 1550 1599 1828 1864 1892 1960 2055 2196 2372 2452 2505 2580 2488 2628 2757 2805 2864 2872 2904 2923 3020 3206 3544 3559 3614 3655 3656 3982 4170 4475 4483 4486 4540 4564 4718 4775 4914 4930 4999 5062 5148 5245 5264 5605 5805 5828 5871 6062 6151 6163 6335 6380 6388 6420 6795 6833 6852 6974 7190 7319 7571 7574 7599 7682 7700 7990 8040 8044 8062 8099 8155 8239 8371 8379 8399 8451 8661 8708 8823 8872 8938 9007 9095 9372 9381 9405 9605 9638 9676 9922 10261 10413 10504 10587 10601 11062 11118 11422 11511 11539 11763 11832 11941 11995 12005 12018 12121 12271 12473 12510 12791 12825 12850 12980 13096 13418 13471 13475 13508 13513 13520 13521 13524 13533 13556 13559 13562 13563 13564 13571 13614 13766 13925 14009 14238 14387 15033 15196 15323 15382 15407 15534 15647 15726 15734 15833 16217 16430 16494 16510 16689 16715 16757 16797 16848 17229 17254 17259 17332 17385 17458 17668 17724 17784 17814 18075 18188 18202 18245 18262 18388 18420 18477 18701 18776 18882 19017 19097 19099 19113 19469 19530 19570 19707 19804 19830 20084 20108 20157 20200 20277 20371 20429 20437 20438 20761 20778 21022 21041 21081 21232 21508 21533 21668 21840 21887 22097 22218 22312 22334 22375 22389 22487 22488 22636 22802 22963 23259 23326 23363 23534 23544 24025 24052 24278 24322 24401 24429 24564 24696 24780 25071 25135 25138 25147 25228 25427 25435 25447 25589 25694 25737 25946 25991 26006 26175 26340 26521 26572 26577 26738 26770 26786 27013 27292 27475 27386 27609 27687 27689 27693 27743 27844 27849 27868 28029 28031 |

FIG. 52

| FFT size | Reserved carrier indices (FSS and FES), $TR_{FSS,FES}(n)$ |
|---|---|
| 8K | 50 103 122 430 757 897 1473 1539 1671 1771 1925 2022 2069 2217 2239 2247 2313 2358 2377 2379 2381 2543 2906 2969 3010 3114 3118 3147 3419 3593 3602 3674 3822 4095 4253 4287 4297 4406 4483 4538 4597 4643 4782 4817 4841 4889 4958 5139 5213 5230 5285 5486 5493 5529 5610 5994 6021 6175 6237 6299 6309 6347 6434 6439 6537 6635 6722 |
| 16K | 2 4 7 10 15 18 23 26 31 78 82 98 154 197 206 378 490 850 1111 1267 1278 1284 1315 1858 1946 2013 2380 2437 2652 2708 2795 2911 2978 3066 3206 3382 3484 3747 3765 3842 4223 4308 4467 4518 4535 4771 4917 4955 5059 5350 5389 5527 5755 5919 6015 6076 6157 6242 6254 6349 6479 6502 6559 6812 6909 6914 7085 7174 7324 7620 7661 7684 7810 7909 7980 8023 8027 8030 8116 8355 8439 8687 8810 8861 9109 9143 9148 9150 9349 9562 9587 9620 9643 9852 9871 9911 9931 10100 10170 10222 10252 10290 10347 10358 10404 10479 10558 10571 10581 10783 10932 11005 11020 11170 11323 11338 11447 11487 11565 11695 11707 11918 12044 12115 12167 12199 12341 12350 12494 12530 12540 12605 12674 12815 12860 12874 12917 12991 13015 13165 13194 13243 13287 13598 |
| 32K | 6 22 39 73 75 109 147 223 258 292 297 361 462 517 615 679 715 726 764 821 942 1082 1126 1405 1475 1573 1675 1676 1699 1870 2053 2133 2638 2759 2791 2835 2954 2989 3238 3263 3289 3323 3372 3496 3811 4053 4301 4494 4538 4594 4635 4647 4715 4740 4850 4902 4975 4985 5050 5151 5161 5172 5268 5318 5479 5524 5566 5730 5867 5965 6041 6154 6286 6386 6423 6698 6763 6826 6842 6902 6926 6965 6968 6997 7027 7294 7801 7859 7898 7940 7994 8030 8127 8383 8422 8523 8614 8647 8748 8886 8888 8931 9085 9372 9373 9462 9608 9826 9839 9941 9961 10022 10099 10248 10334 10623 10694 10698 10893 10918 10920 10971 10973 10996 11165 11212 11222 11371 11684 11898 11925 11986 12239 12267 12361 12410 12647 12771 12916 12958 13010 13092 13174 13190 13229 13303 13435 13500 13645 13679 13954 13961 14206 14379 14590 14654 14685 14746 14781 14914 15102 15103 15129 15177 15513 15630 15749 15880 15923 16039 16051 16094 16114 16276 16286 16536 16559 16724 16725 16920 17076 17298 17305 17405 17467 17532 17583 17811 17894 18082 18124 18316 18375 18388 18404 18559 18687 18717 18834 18868 19032 19036 19098 19214 19287 19468 19475 19487 19515 19711 19978 20073 20083 20140 20296 20335 20672 20375 20391 20520 20990 21027 21403 21736 21753 21863 21911 22082 22089 22103 22121 22227 22318 22962 23023 23051 23060 23117 23140 23197 23218 23356 23367 23590 23622 23928 24162 24319 24375 24696 24742 24797 24830 25082 25159 25349 25372 25466 25484 25612 25673 25757 25773 25893 26202 26341 26375 26437 26514 26533 26599 26659 26838 27054 27144 27197 27288 27298 27427 27546 27580 27666 27688 27791 27811 27869 27901 27945 |

FIG. 53

| FFT size | Reserved carried indices (normal data symbol), TR_normal(n) |
|---|---|
| 8K | 91 100 139 250 305 306 313 377 437 586 595 851 867 891 978 1020 1125 1271 1281 1454 1614 1636 1708 1782 1802 1836 1878 1917 1961 2065 2101 2485 2647 2677 2685 2699 2818 2922 3012 3294 3547 3591 3700 3806 4034 4084 4097 4113 4196 4211 4290 4407 4563 4666 4834 4892 4953 5245 5370 5431 5469 5534 5596 5647 5886 5898 5922 6030 6153 6382 6639 6667 |
| 16K | 222 228 321 348 381 388 419 457 492 504 675 890 1041 1092 1196 1204 1253 1319 1395 1434 1540 1699 1704 1803 1912 1958 1962 2041 2120 2296 2348 2362 2373 2410 2605 2767 2872 2975 3138 3276 3327 3442 3450 3703 3845 4053 4260 4264 4390 4477 4537 4555 4580 4674 4771 4772 4854 4882 4897 5212 5223 5592 5629 5801 5859 5875 5930 6148 6183 6315 6366 6336 6617 6631 6636 6840 6860 7019 7205 7239 7333 7542 7585 7617 7717 7791 7972 8422 8457 8467 8539 8617 8667 8683 8685 8727 8916 8979 9076 9148 9163 9226 9265 9353 9385 9505 9553 9899 9909 10042 10094 10178 10289 10395 10396 10631 10650 11358 11685 11720 11772 11777 11820 11826 11833 11983 11989 12011 12021 12066 12082 12239 12257 12354 12356 12376 12497 12511 12619 12715 12822 12824 13069 13126 |
| 32K | 12 17 23 67 151 218 260 264 284 331 363 428 525 553 564 599 613 694 713 940 999 1066 1116 1122 1233 1287 1441 1443 1500 1524 1677 2047 2210 2231 2244 2256 2446 2541 2557 2724 2983 3395 3484 3746 3985 3994 4109 4205 4217 4249 4386 4406 4408 4414 4444 4461 4615 4684 4714 4785 4788 4957 5033 5258 5325 5550 5583 5675 5860 5903 5917 6096 6162 6385 6602 6903 6957 6985 7106 7167 7327 7333 7513 7559 7642 8052 8164 8394 8427 8540 8594 8907 9076 9213 9345 9411 9429 9713 9784 9918 10199 10231 10395 10431 10488 10606 10631 10850 10894 10997 11009 11074 11075 11127 11171 11234 11239 11247 11267 11577 11669 11718 11856 11919 12007 12142 12262 12388 12686 12843 13175 13227 13330 13391 13422 13540 13592 13710 13716 13950 13975 14079 14098 14141 14160 14718 14897 14933 15028 15178 15213 15310 15375 15386 15592 15770 15837 15981 16149 16305 16372 16386 16409 16437 16541 16547 16579 16584 16588 16605 16794 16818 16886 17006 17103 17121 17257 17321 17645 17738 17851 17924 17941 17982 18077 18128 18311 18374 18403 18458 18490 18530 18671 18866 18930 18945 19010 19179 19441 19480 19571 19753 19842 19888 19986 20040 20275 20284 20522 20636 20749 20751 20771 20858 20885 20953 21082 21049 21157 21214 21228 21322 21357 21532 21592 21668 21835 22093 22314 22460 22539 22634 22663 22785 22793 22845 23079 23272 23359 23441 23460 23500 23521 23551 23733 23792 23803 23923 24197 24316 24408 24493 24532 24549 24657 24754 24788 24843 25025 25201 25234 25294 25381 25411 25487 25579 25679 25708 25740 25742 26033 26200 26352 26478 26561 26576 26678 26846 26907 26948 27017 27271 27319 27461 27497 27553 27664 27853 |

FIG. 54

| FFT size | Reserved carrier indices (FSS and FES), TR$_{FSS,FES}$ (n) |
|---|---|
| 8K | 30 103 122 430 757 897 1473 1539 1671 1771 1925 2022 2059 2217 2239 2247 2313 2358 2377 2379 2381 2545 2906 2969 3010 3114 3115 3147 3419 3593 3602 3674 3822 4095 4253 4287 4297 4406 4483 4538 4597 4643 4782 4817 4841 4889 4958 5139 5213 5230 5285 5486 5493 5529 5610 5994 6021 6175 6237 6299 6309 6347 6434 6459 6537 6635 6722 |
| 16K | 35 90 123 238 343 390 399 427 577 652 661 711 767 811 870 939 942 1389 1427 1627 1708 1724 1734 1844 1863 1933 2127 2185 2409 2505 2651 2729 2836 2891 2996 3165 3227 3423 3497 3583 3617 3638 3661 3691 3773 3828 3874 3950 3953 4057 4195 4274 4299 4366 4369 4561 4677 4690 4918 4925 4979 4985 5455 5500 5515 5548 5549 6036 6034 6066 6089 6164 6191 6251 6321 6355 6386 6412 6567 6726 6794 6823 7058 7194 7210 7348 7557 7564 7709 7825 8045 8348 8441 8443 8489 8654 8701 8834 8865 8898 9007 9086 9188 9346 9465 9501 10254 10407 10423 10497 10551 10595 10676 10767 10796 10811 10886 10923 11036 11101 11116 11129 11183 11274 11444 11550 11942 11962 11997 12164 12172 12324 12337 12443 12662 12667 12787 12852 13037 13141 13287 13325 13353 13566 |
| 32K | 2 15 67 261 444 474 558 569 654 660 663 680 792 805 963 1150 1158 1175 1176 1384 1406 1518 1739 2001 2033 2060 2062 2207 2215 2230 2292 2405 2501 2635 2664 2685 2818 2836 3103 3341 3383 3399 3540 3601 3609 3757 3994 4264 4267 4443 4467 4775 4849 5108 5157 5260 5307 5314 5358 5437 5538 5817 5869 6031 6042 6141 6150 6166 6170 6337 6410 6427 6459 6493 6621 6765 6767 6871 6971 7002 7185 7551 7567 7579 7637 7652 7779 8010 8111 8161 8175 8215 8230 8333 8357 8434 8571 8590 8600 8796 8980 9044 9237 9301 9315 9433 9566 9601 9606 9688 9693 9731 9807 9985 10466 10499 10506 10696 10698 10796 10986 11129 11143 11302 11362 11385 11396 11499 11610 11686 11719 11796 11894 12024 12403 12646 12691 12802 12986 13007 13069 13084 13092 13103 13276 13288 13314 13522 13587 13978 14002 14079 14100 14119 14175 14225 14390 14452 14481 14586 14707 14714 15519 15661 15678 15733 15832 15882 15893 15943 15987 16001 16146 16175 16291 16344 16374 16421 16445 16476 16505 16674 16830 17219 17241 17346 17443 17487 17548 17565 17627 17669 17882 17891 18090 18393 18508 18642 18954 19098 19164 19186 19388 19542 19836 19916 19961 20035 20225 20269 20593 20621 20695 21003 21057 21182 21245 21246 21257 21262 21301 21330 21417 21715 21780 21788 21866 22040 22173 22188 22332 22525 22986 23364 23399 23647 23659 23693 23828 23860 23933 23997 24070 24092 24370 24509 24611 24671 24785 24830 25013 25154 25179 25180 25368 25545 25602 25779 25781 25912 25954 25988 26002 26029 26030 26039 26151 26153 26174 26197 26409 26513 26616 26987 27009 27193 27252 27416 27441 27500 27703 27720 27752 27852 27864 28031 28038 28117 |

FIG. 55

| FFT size | Reserved carrier indices (FSS and FES), TRss,res (n) |
|---|---|
| 16K | 13 86 117 120 323 394 604 663 821 1021 1046 1054 1103 1118 1158 1195 1197 1260 1286 1323 1502 1598 1830 1992 1999 2010 2088 2283 2314 2358 2518 2580 3160 3327 3430 3498 3629 3679 3688 3990 3994 4043 4103 4130 4136 4236 4253 4500 4651 4691 4754 4812 4835 5182 5336 5458 5464 5475 5566 5597 5695 5917 6035 6036 6163 6187 6362 6485 6517 6914 6938 7239 7352 7435 7511 7545 7758 7789 7817 7819 7966 8183 8189 8207 8237 8252 8307 8390 8423 8435 8525 8596 8803 8939 8987 8990 8995 9453 9606 9687 9915 10250 10261 10324 10531 10597 10605 10632 10642 10726 10790 10846 10942 10983 11022 11191 11317 11349 11413 11421 11481 11526 11609 11708 11752 11769 12013 12034 12092 12098 12195 12563 12644 13066 13074 13141 13241 13277 13362 13386 13459 13474 13495 13611 |
| 32K | 38 158 425 428 627 729 731 732 751 909 936 964 1001 1074 1233 1279 1340 1487 1502 1535 1550 1599 1828 1864 1892 1960 2055 2196 2372 2452 2505 2580 2588 2628 2757 2805 2864 2872 2904 2923 3020 3206 3544 3559 3614 3653 3656 3982 4170 4475 4483 4486 4540 4564 4718 4773 4914 4930 4999 5062 5148 5245 5264 5605 5805 5828 5871 6062 6151 6163 6335 6380 6388 6420 6795 6833 6852 6974 7190 7319 7571 7574 7599 7682 7700 7990 8040 8044 8062 8099 8155 8239 8371 8379 8399 8451 8661 8708 8823 8872 8938 9007 9095 9372 9381 9405 9414 9605 9638 9676 9922 10261 10413 10504 10587 10601 11062 11118 11422 11511 11539 11763 11832 11941 11995 12005 12018 12121 12271 12473 12510 12791 12825 12850 12980 13096 13418 13471 13475 13508 13513 13520 13521 13524 13533 13556 13559 13562 13563 13564 13571 13614 13766 13925 14009 14238 14387 15033 15196 15323 15382 15407 15534 15647 15726 15734 15833 16217 16430 16494 16510 16689 16715 16757 16797 16848 17229 17254 17259 17332 17385 17458 17668 17724 17784 17814 18075 18188 18202 18245 18262 18388 18420 18477 18701 18776 18882 19017 19097 19099 19113 19469 19530 19570 19707 19804 19830 20064 20108 20157 20200 20277 20371 20429 20437 20438 20761 20778 21022 21041 21081 21232 21508 21533 21668 21840 21887 22097 22218 22312 22334 22375 22389 22487 22488 22636 22802 22963 23259 23326 23363 23534 23544 24025 24052 24278 24322 24401 24429 24564 24696 24780 25071 25135 25138 25147 25228 25427 25435 25447 25589 25694 25737 25946 25991 26006 26175 26340 26521 26572 26577 26738 26770 26786 27013 27292 27475 27586 27609 27687 27689 27693 27743 27844 27849 27868 28029 28031 |

FIG. 56

| FFT size | Reserved carrier indices (FSS and FES), $TR_{FSS,FES}(n)$ |
|---|---|
| 16K | 2 4 7 10 13 18 23 26 31 78 82 98 154 197 206 378 490 850 1111 1267 1278 1284 1315 1858 1946 2013 2380 2437 2652 2708 2795 2911 2978 3066 3206 3382 3484 3747 3765 3842 4223 4308 4467 4518 4535 4771 4955 5059 5350 5389 5527 5755 5919 6015 6076 6157 6242 6254 6349 6479 6502 6559 6812 6909 6914 7085 7174 7324 7620 7661 7684 7810 7909 7980 8023 8027 8030 8116 8355 8439 8687 8810 8861 9109 9143 9148 9150 9349 9562 9587 9620 9643 9852 9871 9911 9931 10100 10170 10222 10252 10290 10347 10358 10404 10479 10558 10571 10581 10783 10932 11005 11020 11170 11323 11338 11447 11487 11565 11693 11707 11918 12044 12115 12167 12199 12241 12350 12494 12530 12540 12605 12674 12815 12869 12874 12917 12991 13015 13165 13194 13243 13287 13598 |
| 32K | 6 22 39 73 75 109 147 223 258 292 297 361 462 517 615 679 715 726 764 821 942 1082 1126 1405 1475 1573 1675 1676 1699 1870 2053 2133 2638 2759 2791 2835 2954 2989 3238 3263 3289 3323 3372 3496 3811 4053 4301 4494 4538 4594 4635 4647 4715 4740 4850 4902 4975 4985 5050 5151 5161 5172 5268 5318 5479 5524 5566 5730 5867 5965 6041 6154 6286 6386 6423 6698 6763 6826 6842 6902 6926 6965 6968 6997 7027 7294 7801 7859 7898 7940 7994 8030 8127 8383 8422 8523 8614 8647 8748 8886 8888 8931 9085 9372 9373 9462 9605 9826 9839 9941 9961 10022 10099 10248 10334 10623 10694 10698 10893 10918 10920 10971 10973 10996 11165 11212 11222 11371 11684 11898 11925 11986 12239 12267 12361 12410 12647 12771 12916 12958 13010 13092 13174 13190 13229 13303 13435 13500 13645 13679 13954 13961 14206 14379 14590 14634 14685 14746 14781 14914 15102 15103 15129 15177 15313 15630 15749 15880 15923 16039 16051 16094 16114 16276 16286 16536 16559 16724 16725 16920 17076 17298 17305 17405 17467 17532 17583 17811 17894 18082 18124 18316 18375 18388 18404 18559 18687 18717 18834 18868 19032 19036 19098 19214 19287 19468 19475 19487 19815 19711 19978 20073 20083 20140 20296 20335 20372 20375 20391 20520 20990 21027 21403 21736 21753 21863 21911 22082 22089 22103 22121 22227 22318 22962 23023 23051 23060 23117 23140 23197 23281 23356 23367 23590 23622 23928 24162 24319 24375 24696 24742 24797 24830 25082 25159 25349 25372 25466 25484 25612 25673 25757 25773 25893 26202 26341 26375 26437 26514 26533 26599 26659 26838 27054 27144 27197 27288 27298 27427 27546 27580 27666 27688 27791 27811 27869 27901 27945 |

FIG. 57

| FFT size | Reserved carrier indices (FSS and FES), TR_{FSS,FES} (u) |
|---|---|
| 8K | 50 103 106 122 283 430 591 757 871 897 966 1473 1539 1671 1771 1925 2022 2059 2217 2239 2247 2313 2358 2377 2379 2381 2543 2906 2969 3010 3114 3118 3147 3419 3593 3602 3674 3822 4095 4253 4287 4297 4406 4483 4538 4597 4643 4782 4817 4841 4889 4958 5139 5213 5230 5285 5486 5493 5529 5610 5994 6021 6175 6237 6299 6309 6347 6434 6459 6537 6635 6722 |
| 16K | 2 4 7 10 15 18 23 26 31 78 82 98 154 197 206 378 490 850 1111 1267 1278 1284 1315 1858 1946 2013 2380 2437 2652 2708 2795 2911 2978 3066 3206 3382 3484 3747 3765 3842 4223 4308 4467 4518 4535 4771 4917 4955 5059 5350 5389 5527 5755 5919 6015 6076 6157 6242 6254 6349 6479 6502 6559 6812 6909 6914 7085 7174 7324 7620 7661 7684 7810 7909 7980 8023 8027 8030 8116 8355 8439 8687 8810 8861 9109 9143 9148 9150 9349 9562 9587 9620 9643 9852 9871 9911 9931 10100 10170 10222 10232 10290 10347 10358 10404 10479 10558 10571 10581 10783 10932 11005 11020 11170 11323 11338 11447 11487 11565 11695 11707 11918 12044 12115 12167 12199 12341 12350 12494 12530 12540 12605 12674 12815 12860 12874 12917 12991 13015 13165 13194 13243 13287 13598 |
| 32K | 6 22 39 73 75 109 147 223 258 292 297 361 462 517 615 679 715 726 764 821 942 1082 1126 1405 1475 1573 1675 1676 1699 1870 2053 2133 2638 2759 2791 2835 2954 2989 3238 3263 3289 3323 3372 3496 3811 4053 4301 4494 4538 4594 4635 4647 4713 4740 4850 4902 4975 4985 5050 5151 5161 5172 5268 5318 5479 5524 5566 5730 5867 5965 6041 6154 6286 6386 6423 6698 6763 6826 6842 6902 6926 6965 6968 6997 7027 7294 7801 7859 7898 7940 7994 8030 8127 8383 8422 8523 8614 8647 8748 8886 8888 8931 9085 9372 9373 9462 9605 9826 9839 9941 9961 10022 10099 10248 10334 10623 10694 10698 10893 10918 10920 10971 10973 10996 11165 11212 11222 11371 11684 11898 11925 11986 12239 12267 12361 12410 12647 12771 12916 12958 13010 13092 13174 13190 13229 13303 13435 13500 13645 13679 13954 13961 14206 14379 14590 14654 14685 14746 14781 14914 14915 15102 15103 15129 15177 15513 15630 15749 15880 15923 16039 16051 16094 16114 16276 16286 16536 16559 16724 16725 16920 17076 17298 17305 17405 17467 17532 17583 17811 17894 18082 18124 18316 18375 18388 18404 18559 18687 18717 18834 18868 19032 19036 19098 19214 19287 19468 19475 19487 19515 19711 19978 20073 20083 20140 20296 20335 20372 20375 20391 20520 20990 21027 21403 21736 21753 21863 21911 22082 22089 22103 22121 22227 22318 22962 23023 23051 23060 23117 23140 23197 23218 23356 23367 23590 23622 23928 24162 24319 24375 24696 24742 24797 24830 25082 25159 25349 25372 25466 25484 25612 25673 25757 25773 25893 26202 26341 26375 26437 26514 26533 26599 26659 26838 27054 27144 27197 27288 27298 27427 27546 27580 27666 27688 27791 27811 27869 27901 27945 |

FIG. 58

| FFT size | Reserved carrier indices (FSS and FES), $TR_{FSS,FES}(n)$ |
|---|---|
| 8K | 50 103 106 122 283 430 591 757 871 897 966 1473 1539 1671 1771 1925 2022 2059 2217 2239 2247 2313 2358 2377 2379 2381 2543 2906 2969 3010 3114 3118 3147 3419 3593 3602 3674 3822 4095 4253 4287 4297 4406 4483 4538 4597 4643 4782 4817 4841 4889 4958 5139 5213 5230 5285 5486 5493 5529 5610 5994 6021 6175 6237 6299 6309 6347 6434 6459 6537 6635 6722 |
| 16K | 35 90 123 238 343 390 399 427 577 652 661 711 767 811 870 939 942 1389 1427 1627 1708 1724 1734 1844 1863 1933 2127 2185 2409 2505 2651 2729 2836 2891 2996 3165 3227 3423 3497 3583 3617 3638 3661 3691 3773 3828 3874 3950 3953 4057 4195 4274 4299 4366 4360 4561 4677 4690 4918 4925 4979 4985 5455 5500 5515 5548 5549 6036 6054 6066 6089 6164 6191 6251 6321 6353 6386 6412 6567 6726 6794 6823 7058 7194 7210 7348 7557 7564 7709 7825 8045 8348 8441 8443 8489 8654 8701 8834 8863 8898 9007 9086 9188 9346 9465 9501 10254 10407 10423 10497 10551 10595 10676 10767 10796 10811 10886 10923 11036 11101 11116 11129 11183 11274 11444 11550 11942 11962 11997 12164 12172 12324 12337 12445 12662 12667 12787 12852 13037 13141 13287 13325 13353 13566 |
| 32K | 2 15 67 261 444 474 558 569 654 660 663 680 792 805 963 1150 1158 1175 1176 1384 1406 1518 1739 2001 2033 2060 2062 2207 2215 2230 2292 2405 2501 2635 2664 2685 2818 2836 3103 3341 3383 3399 3540 3601 3609 3757 3994 4254 4267 4443 4467 4775 4849 5108 5157 5260 5307 5314 5358 5437 5538 5817 5869 6031 6042 6141 6150 6166 6170 6337 6410 6427 6459 6493 6621 6763 6767 6871 6971 7002 7185 7551 7567 7579 7637 7652 7779 8010 8111 8161 8173 8215 8230 8333 8357 8434 8571 8590 8600 8796 8980 9044 9237 9301 9315 9433 9566 9601 9606 9688 9693 9731 9807 9985 10466 10499 10506 10696 10698 10796 10986 11129 11143 11302 11362 11385 11396 11499 11610 11686 11719 11796 11894 12024 12403 12646 12691 12802 12986 13007 13069 13084 13092 13103 13276 13288 13314 13522 13587 13978 14002 14079 14100 14119 14175 14225 14390 14452 14481 14586 14707 14714 15519 15661 15678 15733 15832 15882 15893 15943 15987 16001 16146 16175 16291 16344 16374 16421 16445 16476 16505 16674 16830 17219 17241 17346 17443 17487 17548 17565 17627 17669 17882 17891 18090 18393 18508 18642 18954 19098 19164 19186 19388 19542 19836 19916 19961 20035 20225 20269 20593 20621 20995 21003 21057 21182 21245 21246 21257 21262 21301 21330 21417 21715 21780 21788 21866 22040 22173 22188 22332 22525 22986 23364 23599 23647 23659 23693 23828 23860 23933 23997 24070 24092 24370 24509 24611 24671 24785 24830 25013 25154 25179 25180 25368 25345 25602 25779 25781 25912 25954 25988 26002 26029 26030 26039 26151 26153 26174 26197 26409 26513 26616 26987 27009 27183 27252 27416 27441 27500 27703 27720 27752 27852 27864 28031 28038 28117 |

APPARATUS FOR TRANSMITTING
BROADCAST SIGNALS, APPARATUS FOR
RECEIVING BROADCAST SIGNALS,
METHOD FOR TRANSMITTING
BROADCAST SIGNALS AND METHOD FOR
RECEIVING BROADCAST SIGNALS

CROSS-REFERENCE TO RELATED
APPLICATIONS

This Application is a Continuation of U.S. patent application Ser. No. 15/025,055 filed on Mar. 25, 2016 (now U.S. Pat. No. 9,723,341 issued on Aug. 1, 2017), which is the National Phase of PCT International Application No. PCT/KR2014/008971 filed on Sep. 25, 2014, which claims the benefit under 35 U.S.C. § 119(e) to U.S. Provisional Application Nos. 61/890,851 filed on Oct. 14, 2013, 61/889,045 filed on Oct. 10, 2013, 61/889,046 filed on Oct. 10, 2013 and 61/883,906 filed on Sep. 27, 2013, all of which are hereby expressly incorporated by reference into the present application.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data.

Still another object of the present invention is to provide an apparatus for transmitting broadcast signals, an apparatus for receiving broadcast signals and methods for transmitting and receiving broadcast signals to signal signaling information necessary to provide broadcast signals.

To achieve the object and other advantages and in accordance with the purpose of the invention, as embodied and broadly described herein, the present invention provides a method of transmitting broadcast signals. The method of transmitting broadcast signals includes encoding data corresponding to each of data transmission channel which carries at least one service data or service component data, building at least one signal frame including the encoded data, modulating the at least one signal frame by an OFDM (Orthogonal Frequency Division Multiplex) scheme; and transmitting the broadcast signals carrying the at least one modulated signal frame.

Preferably, wherein the at least one signal frame includes a plurality of OFDM symbols, wherein the at least one signal frame comprises a preamble, a FSS (Frame Signaling Symbol), a Normal data symbol, and a FES (Frame Edge Symbol).

Preferably, wherein the preamble includes a pilot mode information and a PAPR_FLAG, wherein the pilot mode information indicates whether the pilot mode is a mobile mode or a fixed mode and the PAPR_FLAG indicates whether a PAPR reduction is used for the at least one signal frame.

Preferably, wherein modulating the at least one signal frame by the OFDM scheme comprises inserting at least one pilot based on at least one pilot pattern in the at least one signal frame, wherein amplitudes of the at least one pilot depend on the at least one pilot pattern, a type of an OFDM symbol, and a type of a transmission mode, wherein the transmission mode is one of a SISO or a MIMO, wherein the at least one pilot pattern depends on the pilot mode information.

Preferably, wherein modulating the at least one signal frame by the OFDM scheme comprises inserting at least one pilot based on at least one pilot pattern and at least one reserved carrier for a PAPR reduction based on a FFT (Fast Fourier Transform) size in the at least one signal frame when the PAPR_FLAG in the preamble is set to '1', performing the PAPR reduction based on a Tone reservation algorithm in a time domain, wherein the at least one reserved carrier keeps the same position for each FFT size, wherein the at least one reserved carrier keeps the same position across the FSS(s) and the FES, wherein the at least one reserved carrier keeps the different position across the FSS(s) and the normal data symbol.

In other aspect, the present invention provides a method of receiving broadcast signals. The method of receiving broadcast signals includes receiving the broadcast signals including at least one signal frame, demodulating the received broadcast signals by an OFDM (Orthogonal Frequency Division Multiplex) scheme, parsing at least one signal frame from the demodulated broadcast signals including data, wherein the data is output corresponding to each of a plurality of data transmission channel, wherein each of the data transmission channel carries at least one service data or service component data, and decoding the data.

Preferably, wherein the at least one signal frame includes a plurality of OFDM symbols, wherein the at least one signal frame comprises a preamble, a FSS (Frame Signaling Symbol), a Normal data symbol, and a FES (Frame Edge Symbol).

Preferably, wherein the preamble includes a pilot mode information and a PAPR_FLAG, wherein the pilot mode information indicates whether the pilot mode is a mobile mode or a fixed mode and the PAPR_FLAG indicates whether a PAPR reduction is used for the at least one signal frame.

Preferably, wherein parsing the at least one signal frame comprises extracting the data based on at least one pilot from the at least one signal frame, wherein the demodulated broadcast signals comprises the at least one pilot based on at least one pilot pattern in the at least one signal frame, wherein amplitudes of the at least one pilot depend on the at least one pilot pattern, a type of an OFDM symbol, and a type of a transmission mode, wherein the transmission mode is one of a SISO or a MIMO, wherein the at least one pilot pattern depends on the pilot mode information.

Preferably, wherein parsing the at least one signal frame comprises extracting the data based on the at least one pilot and at least one reserved carrier from the at least one signal frame when a PAPR_FLAG in a preamble is set to '1', wherein the demodulated broadcast signals comprise the at least one pilot based on at least one pilot pattern and the at least one reserved carrier for a PAPR reduction based on FFT (Fast Fourier Transform) size in the at least one signal frame, wherein the at least one reserved carrier keeps the same position for each FFT size, wherein the at least one reserved carriers keeps the same position across the FSS(s) and the FES, wherein the at least one reserved carrier keeps the different position across the FSS(s) and the normal data symbol.

In another aspect, the present invention provides an apparatus for transmitting broadcast signals. The apparatus for transmitting broadcast signals includes an encoder for encoding data corresponding to each of the data transmission channel which carries at least one service data or service component data, a frame builder for building at least one signal frame including the encoded data, a modulator for modulating the at least one signal frame by an OFDM (Orthogonal Frequency Division Multiplex) scheme, and a transmitter for transmitting the broadcast signals carrying the at least one modulated signal frame.

Preferably, wherein the at least one signal frame includes a plurality of OFDM symbols, wherein the at least one signal frame comprises a preamble, a FSS (Frame Signaling Symbol), a Normal data symbol, and a FES (Frame Edge Symbol).

Preferably, wherein the preamble includes a pilot mode information and a PAPR_FLAG, wherein the pilot mode information indicates whether the pilot mode is a mobile mode or a fixed mode and the PAPR_FLAG indicates whether a PAPR reduction is used for the at least one signal frame.

Preferably, wherein the modulator comprises a pilot and reserved tone insertion block inserting at least one pilot based on at least one pilot pattern in the at least one signal frame, wherein amplitudes of the at least one pilot depend on the at least one pilot pattern, a type of an OFDM symbol, and a type of a transmission mode, wherein the transmission mode is one of a SISO or a MIMO, wherein the pilot patterns depends on the pilot mode information.

Preferably, Wherein the modulator comprises pilot and reserved tone insertion block inserting at least one pilot based on at least one pilot pattern and at least one reserved carrier for a PAPR reduction based on a FFT (Fast Fourier Transform) size in the at least one signal frame when a PAPR_FLAG in a preamble is set to '1', PAPR reduction block performing the PAPR reduction based on a Tone reservation algorithm in a time domain, wherein the at least one reserved carrier keeps the same position for each FFT size, wherein the at least one reserved carrier keeps the same position across the FSS(s) and the FES, wherein the at least one reserved carrier keeps the different position across the FSS(s) and the normal data symbol.

In another aspect, the present invention provides an apparatus for receiving broadcast signals. The apparatus for receiving broadcast signals includes a receiver for receiving the broadcast signals including at least one signal frame, a demodulator for demodulating the received broadcast signals by an OFDM (Orthogonal Frequency Division Multiplex) scheme, a frame parser for parsing at least one signal frame from the demodulated broadcast signals including data, wherein the data is output corresponding to each of a plurality of data transmission channel, wherein each of the data transmission channel carries at least one service data or service component data, and a decoder for decoding the data.

Preferably, wherein the at least one signal frame includes a plurality of OFDM symbols, wherein the at least one signal frame comprises a preamble, a FSS (Frame Signaling Symbol), a Normal data symbol, and a FES (Frame Edge Symbol).

Preferably, wherein the preamble includes a pilot mode information and a PAPR_FLAG, wherein the pilot mode information indicates whether the pilot mode is a mobile mode or a fixed mode and the PAPR_FLAG indicates whether a PAPR reduction is used for the at least one signal frame.

Preferably, wherein the frame parser extracts the data based on at least one pilot from the at least one signal frame, wherein the demodulated broadcast signals comprises the at least one pilot based on at least one pilot pattern in the at least one signal frame, wherein amplitudes of the at least one pilot depend on the at least one pilot pattern, a type of an OFDM symbol, and a type of a transmission mode, wherein the transmission mode is one of a SISO or a MIMO, wherein the at least one pilot pattern depends on the pilot mode information.

Preferably, wherein the frame parser extracts the data based on at least one pilot and at least one reserved carrier from the at least one signal frame when a PAPR_FLAG in a preamble is set to '1', wherein the demodulated broadcast signals comprises the at least one pilot based on at least one pilot pattern and the at least one reserved carrier for a PAPR reduction based on FFT (Fast Fourier Transform) size in the at least one signal frame, wherein the at least one reserved carrier keeps the same position for each FFT size, wherein the at least one reserved carrier keeps the same position across the FSS(s) and the FES, wherein the at least one reserved carrier keeps the different position across the FSS(s) and the normal data symbol.

The present invention can process data according to service characteristics to control QoS (Quality of Services) for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 illustrates PLS1 data according to an embodiment of the present invention.

FIG. 14 illustrates PLS2 data according to an embodiment of the present invention.

FIG. 26 is a table showing information related to a reception mode according to an embodiment of the present invention.

FIG. 28 is a table illustrating transmit (Tx) parameters according to an embodiment of the present invention.

FIG. 29 is a table illustrating Tx parameters for optimizing eBW according to an embodiment of the present invention.

FIG. 30 is a table illustrating Tx parameters for optimizing eBW according to another embodiment of the present invention.

FIG. 31 is a table illustrating Tx parameters according to another embodiment of the present invention.

FIG. 33 is a table illustrating information related to a reception mode according to another embodiment of the present invention.

FIG. 35 is a table illustrating pilot parameters according to an embodiment of the present invention.

FIG. 36 is a table illustrating pilot parameters according to another embodiment of the present invention.

FIG. 40 is a table illustrating pilot parameters according to another embodiment of the present invention.

FIG. 41 is a table illustrating pilot parameters according to another embodiment of the present invention.

FIG. 43 is a table illustrating pilot parameters according to an embodiment of the present invention.

FIG. 44 shows scattered pilot amplitude values optimized for respective pilot patterns according to an embodiment of the present invention.

FIG. 45 shows an average value of scattered pilot amplitudes optimized for the same pilot density according to an embodiment of the present invention.

FIG. 46 shows that an average value of the scattered pilot amplitudes optimized for the same pilot density is denoted by a fraction according to an embodiment of the present invention.

FIG. 51 shows the locations of reserved carriers that are common to SISO and MIMO while simultaneously being applied to a normal data symbol according to an embodiment of the present invention.

FIG. 52 shows the locations of reserved carriers that are common to SISO and MIMO while simultaneously being applied to FSS and FES according to an embodiment of the present invention.

FIG. 53 shows the locations of reserved carriers that are optimized for SISO while simultaneously being applied to a normal data symbol according to an embodiment of the present invention.

FIG. 54 shows the locations of reserved carriers that are optimized for SISO while simultaneously being applied to FSS and FES according to an embodiment of the present invention.

FIG. 55 shows the locations of reserved carriers that are optimized for MIMO while simultaneously being applied to a normal data symbol according to an embodiment of the present invention.

FIG. 56 shows the locations of reserved carriers that are optimized for MIMO while simultaneously being applied to FSS and FES according to an embodiment of the present invention.

FIG. 57 shows the locations of reserved carriers that are optimized for SISO and MIMO while simultaneously being applied to FSS and FES according to another embodiment of the present invention.

FIG. 58 shows the locations of reserved carriers that are optimized for SISO while simultaneously being applied to FSS and FES according to an embodiment of the present invention.

DETAILED DESCRIPTION OF THE INVENTION

Figure 1:
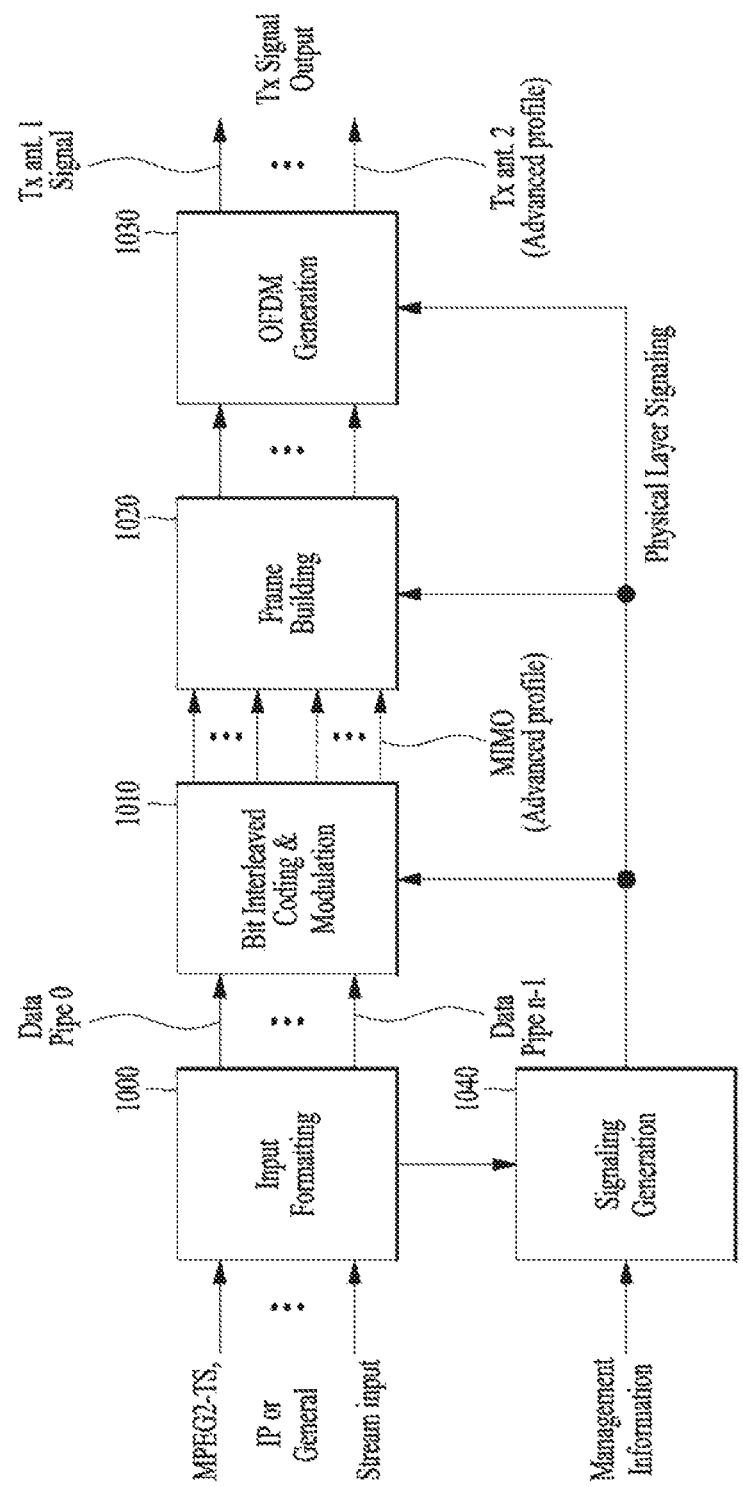
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles (base, handheld and advanced profiles) each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators.

base data pipe: data pipe that carries service signaling data.

baseband frame (or BBFRAME): set of Kbch bits which form the input to one FEC encoding process (BCH and LDPC encoding).

cell: modulation value that is carried by one carrier of the OFDM transmission.

coded block: LDPC-encoded block of PLS1 data or one of the LDPC-encoded blocks of PLS2 data.

data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol).

DP_ID: this 8 bit field identifies uniquely a DP within the system identified by the SYSTEM_ID.

dummy cell: cell carrying a pseudo random value used to fill the remaining capacity not used for PLS signaling, DPs or auxiliary streams.

emergency alert channel: part of a frame that carries EAS information data.

frame: physical layer time slot that starts with a preamble and ends with a frame edge symbol.

frame repetition unit: a set of frames belonging to same or different physical layer profile including a FEF, which is repeated eight times in a super-frame.

fast information channel: a logical channel in a frame that carries the mapping information between a service and the corresponding base DP.

FECBLOCK: set of LDPC-encoded bits of a DP data.

FFT size: nominal FFT size used for a particular mode, equal to the active symbol period Ts expressed in cycles of the elementary period T.

frame signaling symbol: OFDM symbol with higher pilot density used at the start of a frame in certain combinations of FFT size, guard interval and scattered pilot pattern, which carries a part of the PLS data.

frame edge symbol: OFDM symbol with higher pilot density used at the end of a frame in certain combinations of FFT size, guard interval and scattered pilot pattern.

frame-group: the set of all the frames having the same PHY profile type in a super-frame.

future extension frame: physical layer time slot within the super-frame that could be used for future extension, which starts with a preamble.

Futurecast UTB system: proposed physical layer broadcasting system, of which the input is one or more MPEG2-TS or IP or general stream(s) and of which the output is an RF signal.

input stream: A stream of data for an ensemble of services delivered to the end users by the system.

normal data symbol: data symbol excluding the frame signaling symbol and the frame edge symbol.

PHY profile: subset of all configurations that a corresponding receiver should implement.

PLS: physical layer signaling data consisting of PLS1 and PLS2.

PLS1: a first set of PLS data carried in the FSS symbols having a fixed size, coding and modulation, which carries basic information about the system as well as the parameters needed to decode the PLS2.

NOTE: PLS1 data remains constant for the duration of a frame-group.

PLS2: a second set of PLS data transmitted in the FSS symbol, which carries more detailed PLS data about the system and the DPs.

PLS2 dynamic data: PLS2 data that may dynamically change frame-by-frame.

PLS2 static data: PLS2 data that remains static for the duration of a frame-group.

preamble signaling data: signaling data carried by the preamble symbol and used to identify the basic mode of the system.

preamble symbol: fixed-length pilot symbol that carries basic PLS data and is located in the beginning of a frame.

NOTE: The preamble symbol is mainly used for fast initial band scan to detect the system signal, its timing, frequency offset, and FFT size.

reserved for future use: not defined by the present document but may be defined in future.

super frame: set of eight frame repetition units.

time interleaving block (TI block): set of cells within which time interleaving is carried out, corresponding to one use of the time interleaver memory.

TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion.

Type 2 DP: DP of a frame where all DPs are mapped into the frame in FDM fashion.

XFECBLOCK: set of Ncells cells carrying all the bits of one LDPC FECBLOCK.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

*IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
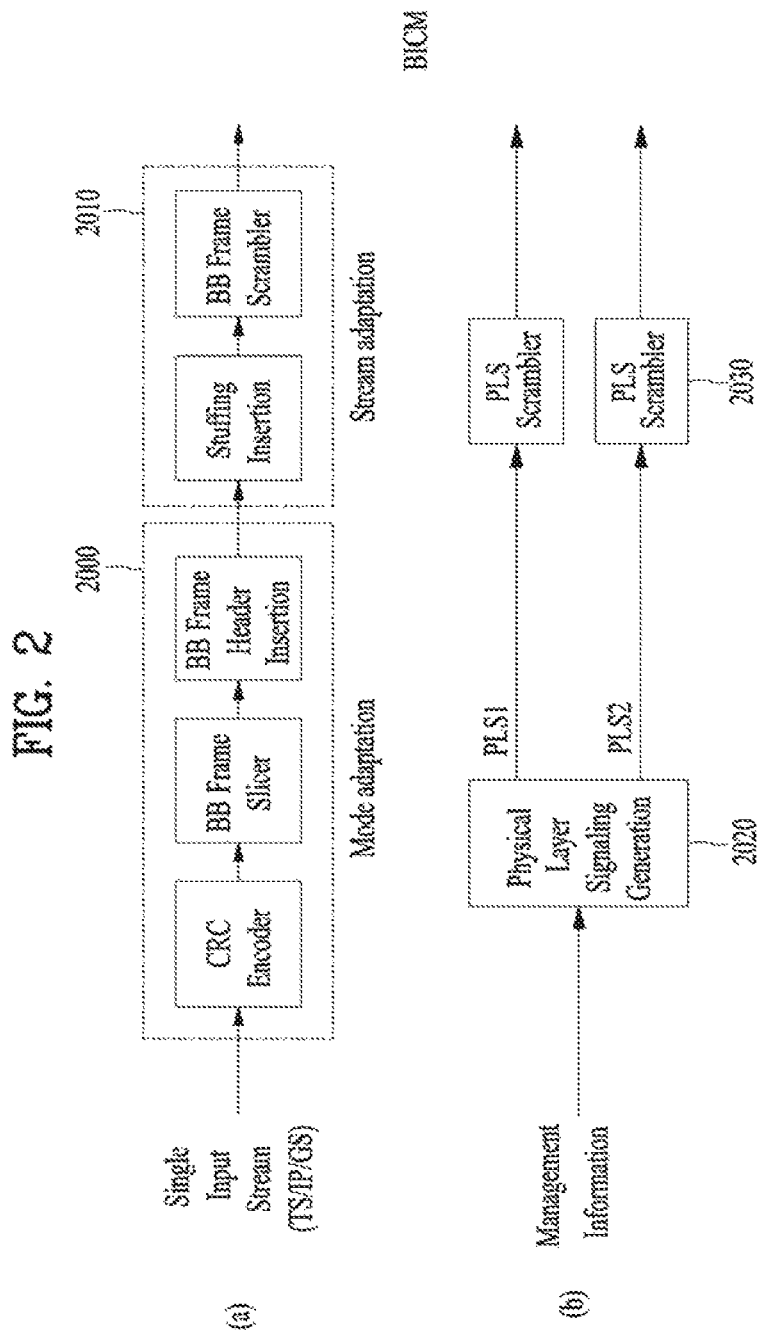
FIG. 2 illustrates an input formatting block according to one embodiment of the present invention.
Figure 3:
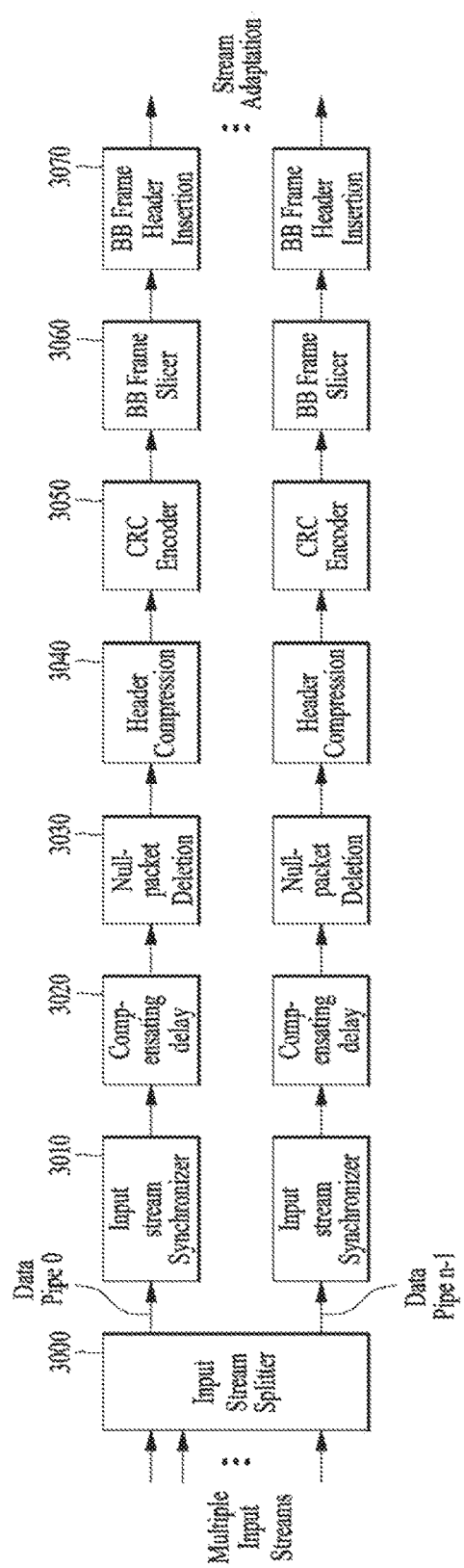
FIG. 3 illustrates an input formatting block according to another embodiment of the present invention.
Figure 4:
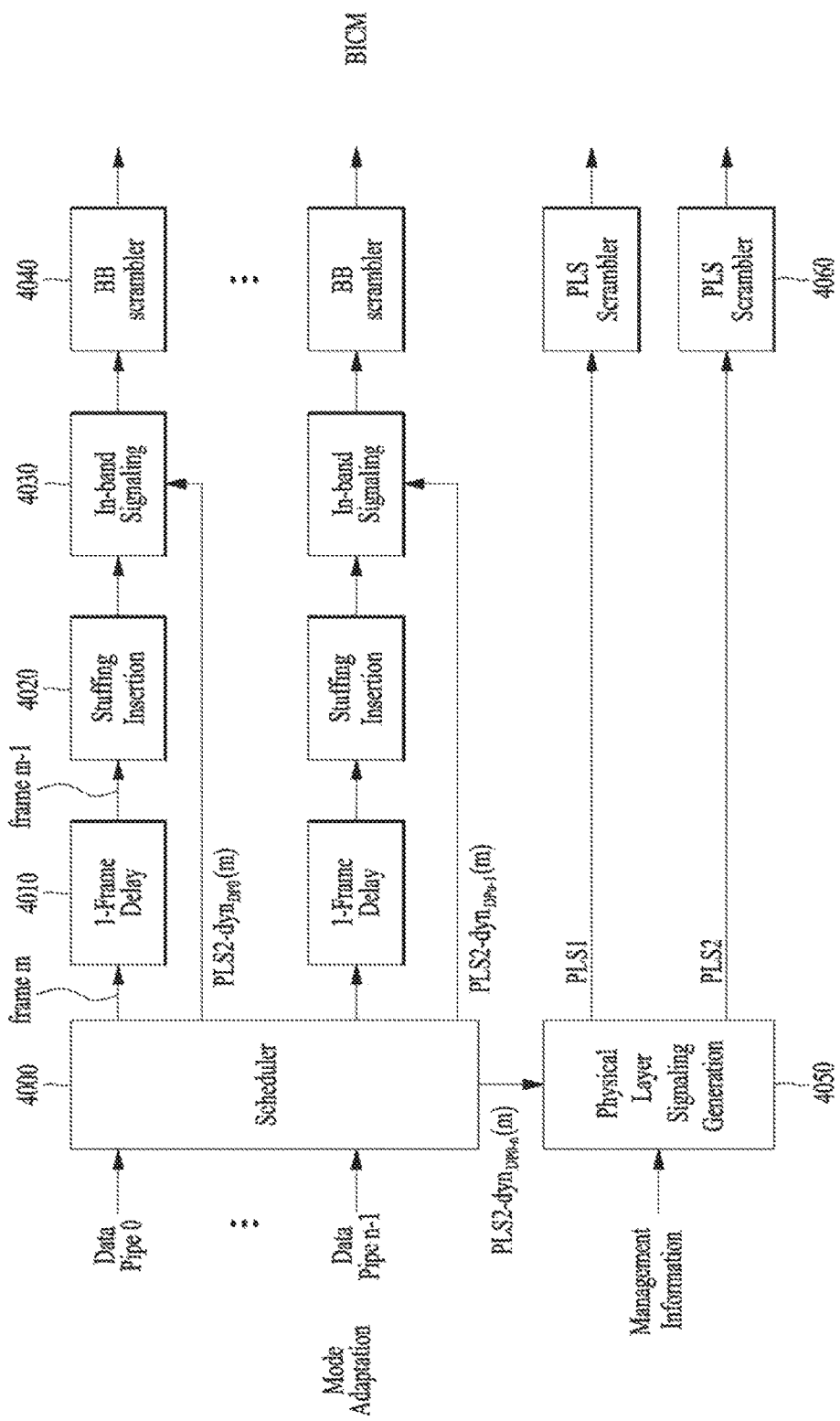
FIG. 4 illustrates an input formatting block according to another embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
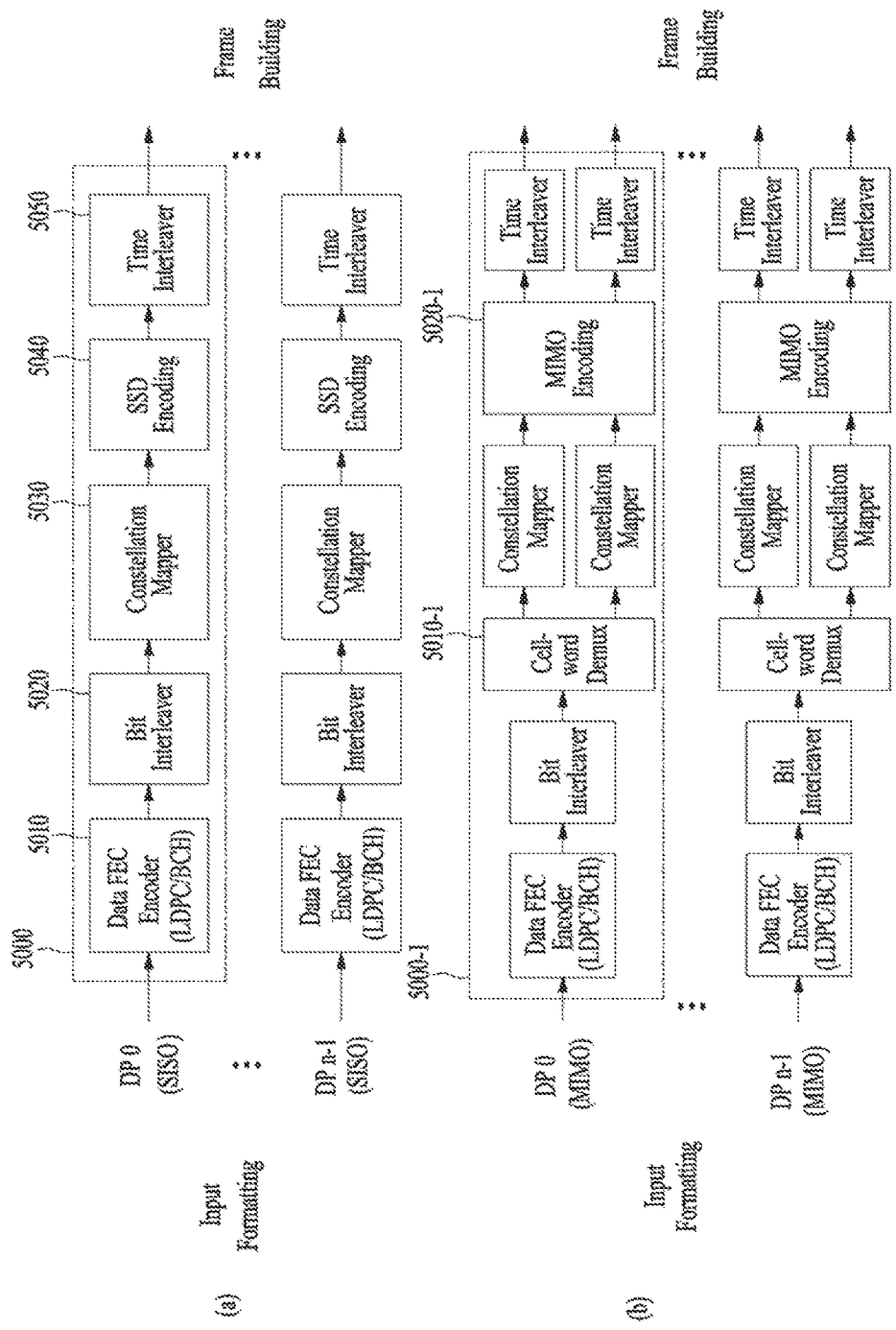
FIG. 5 illustrates a BICM block according to an embodiment of the present invention.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 6:
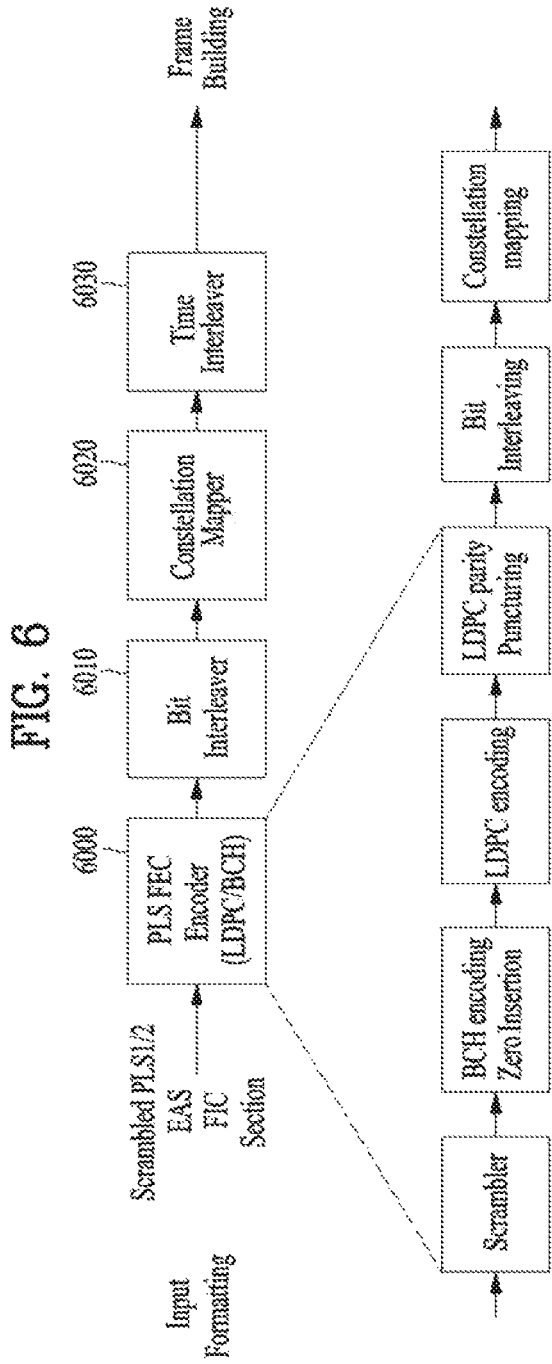
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010, a constellation mapper 6020 and time interleaver 6030.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permuted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math FIG. 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ ($=N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 |  |  |  |  |  |  |  |
|  | >1020 | 2100 |  | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The time interleaver 6030 can interleave the mapped PLS1 data and PLS2 data.

The above-described blocks may be omitted or replaced by blocks having similar or identical functions.

Figure 7:
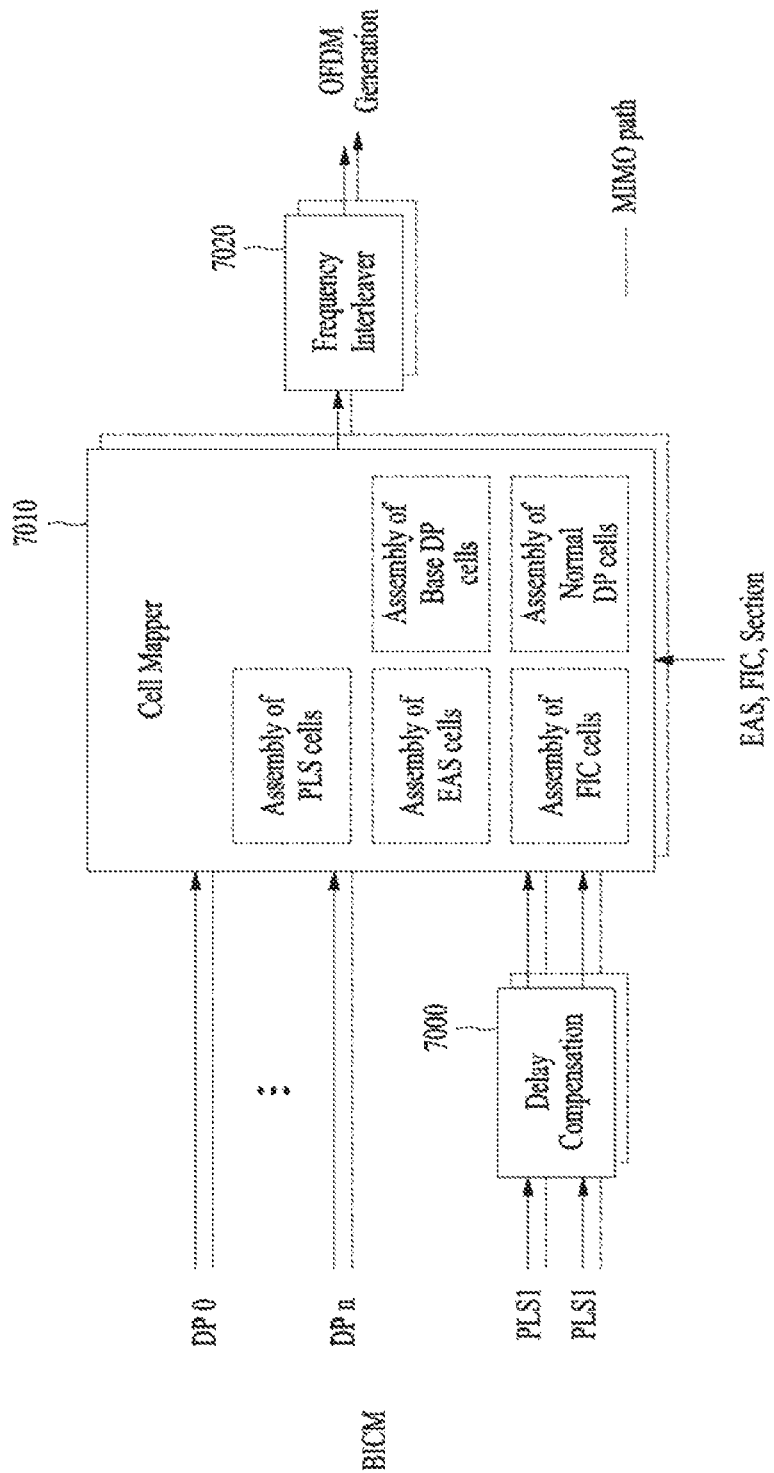
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

Figure 8:
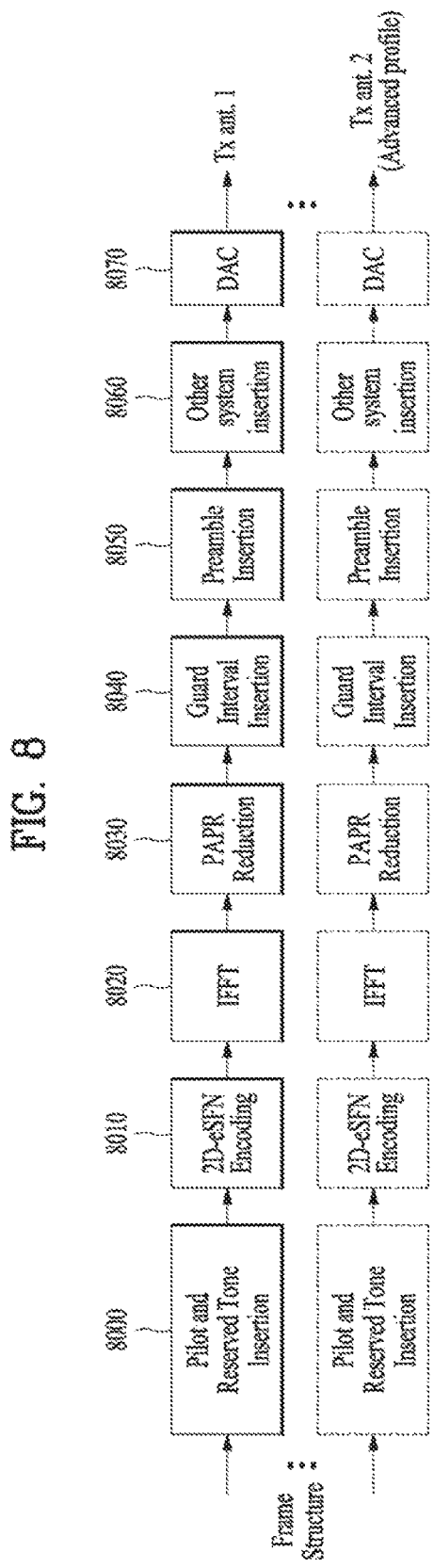
FIG. 8 illustrates an OFMD generation block according to an embodiment of the present invention.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame.

Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
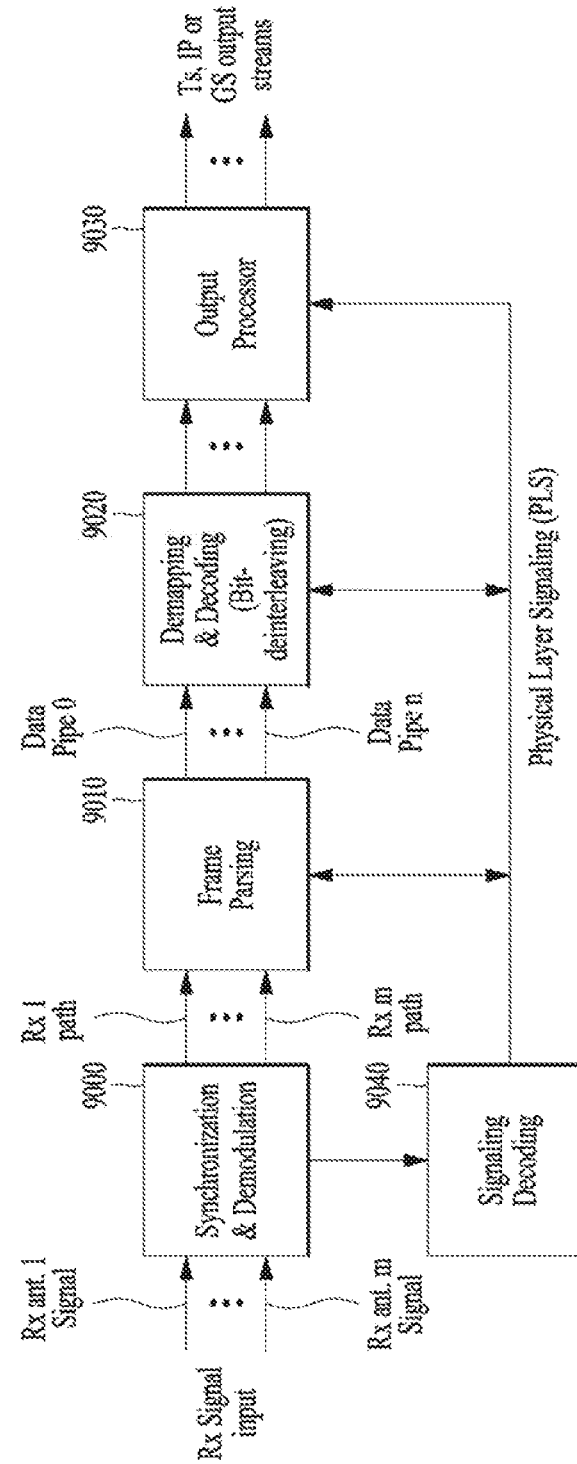
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

Figure 10:
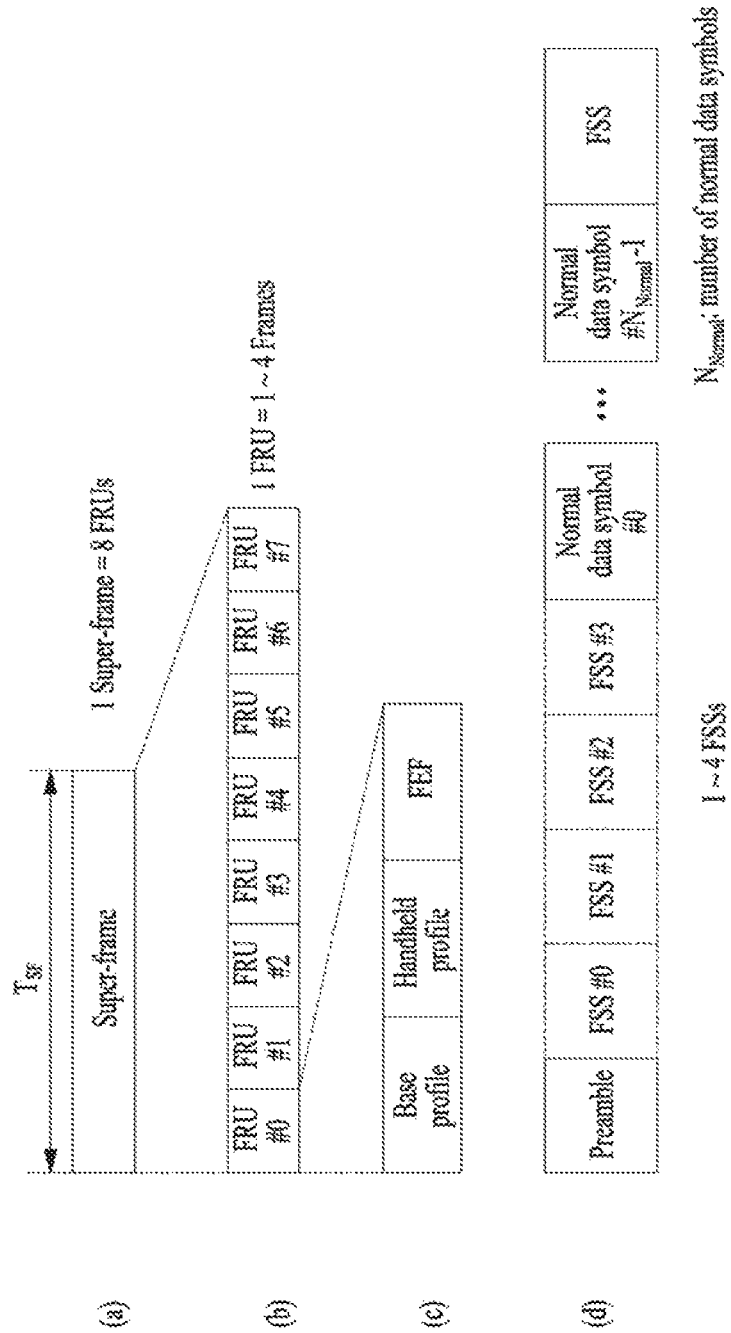
FIG. 10 illustrates a frame structure according to an embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

*Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figures 11, 12:
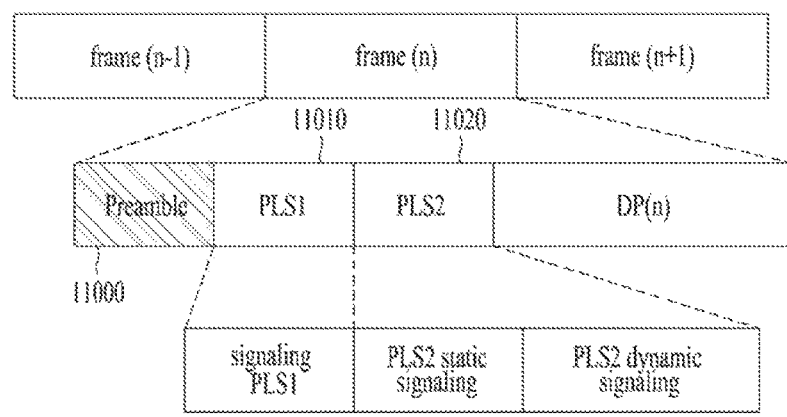
FIG. 11 illustrates a signaling hierarchy structure of the frame according to an embodiment of the present invention.
FIG. 12 illustrates preamble signaling data according to an embodiment of the present invention.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
| --- | --- |
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
| --- | --- |
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
| --- | --- |
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

*PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
| --- | --- | --- | --- | --- |
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = | Advanced | Advanced | Handheld | Handheld |

TABLE 8-continued

|  | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| X1X | profile present | profile present | profile present | profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field.

PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data.

DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

*The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31.

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 15, 16:
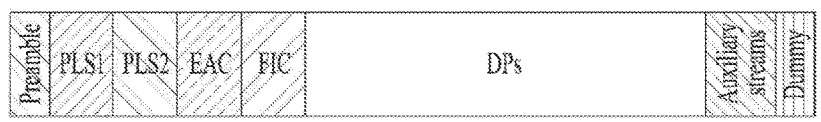
FIG. 15 illustrates PLS2 data according to another embodiment of the present invention.
FIG. 16 illustrates a logical structure of a frame according to an embodiment of the present invention.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
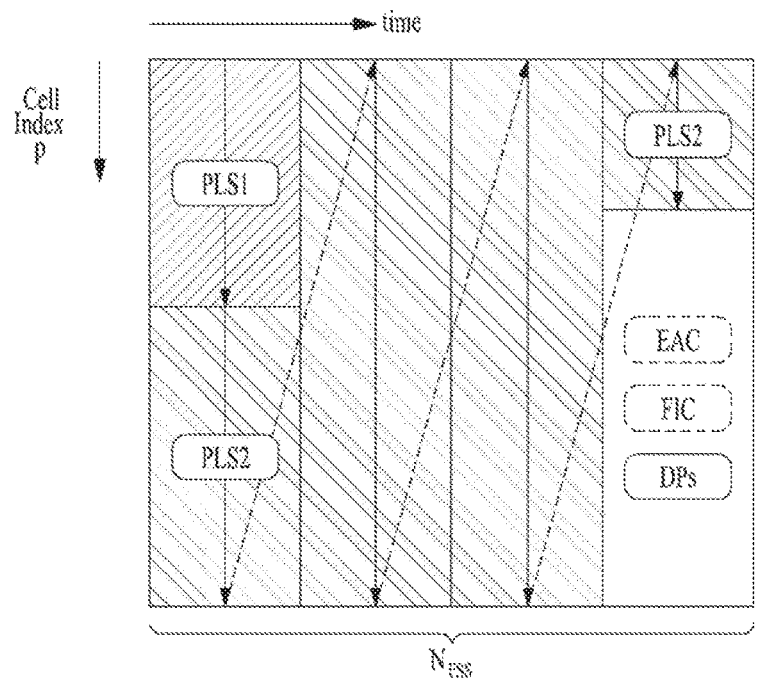
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
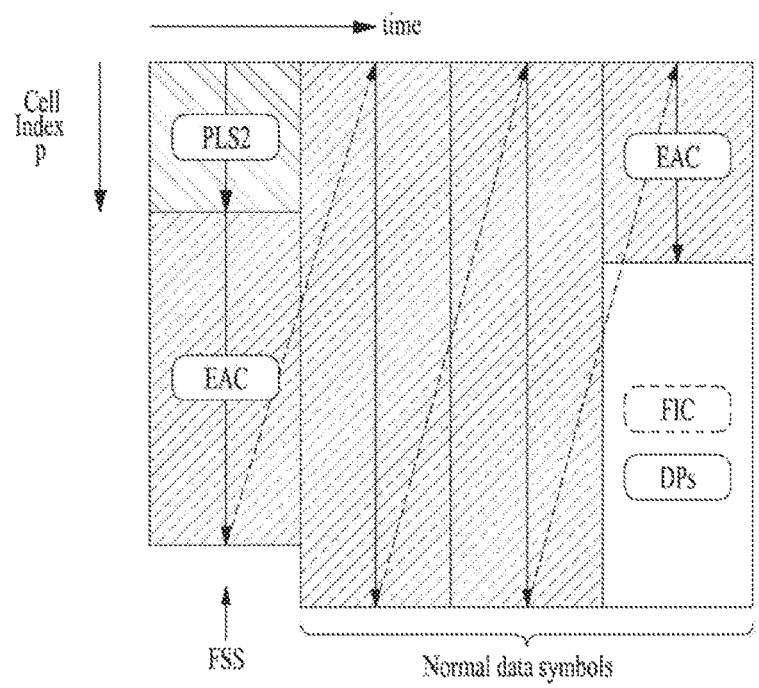
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19:
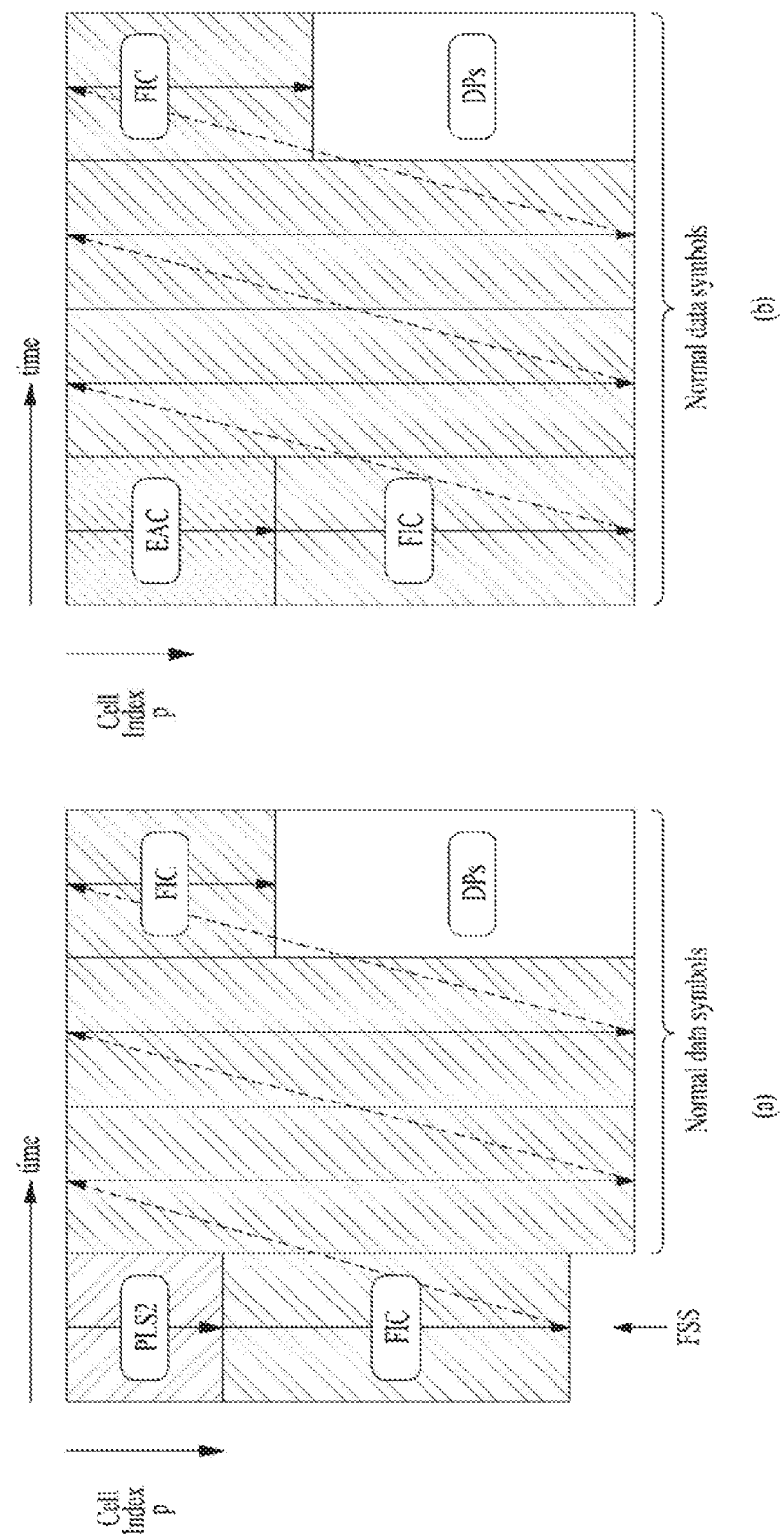
FIG. 19 illustrates FIC mapping according to an embodiment of the present invention.

FIG. 19 illustrates FIC mapping according to an embodiment of the present invention.

shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20:
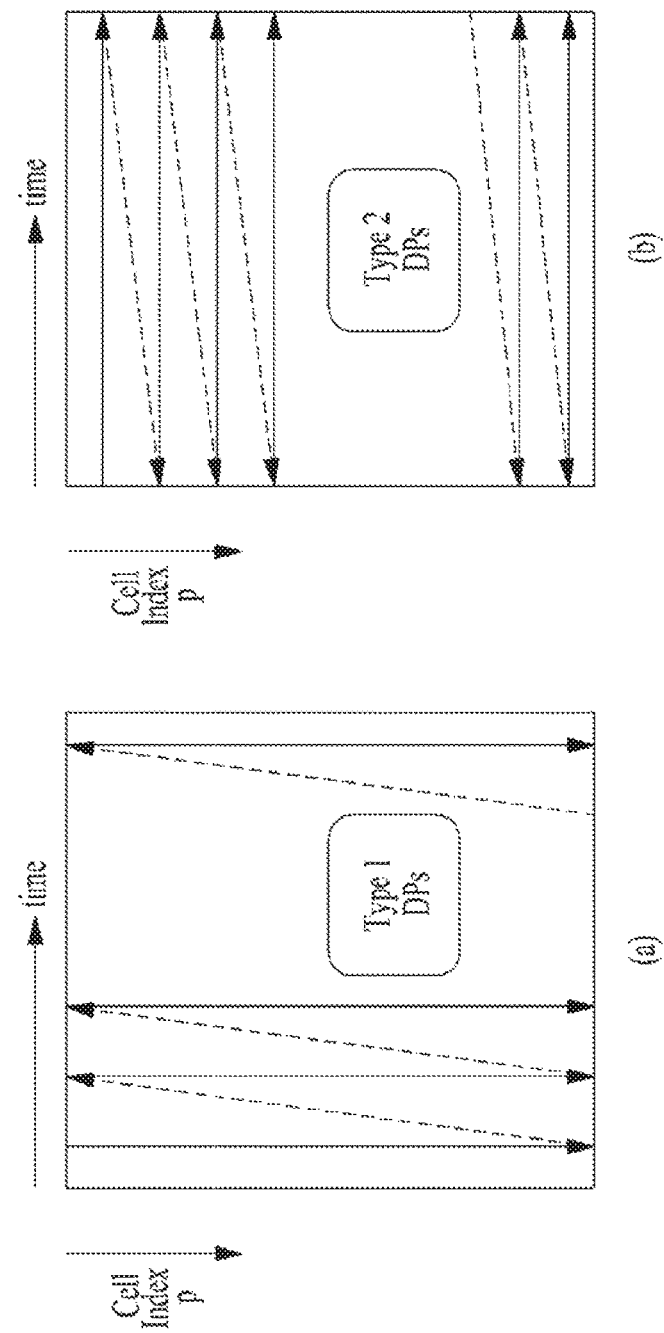
FIG. 20 illustrates a type of DP according to an embodiment of the present invention.

FIG. 20 illustrates a type of DP according to an embodiment of the present invention.

FIG. 20 shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM.
Type 2 DP: DP is mapped by FDM.

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1} + D_{DP2} \leq D_{DP}$$ [Math FIG. 2]

where $D_{DP1}$ is the number of OFDM cells occupied by Type 1 DPs, $D_{DP2}$ is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figure 21:
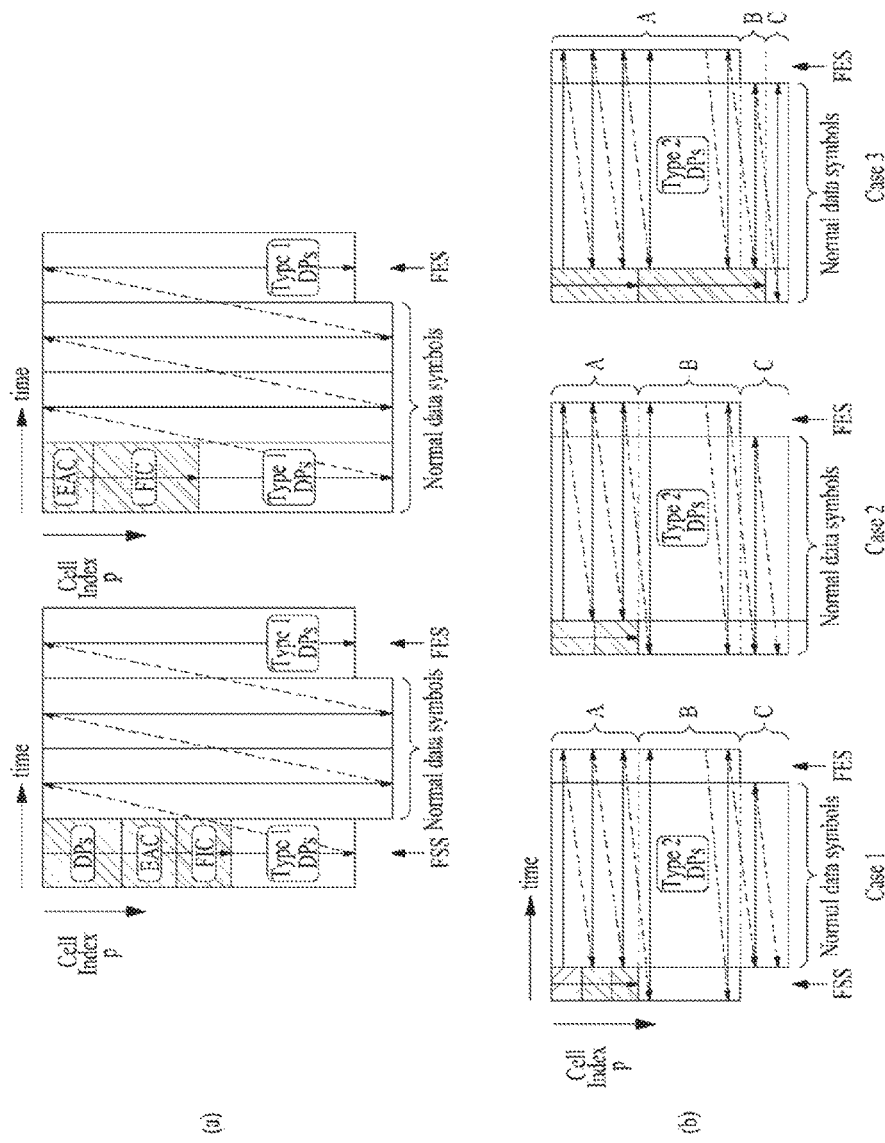
FIG. 21 illustrates DP mapping according to an embodiment of the present invention.

FIG. 21 illustrates DP mapping according to an embodiment of the present invention.

(a) shows an addressing of OFDM cells for mapping type 1 DPs and (b) shows an addressing of OFDM cells for mapping for type 2 DPs.

Addressing of OFDM cells for mapping Type 1 DPs (0, . . . , DDP1-1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2-1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

Figure 22:
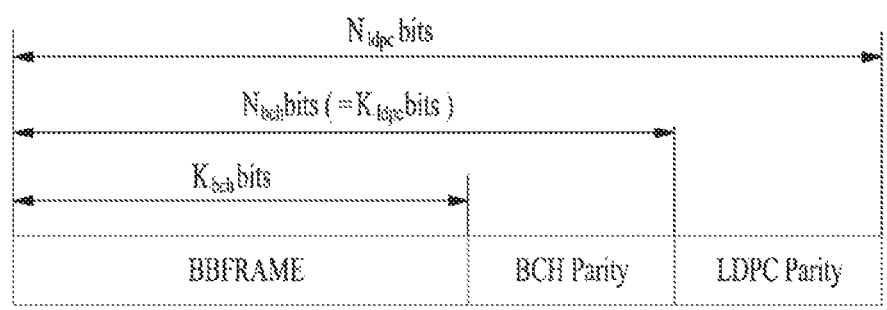
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FEC-BLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 |  | 25920 | 25728 |  |  |
| 7/15 |  | 30240 | 30048 |  |  |
| 8/15 |  | 34560 | 34368 |  |  |
| 9/15 |  | 38880 | 38688 |  |  |
| 10/15 |  | 43200 | 43008 |  |  |
| 11/15 |  | 47520 | 47328 |  |  |
| 12/15 |  | 51840 | 51648 |  |  |
| 13/15 |  | 56160 | 55968 |  |  |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 |  | 6480 | 6312 |  |  |
| 7/15 |  | 7560 | 7392 |  |  |
| 8/15 |  | 8640 | 8472 |  |  |
| 9/15 |  | 9720 | 9552 |  |  |
| 10/15 |  | 10800 | 10632 |  |  |
| 11/15 |  | 11880 | 11712 |  |  |
| 12/15 |  | 12960 | 12792 |  |  |
| 13/15 |  | 14040 | 13872 |  |  |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow Math figure.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Math FIG. 3]

The parameters for long FECBLOCK and short FECBLOCK are given in the above table 28 and 29, respectively.

The detailed procedure to calculate Nldpc−Kldpc parity bits for long FECBLOCK, is as follows:

1) Initialize the parity bits, $$p_0=p_1=p_2=\cdots=p_{N_{ldpc}-K_{ldpc}-1}=0$$ [Math FIG. 4]

2) Accumulate the first information bit −i0, at parity bit addresses specified in the first row of an addresses of parity check matrix. The details of addresses of parity check matrix will be described later. For example, for rate 13/15:

$$p_{983}=p_{983}\oplus i_0 \quad p_{2815}=p_{2815}\oplus i_0$$

$$p_{4837}=p_{4837}\oplus i_0 \quad p_{4989}=p_{7989}\oplus i_0$$

$$p_{6138}=p_{6138}\oplus i_0 \quad p_{6458}=p_{6458}\oplus i_0$$

$$p_{6921}=p_{6921}\oplus i_0 \quad p_{6974}=p_{6974}\oplus i_0$$

$$p_{7572}=p_{7572}\oplus i_0 \quad p_{8260}=p_{8260}\oplus i_0$$

$$p_{8496}=p_{8496}\oplus i_0$$ [Math FIG. 5]

3) For the next 359 information bits, $i_s$, s=1, 2, ..., 359 accumulate is at parity bit addresses using following Math figure.

$$\{x+(s \bmod 360)\times Q_{ldpc}\}\bmod(N_{ldpc}-K_{ldpc})$$ [Math FIG. 6]

where x denotes the address of the parity bit accumulator corresponding to the first bit i0, and $Q_{ldpc}$ is a code rate dependent constant specified in the addresses of parity check matrix. Continuing with the example, $Q_{ldpc}=24$ for rate 13/15, so for information bit i1, the following operations are performed:

$$p_{1007}=p_{1007}\oplus i_1 \quad p_{2839}=p_{2839}\oplus i_1$$

$$p_{4861}=p_{4861}\oplus i_1 \quad p_{5013}=p_{5013}\oplus i_1$$

$$p_{6162}=p_{6162}\oplus i_1 \quad p_{6482}=p_{6482}\oplus i_1$$

$$p_{6945}=p_{6945}\oplus i_1 \quad p_{6998}=p_{6998}\oplus i_1$$

$$p_{7596}=p_{7596}\oplus i_1 \quad p_{8284}=p_{8284}\oplus i_1$$

$$p_{8520}=p_{8520}\oplus i_1$$ [Math FIG. 7]

4) For the 361st information bit i360, the addresses of the parity bit accumulators are given in the second row of the addresses of parity check matrix. In a similar manner the addresses of the parity bit accumulators for the following 359 information bits is, s=361, 362, ..., 719 are obtained using the Math FIG. 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1.

$$p_i=p_i\oplus p_{i-1}, i=1,2,\ldots,N_{ldpc}-K_{ldpc}-1$$ [Math FIG. 8]

where final content of pi, i=0, 1, ... $N_{ldpc}-K_{ldpc}-1$ is equal to the parity bit $p_i$.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 23:
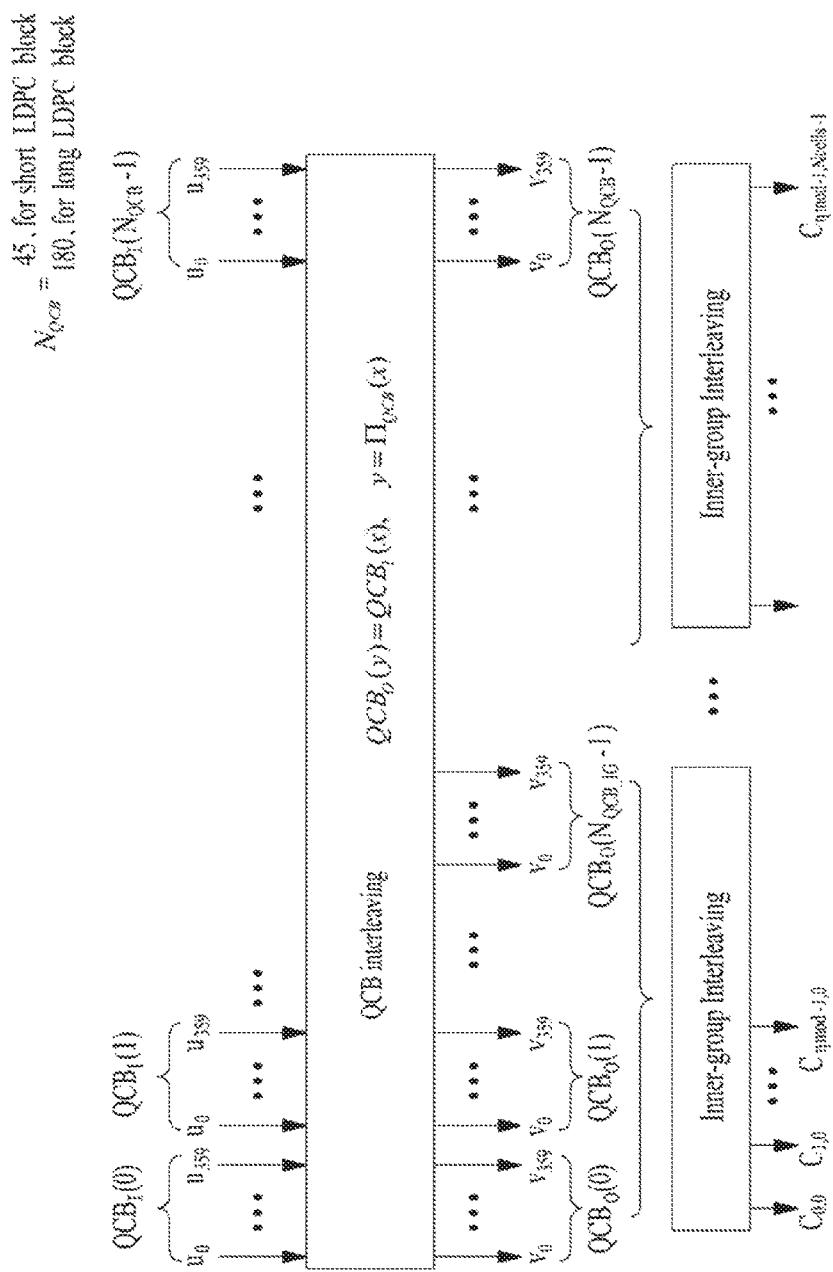
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/ηmod or 16200/ηmod according to the FECBLOCK length. The QCB interleaving pattern is unique to each combination of modulation type and LDPC code rate.

After QCB interleaving, inner-group interleaving is performed according to modulation type and order (ηmod) which is defined in the below table 32. The number of QC blocks for one inner-group, NQCB_IG, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with $N_{QCB\_IG}$ QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

Figure 24:
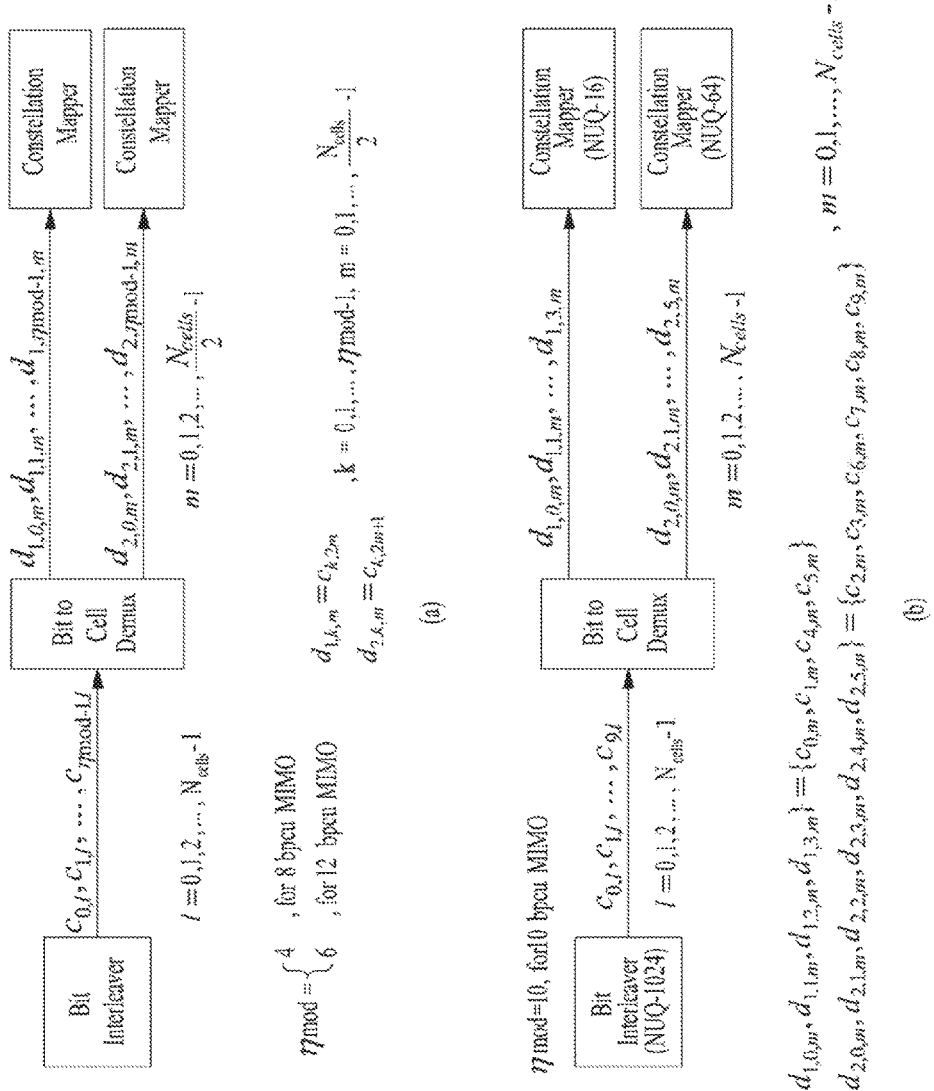
FIG. 24 illustrates a cell-word demultiplexing according to an embodiment of the present invention.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word (c0,1, c1,1, ... , cηmod-1,1) of the bit interleaving output is demultiplexed into (d1,0,m, d1,1,m ... , d1, ηmod-1,m) and (d2,0,m, d2,1,m ... , d2, ηmod-1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,1, c1,1, ... , c9,1) of the Bit Interleaver output is demultiplexed into (d1,0,m, d1,1,m ... , d1,3,m) and (d2,0,m, d2,1,m ... , d2,5,m), as shown in (b).

Figure 25:
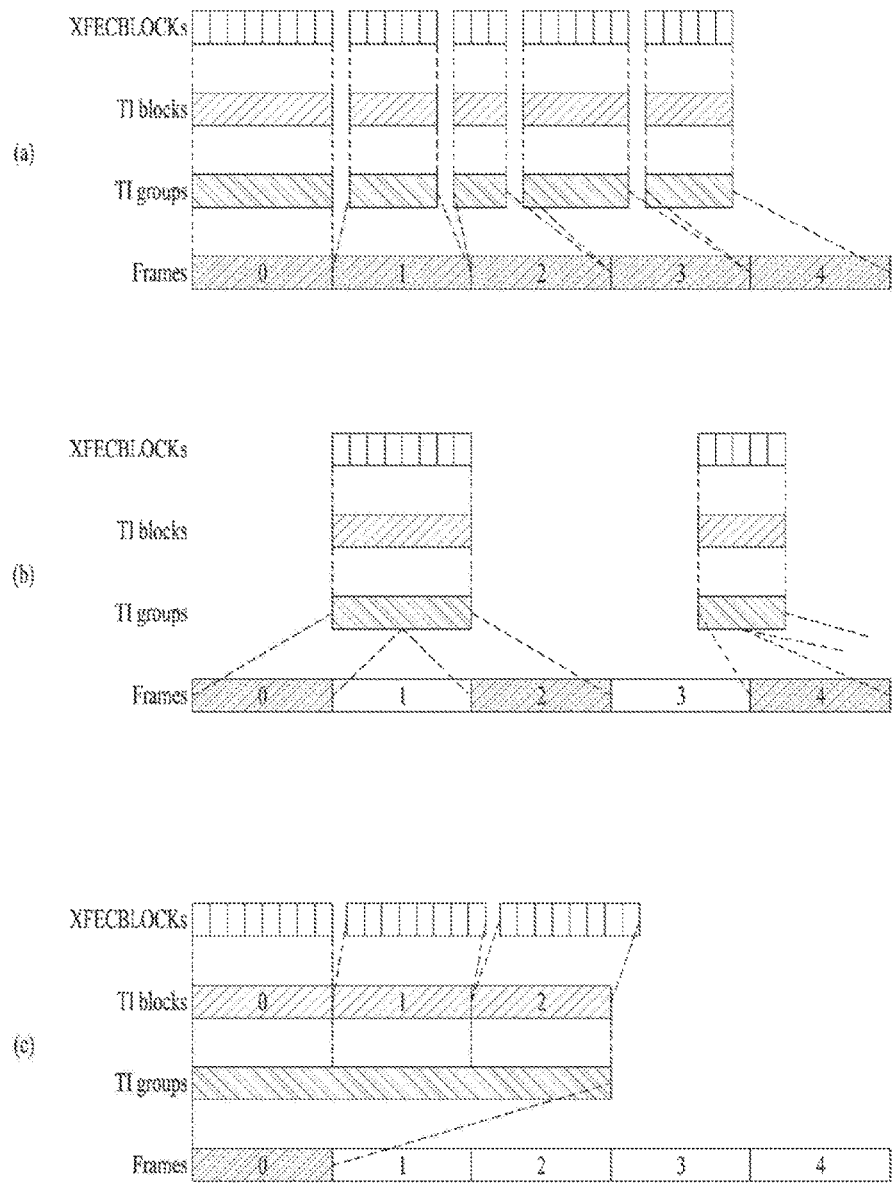
FIG. 25 illustrates a time interleaving according to an embodiment of the present invention.

FIG. 25 illustrates a time interleaving according to an embodiment of the present invention.

to (c) show examples of TI mode.

The time interleaver operates at the DP level. The parameters of time interleaving (TI) may be set differently for each DP.

*The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group(n) and is signaled as DP_NUM_BLOCK in the PLS2-DYN data. Note that NxBLOCK_Group(n) may vary from the minimum value of 0 to the maximum value NxBLOCK_GrouP_MAX (corresponding to DP_NUM_BLOCK_MAX) of which the largest value is 1023.

Each TI group is either mapped directly onto one frame or spread over PI frames. Each TI group is also divided into more than one TI blocks (NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum for a DP. This option is signaled in the PLS2-STAT signaling bit-rate by DP_TI_TYPE = '0' and DP_TI_LENGTH = $N_{TI}$, while $P_I$ = 1. |

In each DP, the TI memory stores the input XFEC-BLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cells}-1}, d_{n,s,1,0}, \ldots, d_{n,s,1,N_{cells}-1}, \ldots,$$
$$d_{n,s,N_{xBLOCK\_TI}(n,s)-1,0}, \ldots, d_{n,s,N_{xBLOCK\_TI}(n,s)-1,N_{cells}-1}),$$

where $d_{n,s,r,q}$ is the qth cell of the rth XFECBLOCK in the sth TI block of the nth TI group and represents the outputs of SSD and MIMO encodings as follows $$d_{n,s,r,q} = \begin{cases} f_{n,s,r,q}, & \text{the output of } SSD \text{ encoding} \\ g_{n,s,r,q}, & \text{the output of } MIMO \text{ encoding} \end{cases}.$$

In addition, assume that output XFECBLOCKs from the time interleaver 5050 are defined as $$(h_{n,s,0}, h_{n,s,1}, \ldots, h_{n,s,i}, \ldots, h_{n,s,N_{xBLOCK\_TI}(n,s) \times N_{cells}-1})$$

where $h_{n,s,i}$ is the ith output cell (for i=0, ..., $N_{xBLOCK\_TI}$(n,s)×$N_{cells}$−1) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows Nr of a TI memory is equal to the number of cells Ncell, i.e., Nr=Ncell while the number of columns Nc is equal to the number NxBLCOK_TI (n,s).

As described above, the broadcast signal transmission apparatus according to an embodiment or the above-mentioned OFDM generation block 1030 may insert pilots into a signal frame generated from a frame structure module 1020, and may OFDM-modulate broadcast signals using transmission (Tx) parameters. Tx parameters according to the embodiment may also be called OFDM parameters.

The present invention proposes Tx parameters that can satisfy a spectrum mask reference contained in a transmission (Tx) band for the next generation broadcast transmission/reception (Tx/Rx) system, can maximize Tx efficiency, and can be applied to a variety of Rx scenarios.

FIG. 26 shows a table illustrating information related to a reception mode according to an embodiment of the present invention.

A Table shown in FIG. 26 may include a network configuration according to a reception mode of the next generation broadcast Tx/Rx system.

As described above, the reception modes according to the embodiment can be classified into a Fixed Rooftop environment and a Handheld portable environment, and a representative channel for each environment can be decided.

In addition, the broadcast signal transmission apparatus according to the embodiment can decide the transmission (Tx) mode according to the above-mentioned reception mode. That is, the broadcast signal transmission apparatus according to the embodiment may process broadcast service data using the non-MIMO schemes (MISO and SISO schemes) or the MIMO scheme according to the broadcast service characteristics (i.e., according to the reception mode). Accordingly, the broadcast signal for each Tx mode may be transmitted and received through a Tx channel corresponding to the corresponding processing scheme.

In this case, according to one embodiment of the present invention, broadcast signals of individual Tx modes can be identified and transmitted in units of a signal frame. In addition, each signal frame may include a plurality of OFDM symbols. Each OFDM symbol may be comprised of the above-mentioned preamble (or preamble symbols) and a plurality of data symbols configured to transmit data corresponding to a broadcast signal.

A left column of the Table shown in FIG. 26 shows the above-mentioned three reception modes.

In case of the fixed rooftop environment, the broadcast signal reception apparatus may receive broadcast signals through the rooftop antenna located at the height of 10 ms or higher above the ground. Accordingly, since a direct path can be guaranteed, a Rician channel is representatively used, the Rician channel is less affected by Doppler shift, and the range of a delay spread may be limited according to the use of a directional antenna.

In case of the handheld portable environment and the handheld mobile environment, the broadcast signal reception apparatus may receive broadcast signals through the omni-directional antenna located at the height of 1.5 m or less above the ground. In this case, a Rayleigh channel may be representatively used as the Tx channel environment based on reflected waves, and may obtain the range of a delay spread of a channel longer than the directional antenna.

In case of the handheld portable environment, a low-level Doppler environment can be supported as the indoor/outdoor reception environments in consideration of mobility such as an adult walking speed. The handheld portable environment shown in FIG. 26 can be classified into the fixed environment and the pedestrian environment.

On the other hand, the handheld mobile environment must consider not only the walking speed of a receiving user, but also the moving speed of a vehicle, a train, etc. such that the handheld mobile environment can support a high Doppler environment.

A right column of the Table shown in FIG. 26 shows the network configuration for each reception mode.

The network configuration may indicate the network structure. The network configuration according to the embodiment can be classified into a Multi Frequency Network (MFN) composed of a plurality of frequencies and a Single Frequency Network (SFN) composed of a single frequency according to a frequency management method within the network.

MFN may indicate a network structure for transmitting a broadcast signal using many frequencies in a wide region. A plurality of transmission towers located at the same region or a plurality of broadcast signal transmitters may transmit the broadcast signal through different frequencies. In this case, the delay spread caused by a natural echo may be formed due to a topography, geographic features, etc. In addition, the broadcast signal receiver is designed to receive only one radio wave, such that the reception quality can be determined according to the magnitude of a received radio wave.

SFN may indicate a network structure in which a plurality of broadcast signal transmitters located at the same region can transmit the same broadcast signal through the same frequency. In this case, the maximum delay spread of a transmission (Tx) channel becomes longer due to the additional man-made echo. In addition, the reception (Tx) quality may be affected not only by a mutual ratio between a radio wave to be received and a radio wave of the jamming frequency, but also by a delay time, etc.

When deciding the Tx parameters, the guard interval value may be decided in consideration of the maximum delay spread of the Tx channel so as to minimize inter symbol interference. The guard interval may be a redundant data additionally inserted into the transmitted broadcast signal, such that it is necessary to design the entire symbol duration to minimize the loss of SNR in consideration of the entire Tx power efficiency.

Figure 27:
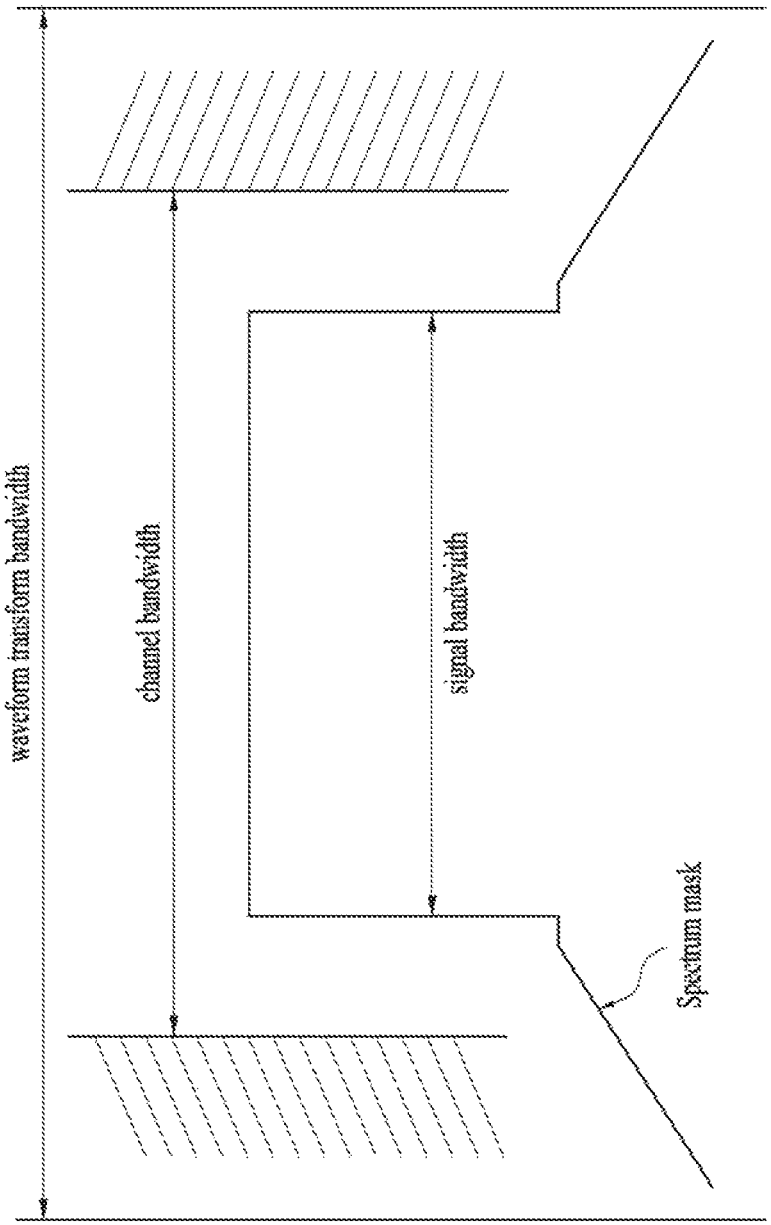
FIG. 27 is a bandwidth of a broadcast signal according to an embodiment of the present invention.

FIG. 27 shows a bandwidth of the broadcast signal according to an embodiment of the present invention.

Referring to FIG. 27, the bandwidth of the broadcast signal is identical to a waveform transform bandwidth, the waveform transform bandwidth may include a channel bandwidth and a spectrum mask, and the channel bandwidth may include a signal bandwidth.

The transmission (Tx) parameters according to the embodiment need to satisfy the spectrum mask requested for minimizing interference of a contiguous channel within the corresponding channel bandwidth allocated to the next generation broadcast Tx/Rx system, and need to be designed for maximizing the Tx efficiency within the bandwidth of the corresponding broadcast signal. In addition, a plurality of carriers can be used when the above-mentioned waveform generation module 1030 converts input signals, the Tx parameters may coordinate or adjust the spacing among subcarriers according to the number of subcarriers used in the waveform transform bandwidth, the length of an entire symbol in the time domain is decided, and a transmission (Tx) mode appropriate for the Rx scenario of the next generation broadcast Tx/Rx system is classified, such that the Tx parameters can be designed according to the Rx scenario.

Tables including Tx parameters according to the embodiment are shown in FIG. 28.

FIG. 28(A) is a Table that shows guard interval values to be used as Tx parameters according to the above-mentioned reception mode and the network configuration. FIG. 28(B) is a Table that shows vehicle speed values to be used as Tx parameters according to the above-mentioned reception mode and the network configuration.

As described above, the guard interval acting as the Tx parameter may be designed in consideration of the maximum delay spread based on the network configuration and the Rx antenna environment according to the reception (Rx) scenario. The vehicle speed used as the Tx parameter may be designed and decided in consideration of the network configuration and the Rx antenna environment according to Rx scenario categories types.

In order to implement the optimal design of the next generation broadcast Tx/Rx system, the present invention provides a method for establishing the guard interval (or elementary guard interval) and the vehicle speed, and optimizing Tx parameters using the optimization scaling factor.

Symbols (or OFDM symbols) contained in the signal frame according to the embodiment may be transmitted for a specific duration. In addition, each symbol may include not only a guard interval region corresponding to the useful part corresponding to the active symbol duration length, but also the guard interval. In this case, the guard interval region may be located ahead of the useful part.

As shown in FIG. 28(A), the guard interval according to the embodiment may be set to NG_a1,NG_a2, . . . , NG_b1,NG_b2, . . . , NG_c1,NG_c2, . . . , NG_d1, NG_d2, . . . , NG_e1,NG_e2, . . . , NG_f1,NG_f2, . . . , NG_g1,NG_g2, . . . , NG_h1,NG_h2, . . . according to the above-mentioned reception modes.

The guard intervals (a) and (b) shown in FIG. 28(A) may show exemplary guard intervals applicable to the next generation broadcast Tx/Rx system. In more detail, the guard interval (a) shows one embodiment in which the elementary guard interval is set to 25 μs, and the guard interval (b) shows another embodiment in which the elementary guard interval is set to 30 μs. In the above-mentioned embodiments, the optimization scaling factor for implementing optimization based on a network structure while simultaneously optimizing Tx efficiency of Tx signals and SNR damage is set to Lalpha1, Lalpha2, Lbeta1, or Lbeta2.

As shown in FIG. 28(B), the vehicle speed according to the embodiment may be set to quasi static, <VP_a1 km/h, <VP_b1 km/h, Vm_a1 km/h~Vm_a2 km/h, or Vm_b1 km/h~Vm_b2 km/h according to the above-mentioned reception modes.

The vehicle speed (a) shown in FIG. 28(B) shows an example of the vehicle speed applicable to the next generation broadcast Tx/Rx system according to the embodiment. In accordance with this embodiment, the elementary vehicle speed may be set to 'quasi-static', '3 km/h', and '3 km/h~200 km/h' according to the respective reception scenarios, and the optimization scaling factor for implementing optimization based on the network structure and optimizing Tx efficiency of Tx signals and time-variant channel estimation may be set to Valpha1, Valpha2, Vbeta1, and Vbeta1.

The following Math Figure may be used to decide an effective signal bandwidth (hereinafter referred to as eBW) of the optimized Tx signals according to the present invention $$eBW = \{N_{waveform\_scaling} \times (N_{pilotdensity} \times N_{eBW}) + \alpha\} \times Fs \text{ (Hz)}$$

[Math Figure 9]

In Math FIG. 9, $N_{waveform\_scaling}$ may denote a waveform scaling factor, $N_{pilotdensity}$ may denote a pilot density scaling factor (hereinafter referred to as a pilot density), NeBW may denote an effective signal bandwidth scaling factor, and α may denote an additional bandwidth factor. In addition, Fs may denote a sampling frequency.

In order to decide the effective signal bandwidth (eBW) optimized for a spectrum mask based on a channel bandwidth, the present invention may use the above-mentioned factors as the optimization parameters (or optimum parameters). Specifically, according to the Math Figure of the present invention, Tx efficiency of Tx parameters can be maximized by coordinating the waveform transform bandwidth (sampling frequency). The individual factors shown in Math Figure will hereinafter be described in detail.

The waveform scaling factor is a scaling value depending upon a bandwidth of a carrier to be used for waveform transform. The waveform scaling factor according to the embodiment may be set to an arbitrary value proportional to the length of nonequispaced fast Fourier transform (NFFT) in case of OFDM.

The pilot density scaling factor may be established according to a predetermined position of a reference signal inserted by a Pilot and Reserved Tone Insertion block 8000, and may be established by the density of the reference signal.

The effective signal bandwidth scaling factor may be set to an arbitrary value that can satisfy a specification of a spectrum mask contained in the Tx channel bandwidth and at the same time can maximize the bandwidth of the Tx signals. As a result, the optimum eBW can be designed.

The additional bandwidth factor may be set to an arbitrary value for coordinating additional information and structures needed for the Tx signal bandwidth. In addition, the additional bandwidth factor may be used to improve the edge channel estimation throughput of spectrums through reference signal insertion.

Number of Carrier (NoC) may be a total number of carriers transmitted through the signal bandwidth, and may be denoted by the portion of the Math Figure enclosed in brackets.

The broadcast signal transmission apparatus according to the present invention may use Tx parameters that are capable of optimizing the effective signal bandwidth (eBW) according to the number of subcarriers used for transform. In addition, the broadcast signal transmission apparatus according to the present invention can use the above-mentioned effective signal bandwidth scaling factor as a transmission (Tx) parameter capable of optimizing the effective signal bandwidth (eBW).

The effective signal bandwidth (eBW) scaling factor is extended in units of a pilot density of a predetermined reference signal, such that the eBW scaling factor may be set to a maximum value optimized for the spectrum mask. In this case, the broadcast signal transmission apparatus according to the present invention coordinates the waveform transform bandwidth (i.e., sampling frequency) of vague parts capable of being generated according to the pilot density unit, such that the eBW scaling factor for the spectrum mask can be decided.

FIG. 29 shows a table including Tx parameters capable of optimizing the effective signal bandwidth (eBW) according to the embodiment.

The Tx parameters shown in FIG. 29 can satisfy the Federal Communications Commission (FCC) spectrum mask for the 6 MHz channel bandwidth of ATSC, and can optimize the effective signal bandwidth (eBW) of the next generation broadcast system based on the OFDM scheme.

FIG. 29(A) shows Tx parameters (See Example A) established with respect to the guard interval (a) and the vehicle speed (a). FIG. 29(B) shows Tx parameters (See Example B-1) established with respect to the guard interval (b) and the vehicle speed (b).

FIG. 29(A') shows a table indicating an embodiment of a GI duration for combination of FFT and GI modes established by the concept of FIG. 29(A). FIG. 29(B') shows a table indicating an embodiment of a GI duration for combination of FFT (NFFT) and GI modes established by the concept of FIG. 29(B).

Although the Tx parameters shown in FIGS. 29(A) and 29(B) are established for three FFT modes (i.e., 8K, 16K and 32K FFT modes), it should be noted that the above Tx parameters can also be applied to other FFT modes (i.e., 1K/2K/4K/64K FFT modes) as necessary. In addition, FIG. 29(A) and FIG. 29(B) show various embodiments of the optimization scaling factors applicable to the respective FFT modes.

The broadcast signal transmission apparatus according to the embodiment can insert the reference signal into the time and frequency domains in consideration of the Tx parameters shown in (A) and (B), the reception scenario, and the network configuration, and the reference signal can be used as additional information for synchronization and channel estimation.

The broadcast signal transmission apparatus according to the embodiment may establish the density (Npilotdensity) of a reference signal and the optimized eBW in consideration of the ratio of a channel estimation range of the guard interval. In addition, the waveform scaling factor according to the embodiment may be determined in proportion to the FFT size for each FFT mode.

If a total number of the remaining carriers other than a null carrier used as a guard band during IFFT is decided by the waveform transform scheme, the broadcast signal transmission apparatus according to the embodiment may coordinate the waveform transform bandwidth (i.e., sampling frequency) so as to determine a maximum signal bandwidth not exceeding the spectrum mask. The sampling frequency may decide the optimized signal bandwidth, and may be sued to decide the OFDM symbol duration and the subcarrier spacing. Accordingly, the sampling frequency may be determined in consideration of not only the guard interval, a Tx channel of the vehicle speed, and the reception scenario, but also the Tx signal efficiency and the SNR damage. In FIG. 29, (A) shows an embodiment in which 'Fs' is set to 221/32 MHz, and (B) shows an embodiment in which 'Fs' is set to (1753/256) MHz.

'fc' in FIGS. 29(A) and 29(B) may denote the center frequency of the RF signal, and 'Tu' may denote an active symbol duration.

Figure 30:
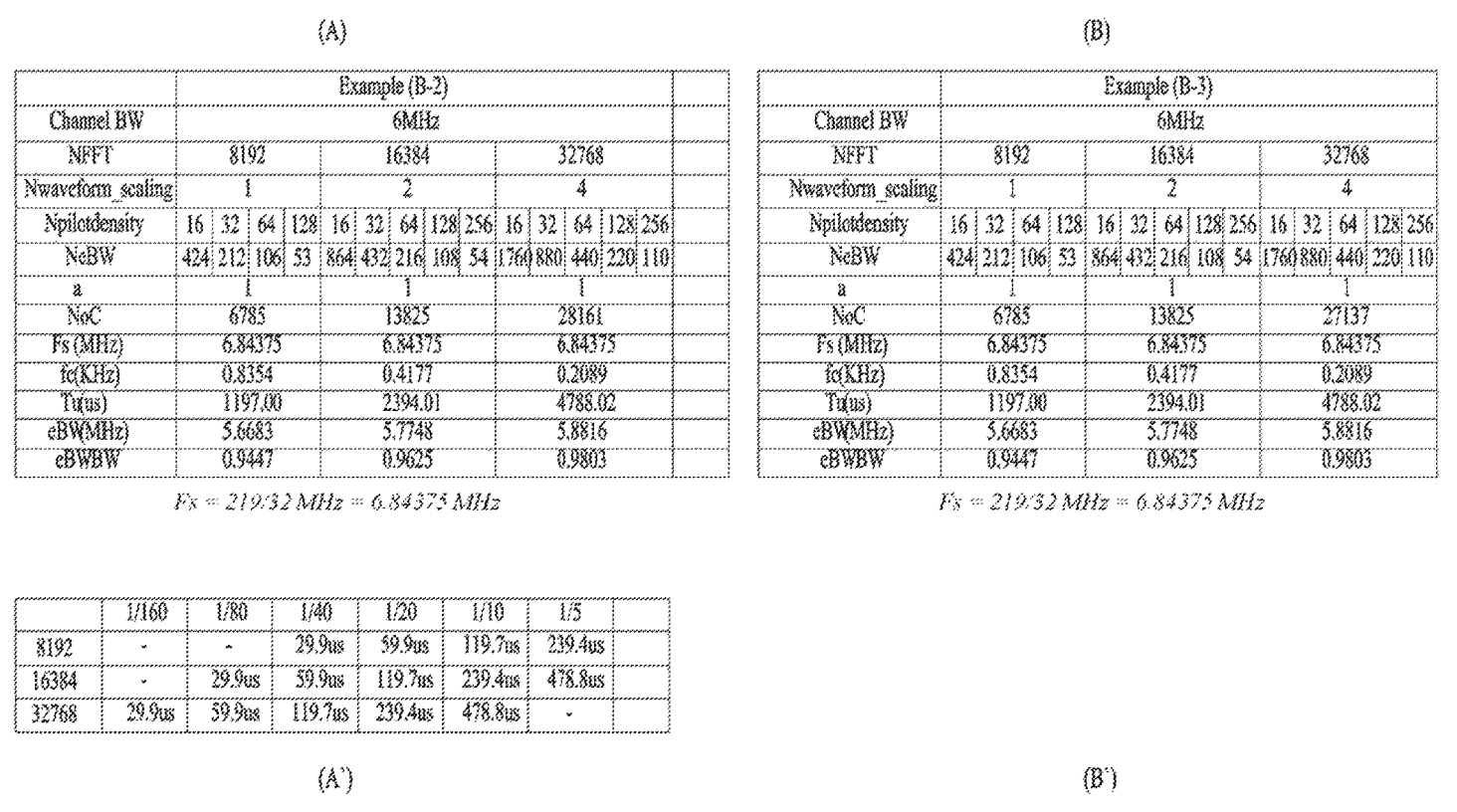

FIG. 30 shows a Table including Tx parameters for optimizing the effective signal bandwidth (eBW) according to another embodiment of the present invention.

FIG. 30(A) shows a Table indicating another embodiment of the concept of FIG. 29(B). In more detail, FIG. 30(A) is a Table including Tx parameters (See Example B-2) in case that 'Fs' is set to 219/32 MHz.

FIG. 30(A') shows a Table indicating an embodiment of a GI duration for combination of FFT and GI modes established by the concept of FIG. 30(A).

Tx parameters shown in FIG. 30(A) have lower values of fc and eBW but a higher value of Tu, differently from the Tx parameters shown in FIG. 29(B). In this case, according to one embodiment of the present invention, the eBW value may be set to a specific value that is capable of being established as a factor with respect to the channel bandwidth.

FIG. 30(B) shows a Table indicating another embodiment of the concept of FIG. 29(B). In more detail, FIG. 30(B) is a Table including Tx parameters (See Example B-3) in case that 'Fs' is set to 219/32 MHz.

Tx parameters shown in FIG. 30(B) have lower values of fc and eBW but a higher value of Tu, differently from the Tx parameters shown in FIG. 29(B). In this case, according to one embodiment of the present invention, the eBW value may be set to a specific value that is capable of being established as a factor with respect to the channel bandwidth.

Values of FIG. 30(B) indicates that 16K and 32K can be established as scalable parameters on the basis of 8K, and are identical to a spectrum boundary. FIG. 30(B) shows that the same eBW is designed for 8K, 16K, and 32K, and the same eBW may be established to minimize interference of a contiguous channel. The mode of FIG. 30(B) may correspond to a normal carrier mode of DVB-T2.

FIG. 31 shows Tx parameters according to another embodiment of the present invention.

FIG. 31(A), FIG. 31(B-1), FIG. 31(B-2), and FIG. 31(B-3) respectively show tables indicating Tx parameters for optimizing the eBW of FIG. 30.

As can be seen from FIG. 31(C), when establishing the scaling factor and the Fs value corresponding to a channel bandwidth of 5, 7, or 8 MHz, the resultant scaling factor can be obtained by the product (multiplication) of a scaling factor having been calculated on the basis of the 6 MHz Fs value. The scaling factor may correspond to the rate of the channel bandwidth.

In more detail, a Table of FIG. 31(A) shows Tx parameters corresponding to the 5, 6, 7, 8 MHz channel bandwidths of FIG. 29(A).

The table of FIG. 31(B-1) shows Tx parameters corresponding to the 5, 6, 7, 8 MHz channel bandwidths of FIG. 20(B-1).

The Table of FIG. 31(B-2) shows Tx parameters corresponding to the 5, 6, 7, 8 MHz channel bandwidths of FIG. 30(B-2).

The table of FIG. 31(B-3) shows Tx parameters corresponding to the 5, 6, 7, 8 MHz channel bandwidths of FIG. 30(B-3).

Referring to the third row of FIG. 31(C), the Fs value corresponding to each channel bandwidth in FIG. 31(A) is calculated by the product of the scaling factor having been calculated on the basis of the 6 MHz Fs value.

Referring to the fourth row of FIG. 31(C), the Fs value corresponding to each channel bandwidth in FIG. 31(B-1) is the value of Fs(B-1) calculated by the product of the scaling factor having been calculated on the basis of the 6 MHz Fs value. Referring to the fifth row of FIG. 31(C), the Fs value corresponding to each channel bandwidth in FIG. 31(B-2) is the value of Fs(B-2) calculated by the product of the scaling factor having been calculated on the basis of the 6 MHz Fs value. Referring to the sixth row of FIG. 31(C), the Fs value corresponding to each channel bandwidth in FIG. 31(B-3) is the value of Fs(B-3) calculated by the product of the scaling factor having been calculated on the basis of the 6 MHz Fs value.

Figure 32:
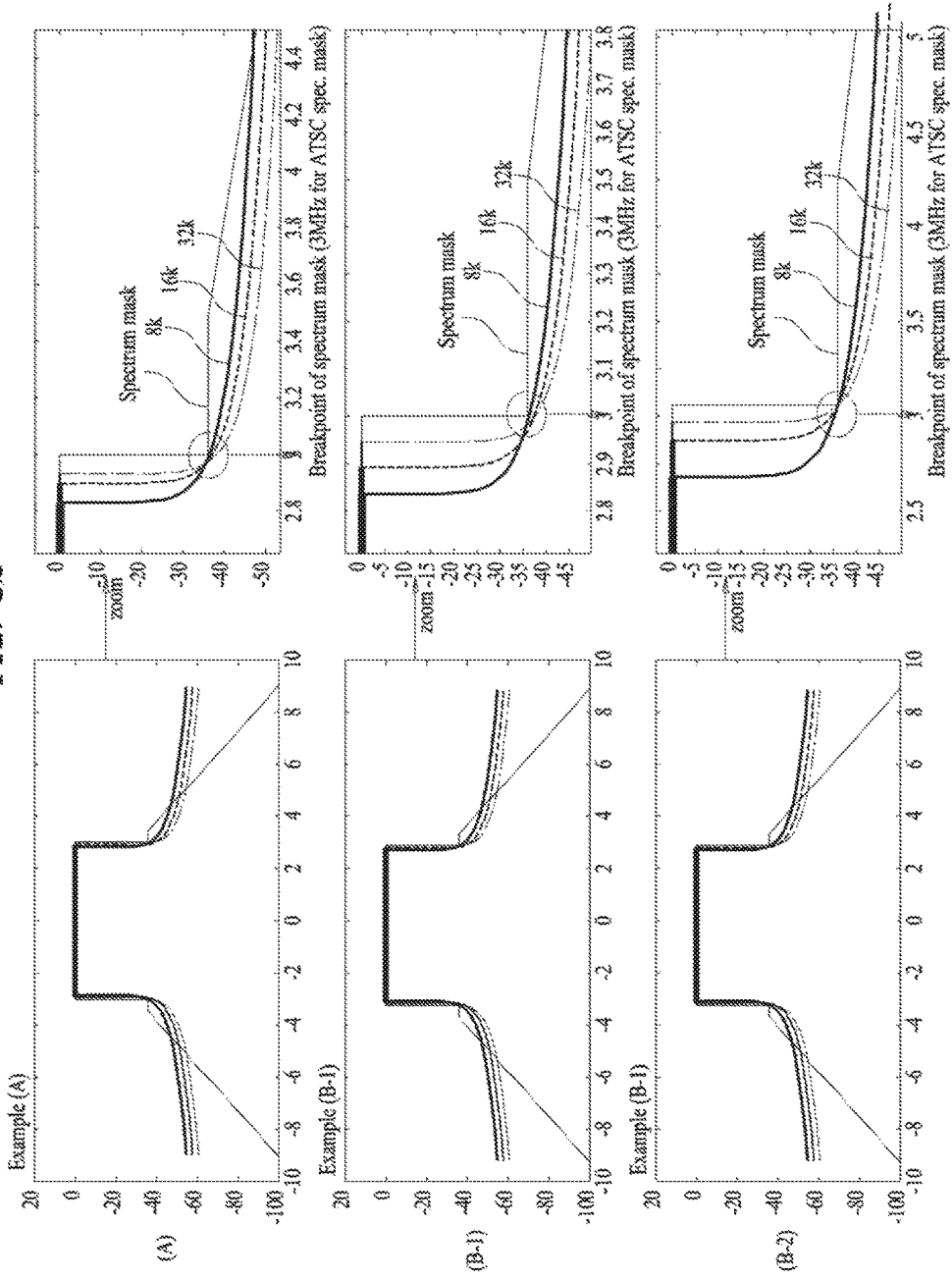
FIG. 32 is a graph illustrating a Power Spectral Density (PSD) of a transmit (Tx) signal according to an embodiment of the present invention.

FIG. 32 is a graph indicating Power Spectral Density (PSD) of a transmission (Tx) signal according to an embodiment of the present invention.

FIG. 32 shows the Power Spectral Density (PSD) calculated using the above-mentioned Tx parameters when the channel bandwidth is set to 6 MHz.

The left graph of FIG. 32(A) shows the PSD of the Tx signal optimized for the FCC spectrum mask of the example (A) of FIG. 29(A). The right graph of FIG. 32(A) shows the enlarged result of some parts of the left graph.

The left graph of FIG. 32(B-1) shows the PSD of the Tx signal optimized for the FCC spectrum mask of the example (B-1) of FIG. 29. The right graph of FIG. 31(B-1) shows the enlarged result of some parts of the left graph.

The left graph of FIG. 32(B-2) shows the PSD of the Tx signal optimized for the FCC spectrum mask of the example (B-2) of FIG. 30. The right graph of FIG. 32(B-2) shows the enlarged result of some parts of the left graph.

As shown in the right graph of (A), (B-1) and (B-2), individual graphs show not only lines for designating the FCC spectrum mask specification, but also lines indicating PSD of the Tx signal derived using Tx parameters corresponding to 8K, 16K and 32K.

In order to optimize the Tx signal efficiency as shown in FIG. 32, the PSD of each Tx signal need not exceed a threshold value of the spectrum mask at a breakpoint of the target spectrum mask. In addition, a band of the PSD of an out-of-band emission Tx signal may be limited by a baseband filter as necessary.

FIG. 33 is a table showing information related to the reception mode according to another embodiment of the present invention.

FIG. 33 shows another embodiment of the Table showing information related to the reception mode of FIG. 26. Table of FIG. 24 shows a network configuration, an FFT value (NFFT), a guard interval, and a vehicle speed, that correspond to each reception mode. The guard interval and the vehicle speed of FIG. 33 are identical to those of FIG. 28.

Since the fixed rooftop environment corresponds to a time-variant Tx channel environment, it is less affected by Doppler shift, such that a large-sized FFT such as 16K, 32K, etc. can be used. In addition, data transmission can be carried out in a manner that a higher data Tx efficiency can be achieved in the redundancy ratio such as the guard interval, the reference signal, etc. appropriate for the network configuration.

In case of the handheld portable environment, a low-level Doppler environment can be supported as the indoor/outdoor reception environments in consideration of mobility such as an adult walking speed, and FFT such as 8K, 16K, 32K, etc. capable of supporting a high frequency sensitivity can be used.

The handheld mobile environment must consider not only the walking speed of a receiving user, but also the moving speed of a vehicle, a train, etc. such that the handheld mobile environment can support the high Doppler environment, and can use 4K-, 8K-, and 16K-FFT capable of supporting a relatively low frequency sensitivity.

The guard interval according to an embodiment of the present invention may be established to support the same coverage level in consideration of the network configuration for each reception.

The following description proposes the pilot pattern used as a reference signal for Tx channel estimation and the pilot mode for the same Tx channel estimation on the basis of the above embodiments of the above-mentioned Tx parameters.

The broadcast signal transmission apparatus or the above-mentioned OFDM generation block 1030 according to the embodiment can insert a plurality of pilots into a signal frame generated from the frame building block 1020, and can OFDM-modulate the broadcast signals using the Tx parameters. Various cells contained in the OFDM symbol may be modulated using reference information (i.e., pilots). In this case, the pilots may be used to transmit information known to the broadcast signal receiver, and the individual pilots may be transmitted at a power level specified by a pilot pattern.

The pilots according to the embodiment of the present invention may be used for frame synchronization, frequency and time synchronization, channel estimation, etc.

The pilot mode according to the embodiment of the present invention may be specific information for indicating pilots which reduce overhead of Tx parameters and are established to transmit the optimized broadcast signal. The above-mentioned pilot pattern and pilot mode may equally be applied to the above-mentioned reception mode and network configuration. In addition, the pilot pattern and pilot mode according to the embodiment can be applied to data symbols contained in the signal frame.

Figure 34:
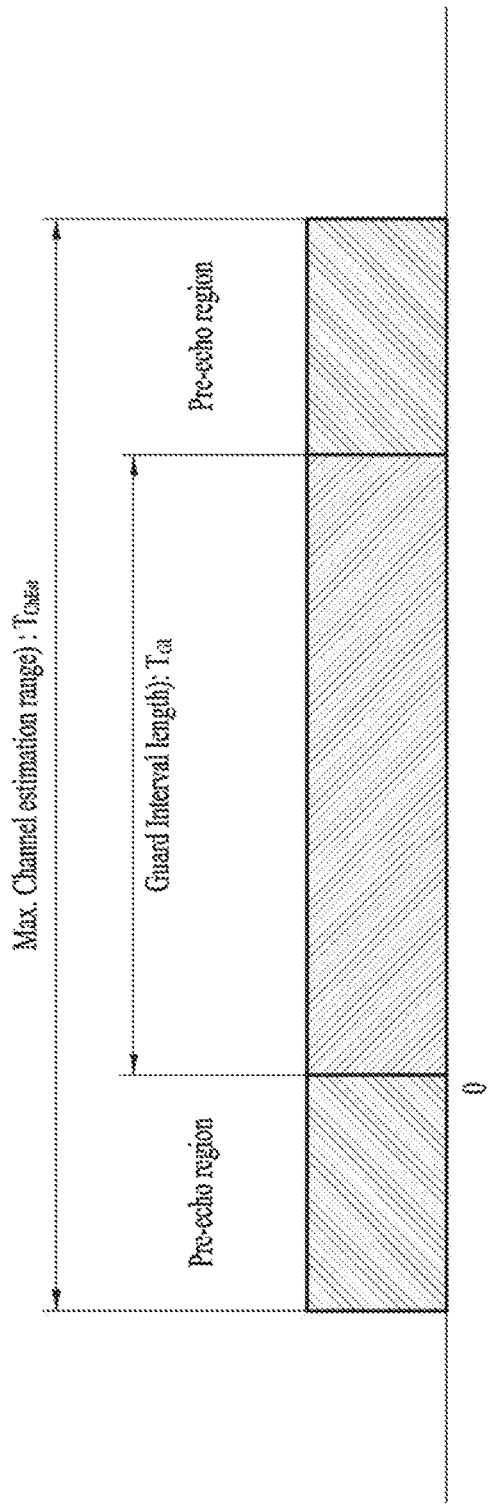
FIG. 34 is a relationship between a maximum channel estimation range and a guard interval according to an embodiment of the present invention.

FIG. 34 shows the relationship between a maximum channel estimation range and a guard interval according to the embodiment.

As described above, Math FIG. 9 is used to decide the effective signal bandwidth (eBW) of the Tx signal, and may use the pilot density scaling factor as an optimization parameter.

In this case, Math FIG. 9 may be decided by optimizing time- and frequency-arrangement of the pilot signal for SISO channel estimation, a pilot density related to data efficiency, and Dx and Dy values.

The pilot density may correspond to the product (Dx×Dy) of a distance between pilots of the time and frequency domains, and pilot overhead occupied by pilots of the symbol may correspond to the inverse of the pilot density.

Dx may denote a distance between pilots in a frequency domain, and Dy may denote a distance between pilots in a time domain. Dy may be used to decide the maximum tolerable Doppler speed. Accordingly, Dy may be set to a specific value that is optimized in consideration of the vehicle speed decided according to Rx scenario categories.

As described above, the pilot density may be used to decide the pilot overhead, and the Dx and Dy values may be decided in consideration of the Tx channel state and the Tx efficiency.

The maximum channel estimation range (TChEst) shown in FIG. 34 may be decided by dividing the Tx parameter (Tu) by the Dx value.

The guard interval having a predetermined length, the pre-echo region, and the post-echo region may be contained in the maximum channel estimation range.

The ratio of a given guard interval and a maximum channel estimation range may indicate a margin having a channel estimation range for estimating the guard interval. If the margin value of the channel estimation range exceeds the guard interval length, values exceeding the guard interval length may be assigned to the pre-echo region and the post-echo region. The pre-echo region and the post-echo region may be used to estimate the channel impulse response exceeding the guard interval length, and may be used as a region to be used for estimation and compensation of a timing error generable in a synchronization process. However, if the margin is increased in size, the pilot overhead is unavoidably increased so that Tx efficiency can be reduced.

Figure 36:
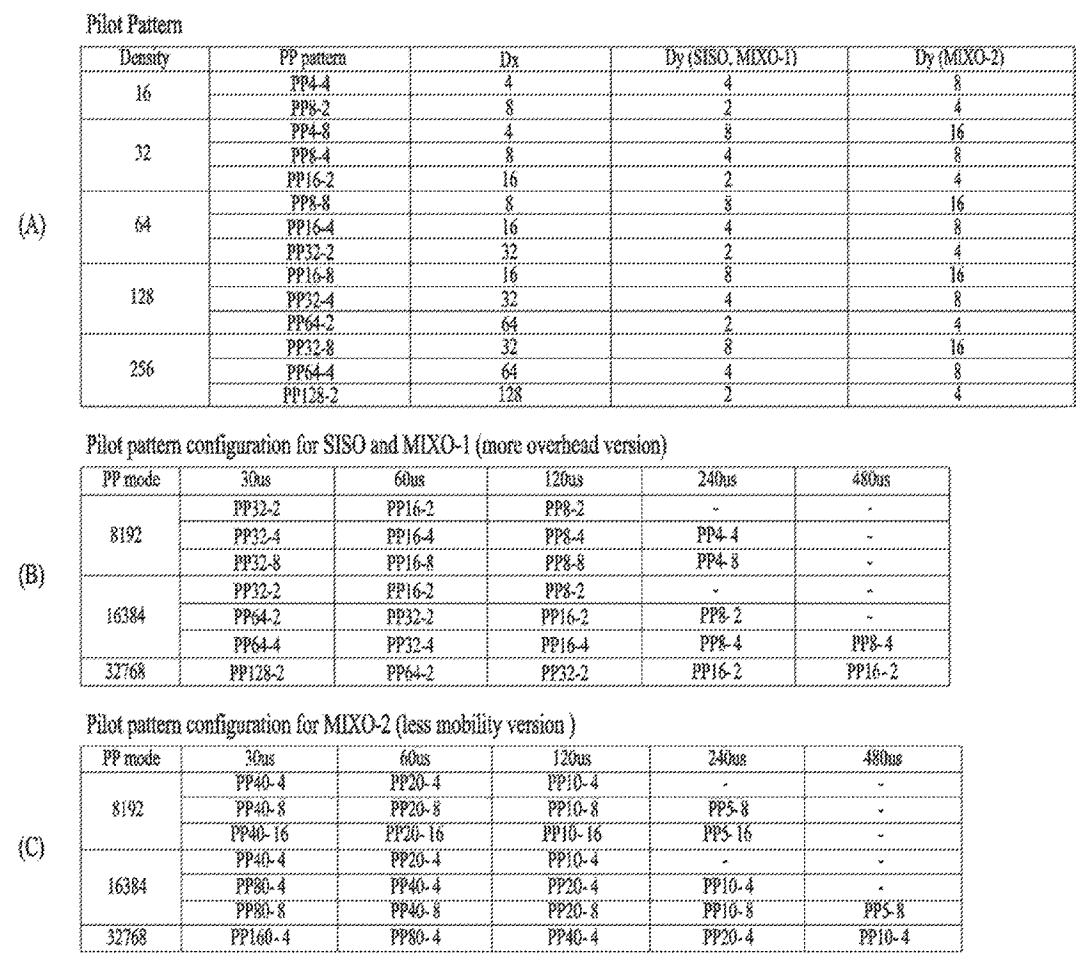

FIGS. 35 and 36 show Tables in which pilot parameters depending on the guard intervals (a) and (b) of FIG. 33 and the vehicle speed are defined, and the tables shown in FIGS. 35 and 36 will hereinafter be described in detail.

FIG. 35 shows a Table in which pilot parameters are defined according to an embodiment of the present invention.

FIG. 35 shows the pilot parameters according to the guard interval (a) and the vehicle speed. FIG. 35(A) is a table indicating pilot patterns for use in the SISO and MIXO Tx channels, FIG. 35(B) shows the configuration of a pilot pattern for use in the SISO and MIXO Tx channels, and FIG. 35(C) is a table indicating the configuration of a pilot pattern for use in the MIXO Tx channel.

In more detail, FIG. 35(A) shows the pilot pattern decided for each pilot density value and the Dx and Dy values defined in each of the SISO and MIXO Tx channels. The pilot pattern according to this embodiment may be denoted by PP5-4 in which a first number denotes the Dx value and a second number denotes the Dy value. If the Dx value in the same pilot density is reduced, the pilot pattern can support a longer delay spread. If the Dy value is reduced, the pilot pattern can adaptively cope with a faster Doppler environment.

FIG. 35(B) and FIG. 35(C) show Tables including the guard interval duration and the pilot pattern configuration depending on the FFT value. In more detail, numbers shown in the first row of each table shown in (B) and (C) may denote the guard interval duration. The first column may denote FFT (NFFT) values described in FIGS. 29 to 31. However, although FIGS. 35(B) and 35(C) equally show the configuration of the pilot pattern for use in the MIXO case, there is a difference in FIGS. 35(B) and 35(C) in that FIG. 35(B) shows the MIXO-1 pilot pattern having a larger pilot overhead, and FIG. 35(C) shows the MIXO-2 pilot pattern having a lower mobility.

The duration of the guard interval shown in FIGS. 35 (B) and 35(C) is conceptually identical to the guard interval length shown in FIG. 34. In accordance with the embodiment of the present invention, 25 μs, 50 μs, 100 μs, 200 μs, and 400 μs values may be used in consideration of the maximum delay spread, and the FFT size may be set to 8K, 16K and 32K.

As can be seen from (A), the Dx value may be set to 5, 10, 20, 40, 80, or 160 in consideration of the guard interval duration and the FFT size. In this case, an elementary Dx value (5) acting as a basic value may be defined as a changeable value depending on each Tx mode, and may be established in consideration of about 20% of the margin value of the above-mentioned channel estimation range. In addition, according to one embodiment of the present invention, the margin value of the channel estimation range may be coordinated or adjusted using the Lalpha1 value in MFN and using the Lalpha2 value in SFN as shown in FIGS. 28(A) and 28 (B). The Dy value may be established according to a reception (Rx) scenario and the Tx mode dependent upon the Rx scenario. Accordingly, the Dy value may be assigned different values according to the SISO or MIXO Tx channel. As shown in the drawing, Dy may be set to 2, 4 or 8 in case of the SISO Tx channel according to an embodiment of the present invention.

The MIXO Tx channel is classified into the MIXO-1 version having large pilot overhead and the MIXO-2 version having lower mobility, such that the Dy value can be established in different ways according to individual versions.

The MIXO-1 version having large overhead increases the pilot overhead, so that I can support the same maximum delay spread and the same maximum mobile speed in the same network configuration as in the SISO Tx channel. In this case, the Dy value may be set to 2, 4 or 8 in the same manner as in the SISO Tx channel. That is, the MIXO-1 Tx channel can be applied not only to the above-mentioned handheld portable environment but also the handheld mobile environment.

The MIXO-2 version having low mobility is designed to guarantee the same coverage and capacity as in the SISO Tx channel although the MIXO-2 version has a little damage in terms of the mobile speed support. In this case, the Dy value may be set to 4, 8, or 16.

FIG. 36 shows a Table in which pilot parameters of another embodiment are defined.

In more detail, FIG. 36 shows the pilot parameters according to the guard interval (B) of FIG. 33 and the vehicle speed. FIG. 36(A) is a table indicating pilot patterns for use in the SISO and MIXO Tx channels, FIG. 36(B) shows the configuration of a pilot pattern for use in the SISO and MIXO Tx channels, and FIG. 36(C) is a table indicating the configuration of a pilot pattern for use in the MIXO Tx channel.

Functions and contents of the pilot parameters shown in FIG. 36 are identical to those of FIG. 35, and as such a detailed description thereof will herein be omitted for convenience of description.

The structure and location of pilots for MIXO (MISO, MIMO) Tx channel estimation may be established through the above-mentioned pilot patterns. The null encoding and the Hadamard encoding scheme may be used as the pilot encoding scheme for isolating each Tx channel according to one embodiment of the present invention.

The following Math FIG. 10 may be used to indicate the null encoding scheme.

$$\begin{bmatrix} y_{tx1} \\ y_{tx2} \end{bmatrix} = \begin{bmatrix} 1 & 0 \\ 0 & 1 \end{bmatrix} \begin{bmatrix} p_{tx1} \\ p_{tx2} \end{bmatrix}$$ [Math Figure 10]

The null encoding scheme has no channel interference in estimating respective channels, the channel estimation error can be minimized, and an independent channel can be easily estimated in the case of using symbol timing synchronization. However, since the pilot gain must be amplified to derive a channel estimation gain, the influence of Inter Channel Interference (ICI) of contiguous data caused by the pilot based on a time-variant channel is relatively high. In addition, if the pilots to be allocated to individual channels according to the pilot arrangement have different locations, the SNR of effective data may be changed per symbol. The MIXO-1 pilot pattern according to the above-mentioned embodiment may also be effectively used even in the null encoding scheme, and a detailed description thereof will hereinafter be given.

The following Math FIG. 11 may be used to indicate the null encoding scheme.

$$\begin{bmatrix} y_{tx1} \\ y_{tx2} \end{bmatrix} = \begin{bmatrix} 1 & 1 \\ 1 & -1 \end{bmatrix} \begin{bmatrix} p_{tx1} \\ p_{tx2} \end{bmatrix}$$ [Math Figure 11]

In case of the Hadamard encoding scheme, the Hadamard encoding scheme can perform channel estimation through simple linear calculation, and can obtain a gain caused by the noise average effect as compared to the null encoding scheme. However, the channel estimation error encountered in the process for obtaining an independent channel may unexpectedly affect other channels, and there may occur ambiguity in the symbol timing synchronization using pilots.

The broadcast signal transmission apparatus according to the embodiment of the present invention may establish the above-mentioned two encoding schemes described as the MIXO pilot encoding scheme according to the reception (Rx) scenario and the Tx channel condition in response to a predetermined mode. The broadcast signal reception apparatus according to the embodiment may perform channel estimation through a predetermined mode.

Figure 37:
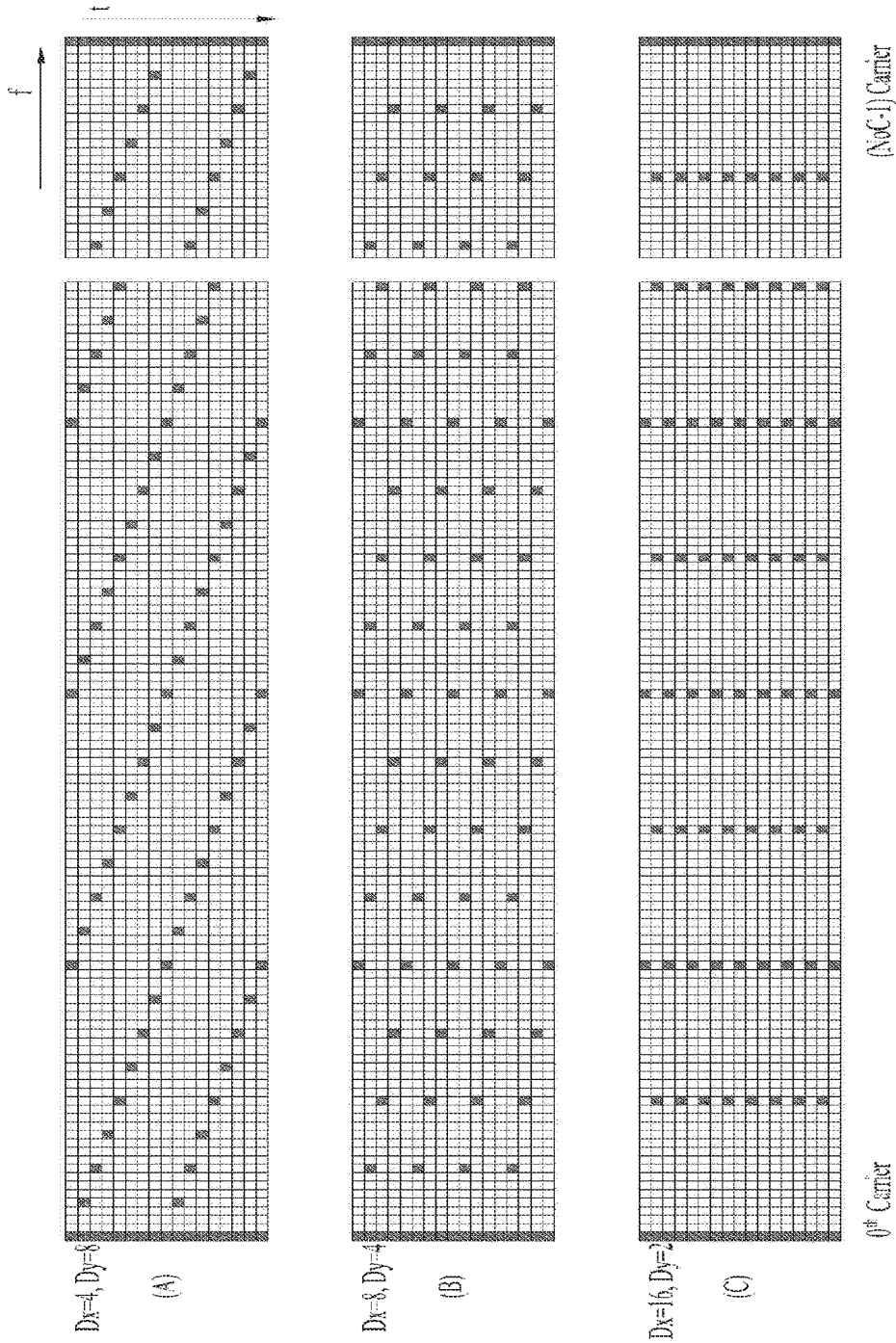
FIG. 37 is a SISO pilot pattern according to an embodiment of the present invention.

FIG. 37 shows the SISO pilot pattern according to an embodiment of the present invention.

The pilot pattern shown in FIG. 37 indicates the SISO pilot pattern for use in the case in which the pilot density of FIG. 36 is set to 32.

As described above, the pilots may be inserted into a data symbol region of the signal frame. In FIG. 37, a horizontal axis of the pilot pattern may denote a frequency axis, and a vertical axis thereof may denote a time axis. In addition, pilots successively arranged at both ends of the pilot pattern may indicate reference signals that are inserted to compensate for distortion at the edge of a spectrum generated by channel estimation.

In more detail, FIG. 37(A) shows an exemplary pilot pattern denoted by PP4-8, FIG. 37(B) shows an exemplary pilot pattern denoted by PP8-4, and FIG. 37(C) shows an exemplary pilot pattern denoted by PP16-2. In other words, as can be seen from FIG. 37(A), pilots may be periodically input in units of 4 carriers on the frequency axis, and each pilot may be input in units of 8 symbols on the time axis. FIG. 37(B) and FIG. 37(C) also illustrate pilot patterns having been input in the same manner.

The pilot pattern of another pilot density shown in FIG. 36 may be denoted by coordination of the Dx and Dy values.

Figure 38:
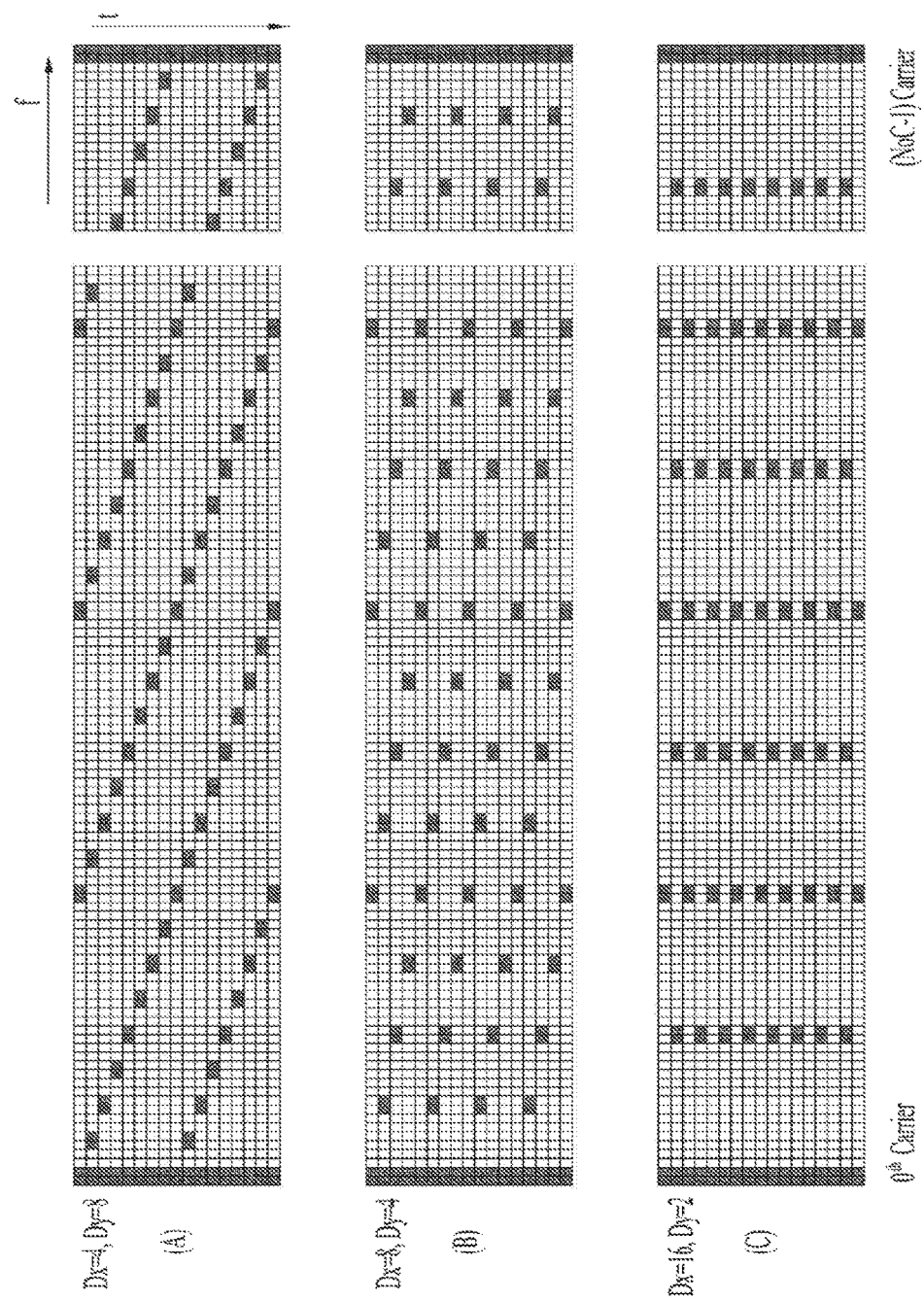
FIG. 38 is a MIXO-1 pilot pattern according to an embodiment of the present invention.

FIG. 38 shows the MIXO-1 pilot pattern according to an embodiment of the present invention.

The pilot pattern of FIG. 38 shows the MIXO-1 pilot pattern for use in the case that the pilot density of FIG. 36 is set to 32. The pilot pattern of FIG. 38 is used in the case that two Tx antennas exist.

As described above, a horizontal axis of the pilot pattern may denote a frequency axis, and a vertical axis of the pilot pattern may denote a time axis. The pilots successively arranged at both edges of the pilot pattern may be reference signals that have been inserted to compensate for distortion at a spectrum edge encountered in the channel estimation process.

In more detail, (A) may denote an exemplary case in which the pilot pattern is denoted by PP4-8, (B) may denote an exemplary case in which the pilot pattern is denoted by PP8-4, and (C) may denote an exemplary case in which the pilot pattern is denoted by PP16-2.

In order to discriminate among the individual MIXO Tx channels, pilots transmitted to the respective Tx channels may be arranged contiguous to each other in the frequency domain according to an embodiment of the present invention. In this case, the number of pilots allocated to two Tx channels within one OFDM symbol is set to the same number.

As shown in the drawing, the MIXO-1 pilot pattern according to an embodiment has an advantage in that a data signal is arranged at the next position of a channel estimation pilot even when a reference signal for synchronization estimation is arranged, so that correlation between signals is reduced at the same carrier and the synchronization estimation throughput is not affected by the reduced correlation.

In case of the MIXO-1 pilot pattern according to an embodiment, even when the broadcast signal transmission apparatus performs pilot encoding using the above-mentioned null encoding scheme, broadcast signals having the same Tx power can be transmitted to the individual Tx antennas, such that the broadcast signals can be transmitted without additional devices or modules for compensating for variation of Tx signals. That is, in case of using the MIXO-1 pilot pattern according to an embodiment, the MIXO-1 pilot pattern is not affected by the pilot encoding scheme, and pilot power is coordinated by the pilot encoding scheme, such that the channel estimation throughput of the broadcast signal reception apparatus can be maximized.

The pilot pattern of another pilot density shown in FIG. 36 may be denoted by coordination of the Dx and Dy values.

Figure 39:
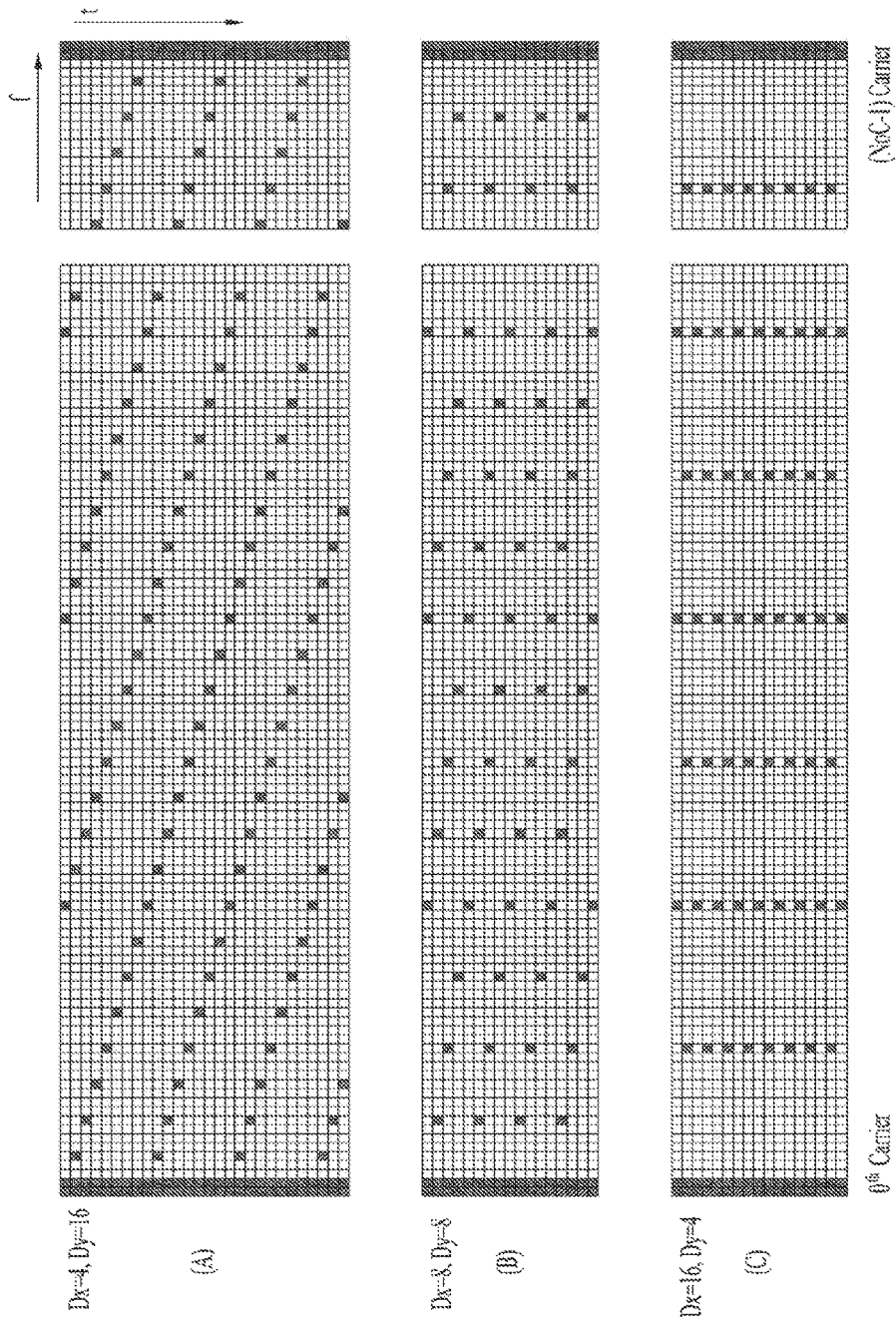
FIG. 39 is a MIXO-2 pilot pattern according to an embodiment of the present invention.

FIG. 39 shows the MIXO-2 pilot pattern according to an embodiment of the present invention.

The pilot pattern of FIG. 39 shows the MIXO-2 pilot pattern for use in the case that the pilot density of FIG. 36 is set to 32. The pilot pattern of FIG. 39 is used in the case that two Tx antennas exist.

As described above, a horizontal axis of the pilot pattern may denote a frequency axis, and a vertical axis of the pilot pattern may denote a time axis. The pilots successively arranged at both edges of the pilot pattern may be reference signals that have been inserted to compensate for distortion at a spectrum edge encountered in the channel estimation process.

In more detail, (A) may denote an exemplary case in which the pilot pattern is denoted by PP4-16, (B) may denote an exemplary case in which the pilot pattern is denoted by PP8-8, and (C) may denote an exemplary case in which the pilot pattern is denoted by PP16-4.

As described above, the MIXO-2 pilot pattern is designed to cut the supported mobility in half, instead of supporting the same capacity, the same pilot overhead, and the same coverage as those of the SISO Tx channel.

Tx channels are semi-statically used in the reception scenario in which the UHDTV service must be supported so that the serious problem does not occur. The MIXO-2 pilot pattern according to an embodiment can be used to maximize the data Tx efficiency in the reception scenario in which the UHDTV service must be supported.

The pilot pattern of another pilot density shown in FIG. 36 may be denoted by coordination of the Dx and Dy values.

Figure 40:
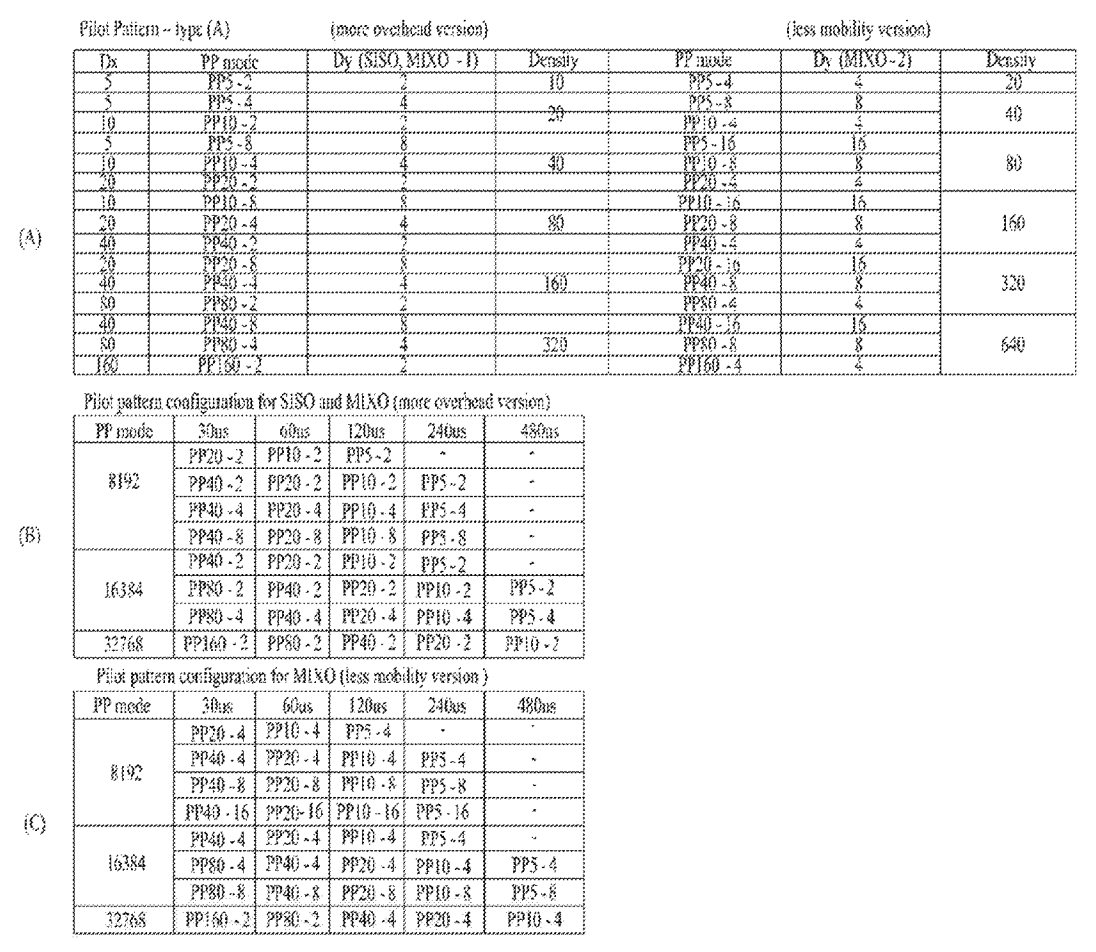
Figure 41:
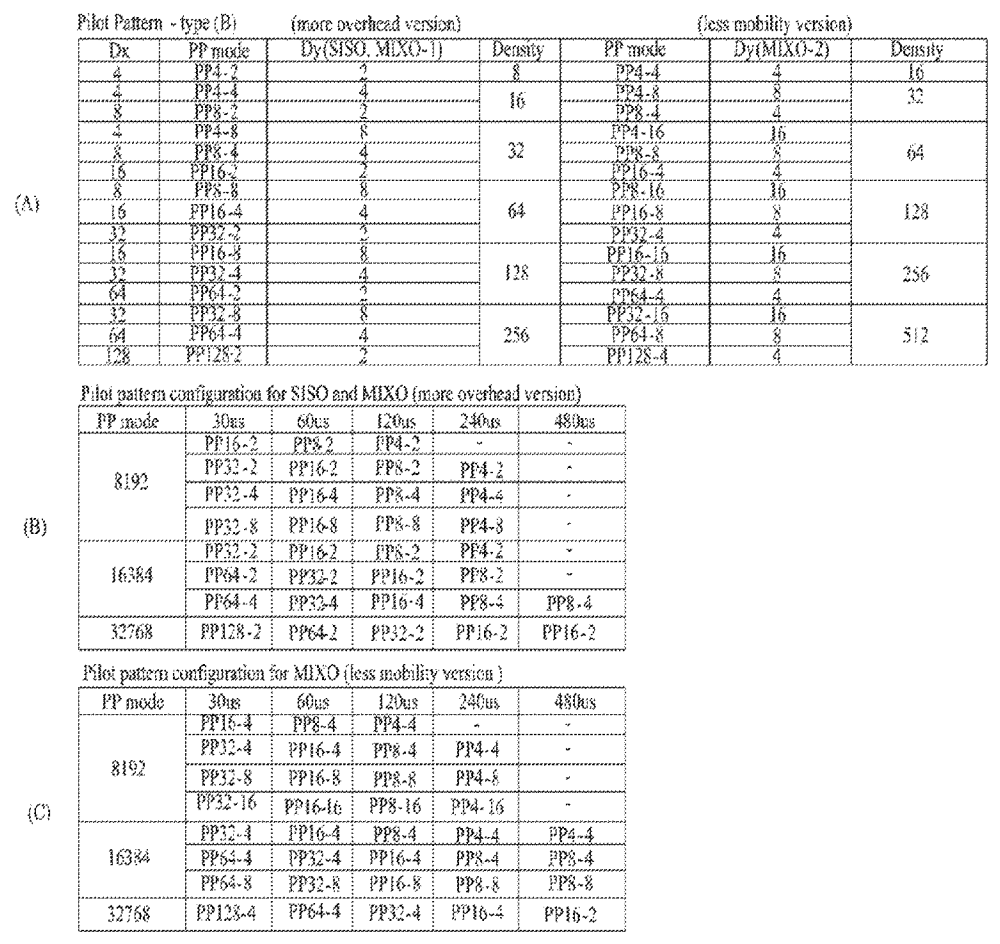

FIGS. 40 and 41 show Tables in which pilot parameters depending on the guard intervals (a) and (b) of FIG. 33 and the vehicle speed are defined, and the tables shown in FIGS. 40 and 41 will hereinafter be described in detail.

FIG. 40 shows a Table in which pilot parameters are defined according to an embodiment of the present invention.

FIG. 40 shows the pilot parameters according to the guard interval (a) and the vehicle speed. FIG. 40(A) is a table indicating pilot patterns for use in the SISO and MIXO Tx channels, FIG. 40(B) shows the configuration of a pilot pattern for use in the SISO and MIXO Tx channels, and FIG. 40(C) is a table indicating the configuration of a pilot pattern for use in the MIXO Tx channel.

In more detail, FIG. 40(A) shows the pilot pattern decided for each pilot density value and the Dx and Dy values defined in each of the SISO and MIXO Tx channels. The Dx and Dy values are classified into a first version (SISO, MIXO-1) having a large pilot overhead and a second version (MIXO-2) having lower mobility. The pilot pattern according to this embodiment may be denoted by PP5-2 in which a first number denotes the Dx value and a second number denotes the Dy value. If the Dx value in the same pilot density is reduced, the pilot pattern can support a longer delay spread. If the Dy value is reduced, the pilot pattern can adaptively cope with a faster Doppler environment.

Compared to FIG. 35, FIG. 40(A) shows that the pilot density is changed to 10, 20, 40, 80, 160, and 320 in case of SISO and MIXO-1, and the PP5-2 mode is added. In addition, the pilot density is changed to 20, 40, 80, 160, 320, and 640 in case of MIXO-2, and the PP5-4 mode is added.

FIG. 40(B) and FIG. 40(C) show Tables including the guard interval duration and the pilot pattern configuration depending on the FFT value. In more detail, numbers shown in the first row of each table shown in (B) and (C) may denote the guard interval duration. The first column may denote FFT (NFFT) values described in FIGS. 29 to 31. However, although FIGS. 40(B) and 40(C) equally show the configuration of the pilot pattern for use in the MIXO case, there is a difference in FIGS. 40(B) and 40(C) in that FIG. 40(B) shows the MIXO-1 pilot pattern having a larger pilot overhead, and FIG. 40(C) shows the MIXO-2 pilot pattern having a lower mobility.

Compared to FIG. 35, a pilot mode denser than Dy=2 is added to 8K of the per-version table supported by FIG. 40. Compared to FIG. 35, PP5-2, PP10-2, and PP20-2 modes are added to FIG. 40(B), and PP5-4, PP10-4, and PP20-4 modes are added to FIG. 40(C).

The duration of the guard interval shown in FIGS. 40(B) and 40(C) is conceptually identical to the guard interval length shown in FIG. 34. In accordance with the embodiment of the present invention, 25 µs, 50 µs, 100 µs, 200 µs, and 400 µs values may be used in consideration of the maximum delay spread, and the FFT size may be set to 8K, 16K and 32K.

As can be seen from (A), the Dx value may be set to 5, 10, 20, 40, 80, or 160 in consideration of the guard interval duration and the FFT size. In this case, an elementary Dx value (5) acting as a basic value may be defined as a changeable value depending on each Tx mode, and may be established in consideration of about 20% of the margin value of the above-mentioned channel estimation range. In addition, according to one embodiment of the present invention, the margin value of the channel estimation range may be coordinated or adjusted using the Lalpha1 value in MFN and using the Lalpha2 value in SFN as shown in FIGS. 28(A) and 28 (B). The Dy value may be established according to a reception (Rx) scenario and the Tx mode dependent upon the Rx scenario. Accordingly, the Dy value may be assigned different values according to the SISO or MIXO Tx channel. As shown in the drawing, Dy may be set to 2, 4 or 8 in case of the SISO Tx channel according to an embodiment of the present invention.

The MIXO Tx channel is classified into the MIXO-1 version having large pilot overhead and the MIXO-2 version having lower mobility, such that the Dy value can be established in different ways according to individual versions.

The MIXO-1 version having large overhead increases the pilot overhead, so that I can support the same maximum delay spread and the same maximum mobile speed in the same network configuration as in the SISO Tx channel. In this case, the Dy value may be set to 2, 4 or 8 in the same manner as in the SISO Tx channel. That is, the MIXO-1 Tx channel can be applied not only to the above-mentioned handheld portable environment but also the handheld mobile environment.

The MIXO-2 version having low mobility is designed to guarantee the same coverage and capacity as in the SISO Tx channel although the MIXO-2 version has a little damage in terms of the mobile speed support. In this case, the Dy value may be set to 4, 8, or 16.

FIG. 41 shows a Table in which pilot parameters of another embodiment are defined.

In more detail, FIG. 41 shows the pilot parameters according to the guard interval (b) and the vehicle speed. FIG.

41(A) is a table indicating pilot patterns for use in the SISO and MIXO Tx channels, FIG. 41(B) shows the configuration of a pilot pattern for use in the SISO and MIXO Tx channels, and FIG. 41(C) is a table indicating the configuration of a pilot pattern for use in the MIXO Tx channel.

Compared to FIG. 36, a pilot mode denser than Dy=2 is added to 8K of the per-version table supported by FIG. 41. Compared to FIG. 36, FIG. 41(A) shows that the pilot density is changed to 8, 16, 32, 64, 128, and 256 in case of SISO and MIXO-1, and the PP4-2 mode is added. In addition, the pilot density is changed to 16, 32, 64, 128, 256, and 512 in case of MIXO-2, and the PP4-4 mode is added. Compared to FIG. 35, as can be seen from FIG. 41(B), PP4-2, PP8-2, and PP16-2 modes are added. As can be seen from FIG. 41(C), the Dx value is changed from 5, 10, 20, 40, 80, and 160 to 4, 8, 16, 32, 64, and 128, and the PP4-4, PP8-4, and PP16-4 modes are added.

Functions and contents of the pilot parameters shown in FIG. 41 are identical to those of FIG. 40, and as such a detailed description thereof will herein be omitted for convenience of description.

Figure 42:
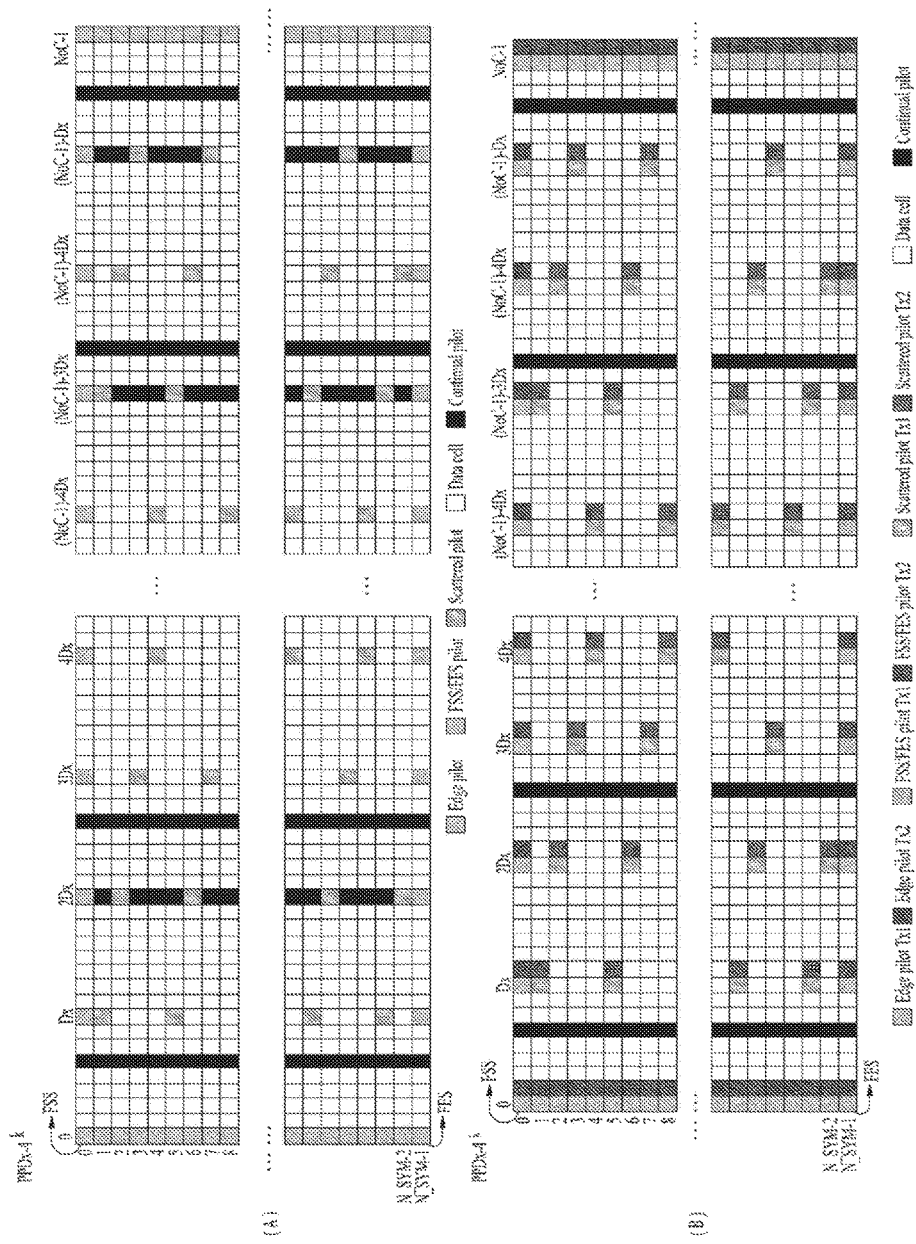
FIG. 42 shows a pilot structure contained in a frame according to an embodiment of the present invention.

FIG. 42 shows a pilot structure contained in a frame according to an embodiment of the present invention.

Referring to FIG. 42(A), (A) shows the pilot structure of the SISO mode.

In FIG. 42, a horizontal axis of the pilot pattern may denote a frequency axis, and a vertical axis thereof may denote a time axis. Pilots may be inserted into a data symbol region of the signal frame. OFDM Generation block 1030 or Pilot and Reserved Tone Insertion block 8000 may insert one or more pilots into a signal frame.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots.

Each pilot is transmitted at a particular boosted power level according to pilot type and pilot pattern. The value of the pilot information is derived from a reference sequence, which is a series of values, one for each transmitted carrier on any given symbol.

The pilots can be used for frame synchronization, frequency synchronization, time synchronization, channel estimation, and transmission mode identification, and also can be used to follow the phase noise.

Scattered pilots are reference information taken from the reference sequence. And scattered pilots are inserted in every symbol except for the preamble symbol, FSS and FES of the frame.

Continual pilots are inserted in every symbol of the frame. The number and location of continual pilots depends on both the FFT size and the scattered pilot pattern.

Edge pilots are inserted in every symbol except for the preamble symbol, FSS(s) and FES. They are inserted in order to allow frequency interpolation up to the edge of the spectrum. Edge pilots successively arranged at both edges of the pilot pattern may be reference signals inserted to compensate for distortion at a spectrum edge generated by channel estimation. The modulation of these cells is exactly the same as for the scattered pilots.

FSS pilots are inserted in FSS(s) and FES pilots are inserted in FES. They are inserted in order to allow time interpolation up to the edge of the frame. In accordance with one embodiment of the present invention, in case of FSS/FES, a pilot is inserted into Dx (i.e., an effective pilot distance after completion of time interpolation in a frequency domain) established to facilitate time interpolation for channel estimation, so that the density becomes higher as compared to the normal data symbol.

Different optimum values may be assigned to (FSS/FES or normal data symbol) pilot boosting levels according to functions and locations of symbols of the frame. If it is assumed that the power of a predetermined symbol is used, if the boosting level of the pilot increases, and if a low SNR occurs in a relatively low data carrier, and if the boosting level becomes lower, the channel estimation throughput is deteriorated whereas the SNR of the data carrier becomes higher.

Therefore, the boosting level must be decided in consideration of the pilot pattern and the pilot density of each symbol in such a manner that the equalized data SNR is maximized.

FIG. 42(B) shows the pilot structure of the MIMO mode. In accordance with the transmit (Tx) mode, pilots for use in MIMO are arranged in a manner that MIMO channel estimation can be more easily achieved as compared to SISO.

The pilot pattern of FIG. 42 relates to the case in which two Tx antennas are used. Therefore, scattered pilots, edge pilots, FSS (frame signaling symbol) pilots, and FES (frame edge symbol) pilots for use in each case are present in a single signal frame.

In order to make a distinction between MIXO Tx channels, pilots transferred to each Tx channel are located contiguous to each other in the frequency domain according to an embodiment of the present invention. In this case, the same number of pilots may be allocated to two Tx channels within one OFDM symbol.

Functions and contents of the pilot parameters shown in (B) are identical to those of (A), and as such a detailed description thereof will herein be omitted for convenience of description.

FIG. 43 shows a Table in which pilot parameters are defined according to an embodiment of the present invention.

FIG. 43 shows the pilot parameters according to the SISO and MIXO-1 transmission channels. FIG. 43(A) is a table indicating pilot patterns for use in the SISO and MIXO-1 Tx channels, FIG. 43(B) shows the configuration of a pilot pattern for use in the SISO Tx channels, and FIG. 43(C) is a table indicating the configuration of a pilot pattern for use in the MIXO Tx channel.

In more detail, FIG. 43(A) shows the pilot pattern decided for each pilot density value and the Dx and Dy values defined in each of the SISO and MIXO-1 Tx channels.

As can be seen from (A), the pilot density for use in the SISO and MIXO-1 Tx channels may be set to 8, 16, 32, 64, 128, and 256. In accordance with one embodiment, Dx may be set to 4, 8, 16, 32, 64, and 128 in consideration of the duration and FFT size of the guard interval. In accordance with one embodiment, Dy may be set to 2 and 4 in case of the SISO and MIXO-1 Tx channels.

FIG. 43(B) and FIG. 43(C) show Tables including the guard interval duration and the pilot pattern configuration depending on the FFT value. In more detail, numbers shown in the first row of each table shown in (B) and (C) may denote the guard interval duration. A maximum delay spread may be set to 240 μs as an example.

The first column shown in (B) and (C) may denote FFT (NFFT) values described in FIGS. 29 to 31. However, although FIGS. 43(B) and 43(C) equally show the configuration of the pilot pattern, there is a difference in FIGS. 43(B) and 43(C) in that FIG. 43(B) shows the SISO pilot pattern having a larger pilot overhead, and FIG. 43(C) shows the MIXO pilot pattern having a lower mobility.

The duration of the guard interval shown in FIGS. 43 (B) and 43(C) is conceptually identical to the guard interval length shown in FIG. 34. In accordance with the embodiment of the present invention, 25 µs, 50 µs, 100 µs, and 200 µs values may be used in consideration of the maximum delay spread, and the FFT size may be set to 8K, 16K and 32K.

The SISO mode for supporting the base and hand-held profiles may support the mobile/fixed services for the K and 16K modes, and may support the fixed service for the 32K mode.

In addition, during the MIMO mode supporting the advanced profile, the same pattern as in SISO can be supported in the 16K and 32K modes.

In accordance with the embodiment, pilot densities inserted in respective symbols are different from each other as can be seen from the pilot pattern contained in the frame, so that there is a need to coordinate the amplitude level of the pilot.

The amplitude level of the pilot may affect the channel estimation gain, and may also affect the power of a data cell (carrier) within the limited Tx power, resulting in implementation of a trade-off relationship. Therefore, the amplitude level of the pilot must be optimized to maximize the SNR of the final equalized data cell (carrier).

Math FIG. 12 shows the SNR of the channel estimation according to an embodiment of the present invention.

$$SNR_{Channel\text{-}Estimate} = \frac{(A_{SP}^2)SNR_{Data}}{f_{INT}} = \frac{B_{SP}SNR_{Data}}{f_{INT}} \quad \text{[Math Figure 12]}$$

In Math FIG. 12, Asp may denote the scattered pilot amplitude, Bsp may denote (Asp)$^2$ and scattered pilot power, $SNR_{Data}$ may denote the SNR for data cell, and fixr may denote interpolation filter gain.

Math FIG. 13 shows the approximation of SNR with respect to a data cell of EQ output according to an embodiment of the present invention.

$$\frac{1}{SNR_{EQ\text{-}data}} \approx \frac{1}{SNR_{Data}} + \frac{1}{SNR_{Channel\text{-}Estimate}} \quad \text{[Math Figure 13]}$$

$$\approx \frac{1}{SNR_{Data}}\left(1 + \frac{f_{INT}}{B_{BP}}\right)$$

In Math FIG. 13, SNRData may denote the SNR for data cell, SNRChannel-Estimate may denote the SNR of channel estimation, fINT may denote the interpolation filter gain, and Bsp may denote (Asp)2 and scattered pilot power.

As described above, the amplitude level of the pilot may affect the channel estimation gain, and at the same time may also affect the power of data cell (carrier), so that the channel estimation gain based on the pilot level and the power loss of the data cell must be considered according to the pilot density.

In addition, the channel values of all carrier positions can be obtained as the channel estimation resultant value. In this case, the SNR of EQ output may be affected by the gain of the interpolation filter.

Math FIG. 14 shows the interpolation filter gain according to an embodiment of the present invention.

$$f_{int\_ti} \times f_{int\_fi} \quad \text{[Math FIG. 14]}$$

In Math FIG. 14, fint_ti may denote the interpolation filter gain of a time domain, and fint_fi may denote the interpolation filter gain of a frequency domain.

In accordance with the embodiment, fint_ti may be used to decide a reference value on the basis of a noise reduction gain based on linear Interpolation, and fint_fi may be used to decide a reference value used for deriving a target interpolation gain with respect to a noise reduction gain based on various channel environments.

For example, if Dy is set to 2, fint_ti may be set to 0.6875. If Dy is set to 4, fint_ti may be set to 0.75. In addition, fint_fi may also be set to 0.5.

FIG. 44 shows scattered pilot amplitude values optimized for respective pilot patterns according to an embodiment of the present invention.

In accordance with the embodiment, the amplitudes of the scattered pilots (Asp) may be optimized according to the pilot pattern, the mode type, and the symbol type.

Accordingly, pilots optimized for individual networks are distributed and arranged, so that the pilot amplitudes need to be separately optimized according to the pilot pattern.

In accordance with the embodiment, the boosting level of the pilot may be determined in consideration of the frame structure.

In accordance with the embodiment, the mode type may include SISO, MIXO (MIMO and MISO). In addition, since the pilot density of the pilot mode is higher than that of the SISO mode, parameters of respective modes can be established.

In accordance with the embodiment, the symbol type may include Frame Signaling Symbol (FSS), Frame Edge Symbol (FES), and Normal data symbol.

FSS and FES are symbols including dense pilots located at both ends of the frame, and are designed in a manner that the frequency interpolation can be independently carried out. Accordingly, the pilot density is dependent upon the Dx value so that the pilot amplitude can be optimized.

In accordance with the embodiment of the present invention, a normal data symbol has pilot arrangement of Dx and Dy designed appropriate for the network, time interpolation is performed between the symbols, and the pilot density of each symbol is the product of Dx and Dy. Therefore, the pilot density is dependent upon the Dx and Dy values, so that the pilot amplitude can be optimized.

Referring to FIG. 44, (A) shows the scattered pilot amplitude values optimized for individual pilot patterns in case of using the normal data symbol. In FIG. 44(A), a horizontal axis is a pilot pattern, and a vertical axis is a mode type.

In the normal data symbol and the SISO mode, if the pilot pattern is set to PP4-2, PP4-4, PP8-2, PP8-4, PP1-2, PP16-4, PP32-2, PP32-4, PP64-2, PP64-4, and PP128-2, the amplitudes of the scattered pilots (Asp) optimized for each pilot pattern may be set to 1.4475, 1.5067, 1.5395, 1.8056, 1.8466, 2.1564, 2.2046, 2.5710, 2.6268, 3.0594, and 3.1273, respectively.

In the normal data symbol and the MIMO mode, if the pilot pattern is set to PP8-2, PP8-4, PP16-2, PP16-4, PP32-2, PP32-4, PP64-2, PP64-4, and PP128-2, the amplitudes of the scattered pilots (Asp) optimized for each pilot pattern may be set to 1.2728, 1.5067, 1.5395, 1.8056, 1.8466, 2.1564, 2.2046, 2.5710, and 2.6268, respectively.

Referring to FIG. 44, (B) shows the scattered pilot amplitude values optimized for each pilot pattern in case of FSS and FES. In FIG. 44(B), a horizontal axis denotes a pilot pattern, and a horizontal axis denotes a mode type.

The frame signaling and frame edge symbol pilots are transmitted at boosted levels. Boosted levels of the frame signaling and frame edge symbol pilots depend on the distance between pilot bearing carriers (Dx) for each scattered pilot pattern.

In FSS/FES and SISO mode, if Dx is set to 4, 8, 16, 32, 64, and 128, the amplitudes of the scattered pilots (Asp) optimized for each pilot pattern may be set to 1.1045, 1.3675, 1.6553, 1.9850, 2.3685, and 2.8231, respectively.

In the FSS/FES and MIMO mode, if Dx is set to 8, 16, 32, 64, and 128, the amplitudes of the scattered pilots (Asp) optimized for each pilot pattern may be set to 1.1045, 1.3675, 1.6553, 1.9850, and 2.3685, respectively.

As described above, the optimum amplitudes of the scattered pilots (Asp) may have the same value in FSS and FES.

FIG. 45 shows an average value of scattered pilot amplitudes optimized for the same pilot density according to an embodiment of the present invention.

The values shown in FIG. 45 are obtained by averaging the scattered pilot amplitude values optimized for respective pilot patterns of FIG. 44 according to the same pilot density. Therefore, some configurations and contents of FIG. 45 are identical to those of FIG. 44, and as such a detailed description thereof will herein be omitted for convenience of description and better understanding of the present invention.

Referring to FIG. 45, (A) shows an average value of the scattered pilot amplitudes optimized for the same pilot density in case of the normal data symbol. In FIG. 45(A), a horizontal axis denotes a pilot pattern, and a vertical axis denotes a mode type.

In the normal data symbol and SISO mode, if the pilot density (Dx×Dy) is set to 8, 16, 32, 64, 128, or 256, the average value of the optimum amplitudes of the scattered pilots (Asp) is set to 1.26, 1.52, 1.83, 2.18, 2.60, or 3.09.

In the normal data symbol and MIMO mode, if the pilot density (Dx×Dy) is set to 16, 32, 64, 128, or 256, the average value of the optimum amplitudes of the scattered pilots (Asp) is set to 1.26, 1.52, 1.83, 2.18, or 2.60.

Referring to FIG. 45, (B) shows an average value of the scattered pilot amplitudes optimized for the same pilot density in case of FSS and FES. In FIG. 45(B), a horizontal axis denotes a pilot pattern, and a vertical axis denotes a mode type.

In the FSS/FES and SISO mode, if Dx is set to 4, 8, 16, 32, 64, or 128, the average value of the optimum amplitudes of the scattered pilots (Asp) is set to 1.1, 1.37, 1.66, 1.99, 2.37, and 2.82.

In the FSS/FES and MIMO mode, if Dx is set to 8, 16, 32, 64, or 128, the average value of the optimum amplitudes of the scattered pilots (Asp) is set to 1.1, 1.37, 1.66, 1.99, or 2.37.

As described above, the average value of the optimum amplitudes of the scattered pilots (Asp) has the same value in FSS and FES.

FIG. 46 shows that an average value of the scattered pilot amplitudes optimized for the same pilot density is denoted by a fraction according to an embodiment of the present invention.

The values shown in FIG. 46 are obtained by approximating the average value of the scattered pilot amplitude values initiated by a floating value of FIG. 45 in terms of a receiver, and the approximation result is denoted by a fraction. Therefore, some configurations and contents of FIG. 46 are identical to those of FIGS. 44 and 45, and as such a detailed description thereof will herein be omitted for convenience of description and better understanding of the present invention.

Referring to FIG. 46(A), in the normal data symbol and SISO mode, if the pilot density (Dx×Dy) is set to 8, 16, 32, 64, 128, or 256, the average value of the optimum amplitudes of the scattered pilots (Asp) is set to 5/4, 6/4, 9/5, 13/6, 18/7, or 18/6.

In the normal data symbol and MIMO mode, if the pilot density (Dx Dy) is set to 8, 16, 32, 64, 128, or 256, the average value of the optimum amplitudes of the scattered pilots (Asp) is set to 5/4, 6/4, 9/5, 13/6, or 18/7.

Referring to FIG. 46(B), in the FSS/FES and SISO mode, if Dx is set to 4, 8, 16, 32, 64, or 128, the average value of the optimum amplitudes of the scattered pilots (Asp) is set to 10/9, 4/3, 5/3, 6/3, 7/3, or 14/5.

In the FSS/FES and MIMO mode, if Dx is set to 8, 16, 32, 64, or 128, the average value of the optimum amplitudes of the scattered pilots (Asp) is set to 10/9, 4/3, 5/3, 6/3, or 7/3.

A method for inserting a reserved carrier to be appropriate for the next generation broadcast system in association with tone reservation used for PAPR reduction according to the embodiment of the present invention will hereinafter be described. In addition, the reserved tone and the reserved carrier are conceptually identical to each other, so that the term "reserved tone" may be used interchangeably with the term "reserved carrier".

Figure 47:
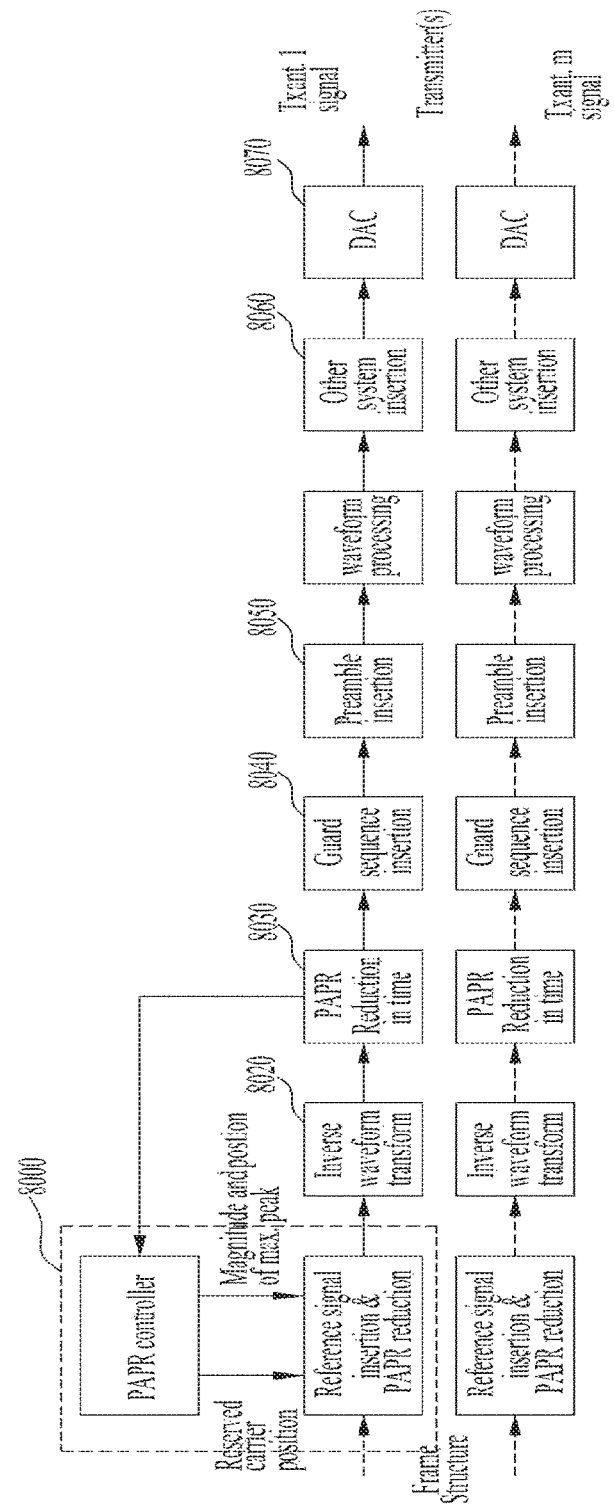
FIG. 47 illustrates an OFDM generation block according to an embodiment of the present invention.

FIG. 47 illustrates an OFDM generation block according to an embodiment of the present invention.

Referring to FIG. 47, the same parts as those of FIG. 8 may have the same meaning, and as such a detailed description thereof will herein be omitted for convenience of description.

The OFDM system serving as a multi-carrier system is used to transmit data using a plurality of carriers so as to obviate frequency selective characteristics of channels generated during broadband single-carrier transmission.

The OFDM system divides a radio frequency (RF) channel into a plurality of narrowband channels, and transmits data using the narrowband channels, so that the OFDM system has robustness against the frequency selective fading environment, perform the guard interval insertion. As a result, interference between contiguous signals can be easily removed. In addition, data can be overlapped with each other using orthogonality of subcarriers, and data transmission can then be achieved, resulting in implementation of the high frequency usage efficiency.

However, the OFDM system uses multiple carriers, so that respective carriers are added with the same phase (in-phase), resulting in the occurrence of a high PAPR (Peak to Average Power Ratio). If high PAPR passes through a non-linear amplifier, signal attenuation occurs, resulting in signal distortion.

Therefore, the embodiment of the present invention can provide the tone reservation scheme for minimizing the PAPR.

In addition, the embodiment of the present invention is designed to allocate the reserved carrier to minimize PAPR of the transmit (Tx) signal for use in a time domain. The embodiment can also provide the location of reserved carrier (or reserved tone) simultaneously while avoiding the location of a pilot signal used as a reference signal having been inserted for channel estimation and synchronization offset.

The tone reservation scheme is used to reduce PAPR of the entire OFDM symbol using a small number of dummy subcarriers, such that the tone reservation scheme can reduce the PAPR through reserved carrier insertion. The tone reservation scheme is used to transmit a specific dummy data sequence used only for PAPR reduction.

The dummy data sequence is referred to as a reserved carrier (or reserved tone) for use in the tone reservation scheme, and a PAPR attenuation signal can be generated in a time domain through transmission of an appropriate value.

That is, the entire data is classified into data to be transmitted and a reserved carrier for PAPR reduction, and the transmitter and the receiver must recognize the location of a reserved carrier needed for PAPR reduction. In this case, the reserved carrier is not used to transmit data, and a symbol having an arbitrary value may be allocated for PAPR reduction.

FIG. 47 illustrates an OFDM generation block 1030 according to an embodiment of the present invention. In accordance with the embodiment of the present invention, the number of input signal paths may be set to 'm' according to the SISO or MIXO system configured to use m Tx antennas.

Referring to FIG. 47, the OFDM generation block 1030 may include the pilot and reserved tone insertion block 8000 and the PAPR Reduction block 8030. The pilot and reserved tone insertion block 8000 may include a PAPR controller and a Reference signal insertion & PAPR reduction block.

The method for allowing the OFDM generation block 130 to reduce PAPR according to an embodiment of the present invention will hereinafter be described in detail.

The tone reservation scheme performs feedback to search for the reserved carrier having the lowest PAPR, selects the reserved carrier, calculates PAPR, and re-performs feedback.

The OFDM generation block 1030 allocates the value of 1 to the location of a predetermined reserved carrier, and acquires a kernel for initial peak reduction through IFFT (Inverse Fast Fourier Transform) processing. The OFDM generation block 1030 may normalize the kernel in consideration of the number of reserved carriers allocated in this process.

Thereafter, the OFDM generation block 1030 performs cyclic shifting of the kernel to the location of the corresponding sample in association with a time domain sample higher than a predetermined power, and multiplies an appropriate value to be reduced by the kernel, so that the OFDM generation block 1030 can obtain the peak reduction signal. This process may also be referred to as peak reduction.

Thereafter, the OFDM generation block 1030 may repeatedly perform the peak reduction for the time domain sample, so that the calculated peak reduction signals can be accumulated.

If the sample higher than a predetermined power is removed through the peak reduction process or if a current number of times reaches the number of iterations established for repeated execution, the peak reduction process is terminated, so that the data signal may be added to the accumulated peak reduction signal.

In this case, the OFDM generation block 1030 according to the embodiment may provide the optimum reserved carrier (or reserved tone) to minimize the PAPR of Tx signals for use in the time domain.

Figure 48:
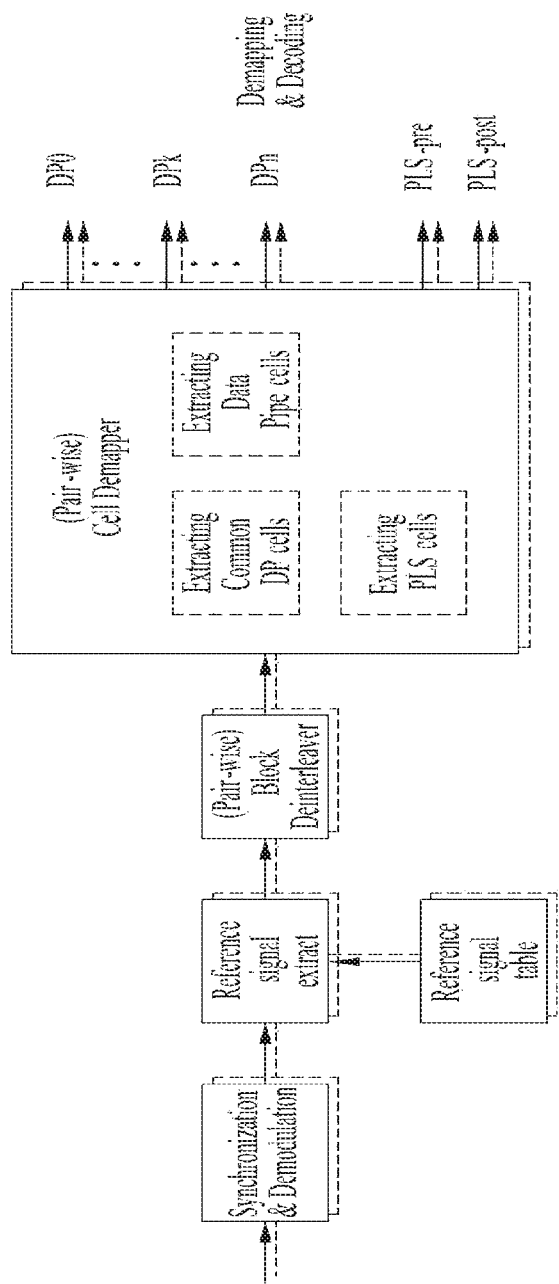
FIG. 48 is a block diagram illustrating a frame parsing module according to an embodiment of the present invention.

FIG. 48 is a block diagram illustrating a frame parsing module according to an embodiment of the present invention.

Referring to FIG. 48, the frame parsing module 9010 may include a reference signal extract block.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The frame parsing module 9010 according to the embodiment may extract a pilot signal acting as reference signal information and a data carrier other than the predetermined reserved carrier on the basis of the reference signal table.

Figure 49:
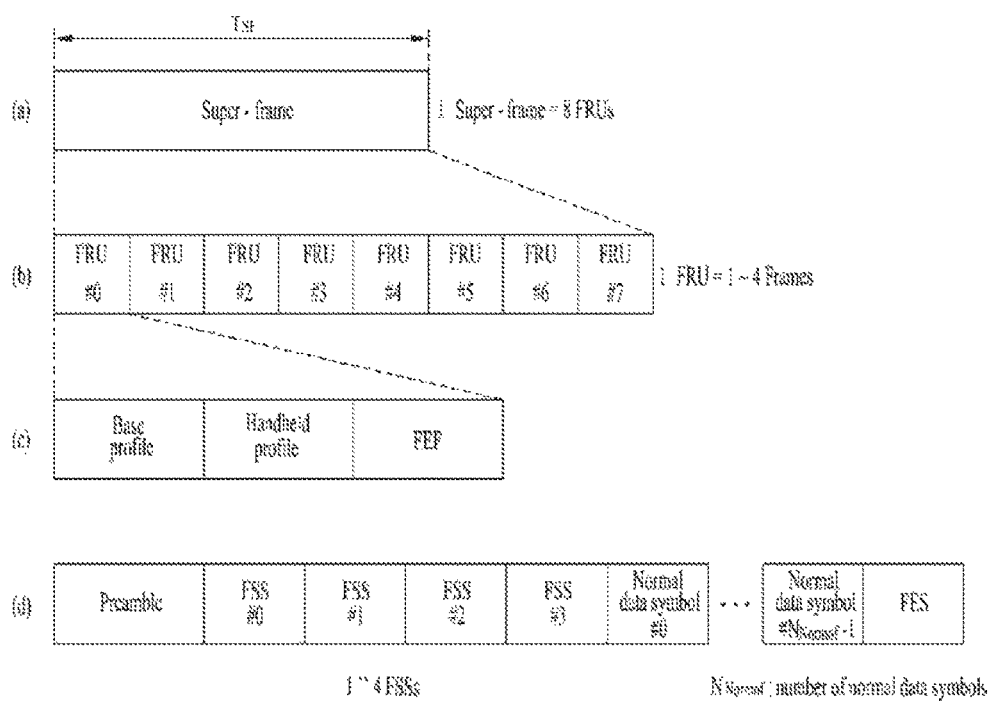
FIG. 49 illustrates a frame structure according to an embodiment of the present invention.

FIG. 49 illustrates a frame structure according to an embodiment of the present invention.

FIG. 49 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

Referring to FIG. 49, the same parts as those of FIG. 10 may have the same meaning, and as such a detailed description thereof will herein be omitted for convenience of description.

The broadcast signal transmission apparatus according to the embodiment may provide the optimum reserved carrier (or reserved tone) for PAPR minimization.

The broadcast signal transmission apparatus according to the embodiment may insert the reserved carrier into FSS, FES, and normal data symbol so as to implement minimum PAPR.

In addition, the broadcast signal transmission apparatus according to the embodiment can insert many more pilots acting as reference signals into FSS and FES as compared to the normal data symbol, so that the reserved carrier can be inserted into each of the normal data symbol, FSS and FES at a separate optimum location.

Figure 50:
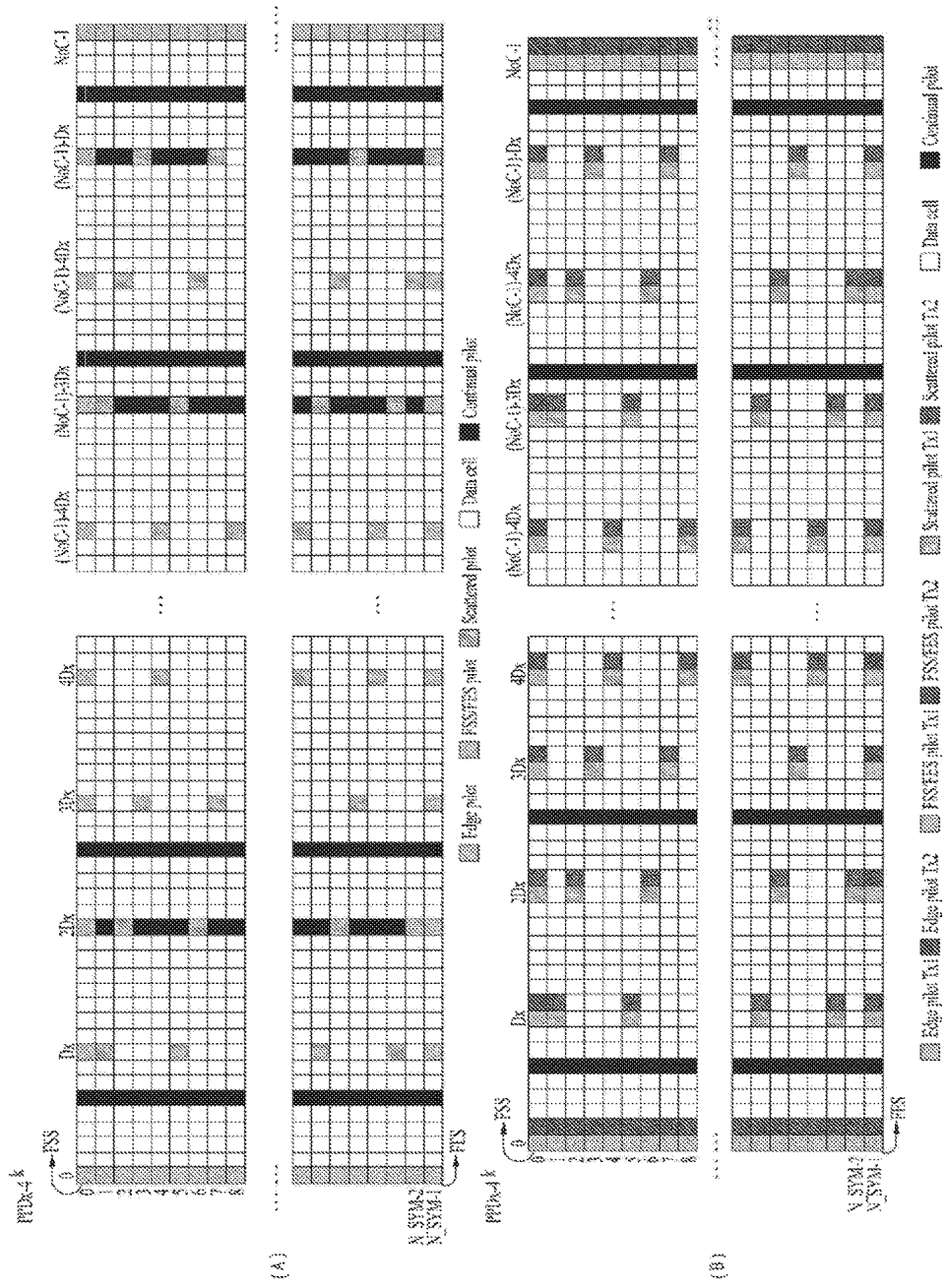
FIG. 50 illustrates a pilot structure contained in a frame according to an embodiment of the present invention.

FIG. 50 illustrates a pilot structure contained in a frame according to an embodiment of the present invention.

Referring to FIG. 50, (A) denotes the pilot structure of the SISO mode, and (B) denotes the pilot structure of the MIMO mode. In case of MIMO, pilots are arranged to facilitate MIMO channel estimation according to the transmission (Tx) mode, as compared to SISO.

From among the parts of FIG. 50, the same parts as those of FIG. 42 may have the same meaning, and as such a detailed description thereof will herein be omitted for convenience of description.

The broadcast signal transmission apparatus according to the embodiment can optimize the location of reserved carrier so as to implement minimum PAPR, and can insert the reserved carrier into a specific location from which the location of a pilot acting as a predetermined reference signal is excluded.

For channel estimation and synchronization offset estimation, the broadcast signal transmission apparatus according to the embodiment can insert many more pilots acting as reference signals into FSS and FES as compared to the normal data symbol. In addition, the broadcast signal transmission apparatus according to the embodiment can arrange pilots to facilitate MIMO channel estimation in case of the MIMO mode rather than the SISO mode.

Therefore, the broadcast signal transmission apparatus according to the embodiment can decide the location of a reserved carrier optimized for FSS, FES, and normal data symbol according to respective Tx modes (SISO, MIXO). However, the scope or spirit of the present invention is not limited only to the following embodiments, and the present invention can also be applied to a similar modified structure.

The broadcast signal transmission apparatus according to the embodiment can support a variety of pilot patterns to support various network situations, and can provide one reserved carrier index for each FFT mode in association with various pilot patterns in consideration of complexity of the broadcast signal reception apparatus.

Location Evasion of Scattered Pilot

The broadcast signal transmission apparatus according to the embodiment can insert the reserved carrier at the position from which the location of the scattered pilot is excluded.

If the symbol type is FSS and FES, the broadcast signal transmission apparatus according to the embodiment may determine the position of a reserved carrier to be (n*Dx) in case of SISO, and may determine the position of a reserved carrier to be (n*Dx) and (n+1)*Dx in case of MIMO. In this case, n is an integer, and each of (n*Dx) and (n+1)*Dx is less than NoC (Number of Carrier).

If the symbol type is a normal data symbol, and if an offset of the scattered pilot structure is set to zero "0" (e.g., the structure overlapped with the edge pilot), the broadcast signal transmission apparatus according to the embodiment may determine the location of a reserved carrier to be (n*Dx*Dy) in case of SISO, and may determine the location of a reserved carrier to be ((n+1)*Dx*Dy) in case of MIMO. In this case, n is an integer, and each of (n*Dx*Dy) and (n+1)*Dx*Dy is less than NoC (Number of Carrier).

The broadcast signal transmission apparatus according to the embodiment may decide the reserved carrier applied to minimum Dx and Dy values according to individual FFT modes.

Location Evasion of Continual Pilot

The broadcast signal transmission apparatus according to the embodiment can insert the reserved carrier at the location from which the position of a continual pilot is excluded.

A continual pilot is a pilot successively located at all symbols. Therefore, in order to guarantee continuity of the synchronization offset estimation process, the broadcast signal transmission apparatus according to the embodiment can insert the reserved carrier at the location from which the continual pilot location is excluded, in association with all of FSS, FES, and normal mode.

Evasion of Edge Pilot

The broadcast signal transmission apparatus according to the embodiment can insert the reserved carrier at the location from which the edge pilot position is excluded.

Edge pilots may be successively arranged at both edges of the pilot pattern.

As described above, the broadcast signal transmission apparatus according to the embodiment may arrange the reserved carrier simultaneously while avoiding the locations of scattered pilot, continual pilot, and edge pilot.

Specifically, according to the broadcast signal transmission apparatus, in case of the normal data symbol, the reserved carrier position can be determined at a specific position at which the normal data symbol is cyclically shifted according to the symbol index, and the reserved carrier position can be determined in a manner that the finally-shifted reserved carrier position does not exceed the NoC (Number of Carrier).

FIG. 51 shows the locations of reserved carriers that are common to SISO and MIMO while simultaneously being applied to a normal data symbol according to an embodiment of the present invention.

Some of the OFDM carriers can be reserved for the purpose of PAPR reduction. While the position of the reserved carriers is specified in this specification, the cell values of the reserved carriers are determined by a chosen algorithm, which is constrained so that the amplitude of the cell is equal to or smaller than that of the pilot carriers. This guarantees that the data cell power is not decreased by applying the PAPR reduction scheme.

The position of the reserved carriers for PAPR reduction is presented in FIG. 51. When PAPR_FLAG in the preamble and PLS1 field is set to '1', the calculated cell values according to the chosen algorithm modulate the reserved carriers. When PAPR_FLAG is set to '0', those carriers are no longer reserved for PAPR reduction.

Free choice of a specific PAPR reduction scheme allows future extension or improvement of the PAPR reduction algorithm without revision of the specification. There will be no effect in SFN configuration or receiver operation by this free choice because the receiver will simply ignore the reserved carriers that do not carry any useful information.

The signal for peak reduction, p(t), is generated and added to the output signal s(t) from the IFFT block to form the output u(t) of the PAPR reduction block.

$$u(t)=s(t)+p(t),$$

where p(t) is the output of IFFT of the reserved carriers modulated by the values for PAPR reduction.

When PAPR_FLAG is set to '1', the reserved carrier indices in the FSS(s), FES, and normal data symbols are given as follows:

In the normal data symbols, the reserved carrier indices according to the embodiment are determined by the set of carriers corresponding to carrier indices defined in FIG. 51 or their shifted set of carriers depending on data symbol index 1 of a frame, Dx and Dy. In accordance with the embodiment of the present invention, the reserved carrier indices in the normal data symbols are given by the following Math FIG. 15.

$$TR_{normal}(n)+D_x \times (l \bmod D_y), N_{FSS} \leq l < N_{sym}-1,$$
$$0 \leq n < N_{TR}$$ [Math FIG. 15]

where $TR_{normal}(n)$ is the set of reserved carriers defined in FIG. 51, NTR is the number of reserved carriers, 1 is data symbol index, NFSS is the number of FSS symbols, NSYM is the number of symbols.

In the FSS(s) and FES, the reserved carrier indices according to the embodiment are determined by the set of carriers corresponding to carrier indices TRFSS,FES(n) defined in FIG. 57. In accordance with the embodiment, the reserved carrier indices keep the same positions across the FSS(s) and FES.

A method for allowing the broadcast signal transmission apparatus to decide the reserved carrier location according to the embodiment will hereinafter be described in detail.

The broadcast signal transmission apparatus according to the embodiment may decide the reserved carrier location while simultaneously excluding the pilot position as shown in FIG. 50.

In addition, the broadcast signal transmission apparatus according to the embodiment may provide different carrier indices for 8K, 16K and 32K FFT sizes in consideration of Tx parameters.

In addition, the broadcast signal transmission apparatus according to the embodiment may provide the reserved carrier index of a single pattern, irrespective of the scattered pilot pattern for each FFT size.

In addition, the broadcast signal transmission apparatus according to the embodiment may provide different reserved carrier indices to FSS, FES, and normal data symbol so as to optimize PAPR throughput.

In SISO and MIMO, the broadcast signal transmission apparatus according to the embodiment may provide different reserved carrier indices to optimize PAPR throughput. In addition, the broadcast signal transmission apparatus according to the embodiment can also provide the reserved carrier index having been applied to MIMO to the SISO mode so as to reduce complexity of the broadcast signal reception apparatus.

Referring to FIG. 51, the FFT size is shown in the left side of the table. For example, the FFT size may include 8K, 16K, and 32K. The positions of reserved carriers related to the normal data symbol are shown in the right side of the table. The reserved carrier index according to the embodiment shown in FIG. 51 can be commonly applied to SISO and MIMO, and may have different values according to the FFT size.

The reserved carrier index according to the embodiment may have 72 reserved carriers at 8K, may have 144 reserved carriers at 16K, and may have 288 reserved carriers at 32K.

FIG. 52 shows the locations of reserved carriers that are common to SISO and MIMO while simultaneously being applied to FSS and FES according to an embodiment of the present invention.

Some configurations and contents of FIG. 52 are identical to those of FIG. 51, and as such a detailed description thereof will herein be omitted for convenience of description and better understanding of the present invention.

Referring to FIG. 52, the FFT mode is shown in the left side of the table. For example, the FFT mode may include 8K, 16K, and 32K. The locations of reserved carriers for FSS and FES are shown in the right side of the table. The reserved carrier index according to the embodiment of FIG. 52 can be commonly applied to SISO and MIMO, and may have different values according to FFT sizes.

The broadcast signal transmission apparatus according to the embodiment may optimize the efficiency by applying 67 reserved carriers to 8K as shown in FIG. 52.

FIG. 53 shows the locations of reserved carriers that are optimized for SISO while simultaneously being applied to a normal data symbol according to an embodiment of the present invention.

Some configurations and contents of FIG. 53 are identical to those of FIG. 51, and as such a detailed description thereof will herein be omitted for convenience of description and better understanding of the present invention.

The reserved carrier index according to the embodiment of FIG. 53 is applied to the normal data symbol and is optimized for SISO, so that the reserved carrier index may have different values according to FFT sizes.

FIG. 54 shows the locations of reserved carriers that are optimized for SISO while simultaneously being applied to FSS and FES according to an embodiment of the present invention.

Some configurations and contents of FIG. 54 are identical to those of FIG. 51, and as such a detailed description thereof will herein be omitted for convenience of description and better understanding of the present invention.

The reserved carrier index according to the embodiment of FIG. 54 is applied to FSS and FES and is optimized for SISo, and may also have different values according to the FFT size.

The broadcast signal transmission apparatus according to the embodiment can optimize the efficiency by applying 67 reserved carriers to 8K as shown in FIG. 54.

FIG. 55 shows the locations of reserved carriers that are optimized for MIMO while simultaneously being applied to a normal data symbol according to an embodiment of the present invention.

Some configurations and contents of FIG. 55 are identical to those of FIG. 51, and as such a detailed description thereof will herein be omitted for convenience of description and better understanding of the present invention.

The reserved carrier index according to the embodiment of FIG. 55 is applied to the normal data symbol, is optimized for MIMO, and may have different values according to the FFT sizes.

Although the case in which the FFT size is set to 3K in case of MIMO is omitted from FIG. 55 for convenience of description and better understanding of the present invention, the above-mentioned case can be derived to satisfy the above-mentioned requirements. For example, the reserved carrier index for use in the case in which the FFT size is set to 8K in MIMO may have the same value as the reserved carrier index in the case in which the FFT size is set to 8K of FIG. 51.

As described above, the broadcast signal transmission apparatus according to the embodiment can also provide the reserved carrier index having been applied to MIMO to the SISO mode so as to reduce complexity of the broadcast signal reception apparatus.

FIG. 56 shows the locations of reserved carriers that are optimized for MIMO while simultaneously being applied to FSS and FES according to an embodiment of the present invention.

Some configurations and contents shown in FIG. 56 are identical to those of FIG. 51, and as such a detailed description thereof will herein be omitted for convenience of description.

The reserved carrier index according to the embodiment of FIG. 56 is applied to FSS and FES, is optimized for MIMO, and may have different values according to the FFT sizes.

Although the case in which the FFT size is set to 8K in case of MIMO is omitted from FIG. 56 for convenience of description and better understanding of the present invention, the above-mentioned case can be derived to satisfy the above-mentioned requirements. For example, the reserved carrier index for use in the case in which the FFT size is set to 8K in MIMO may have the same value as the reserved carrier index in the case in which the FFT size is set to 8K of FIG. 52.

As described above, the broadcast signal transmission apparatus according to the embodiment can also provide the reserved carrier index having been applied to MIMO to the SISO mode so as to reduce complexity of the broadcast signal reception apparatus.

FIG. 57 shows the locations of reserved carriers that are optimized for SISO and MIMO while simultaneously being applied to FSS and FES according to another embodiment of the present invention.

Some configurations and contents shown in FIG. 57 are identical to those of FIG. 51, and as such a detailed description thereof will herein be omitted for convenience of description.

The reserved carrier index according to the embodiment of FIG. 56 is commonly applied to SISO and MIMO, is optimized for MIMO, and may have different values according to the FFT sizes.

The broadcast signal transmission apparatus according to the embodiment can improve throughput for minimizing PAPR by applying 72 reserved carriers to 8K as shown in FIG. 57.

FIG. 58 shows the locations of reserved carriers that are optimized for SISO while simultaneously being applied to FSS and FES according to an embodiment of the present invention.

Some configurations and contents shown in FIG. 58 are identical to those of FIG. 51, and as such a detailed description thereof will herein be omitted for convenience of description.

The reserved carrier index according to the embodiment of FIG. 58 is applied to FSS and FES, is optimized for SISO, and may have different values according to the FFT sizes.

The broadcast signal transmission apparatus according to the embodiment can improve throughput for minimizing PAPR by applying 72 reserved carriers to 8K as shown in FIG. 58.

Figure 59:
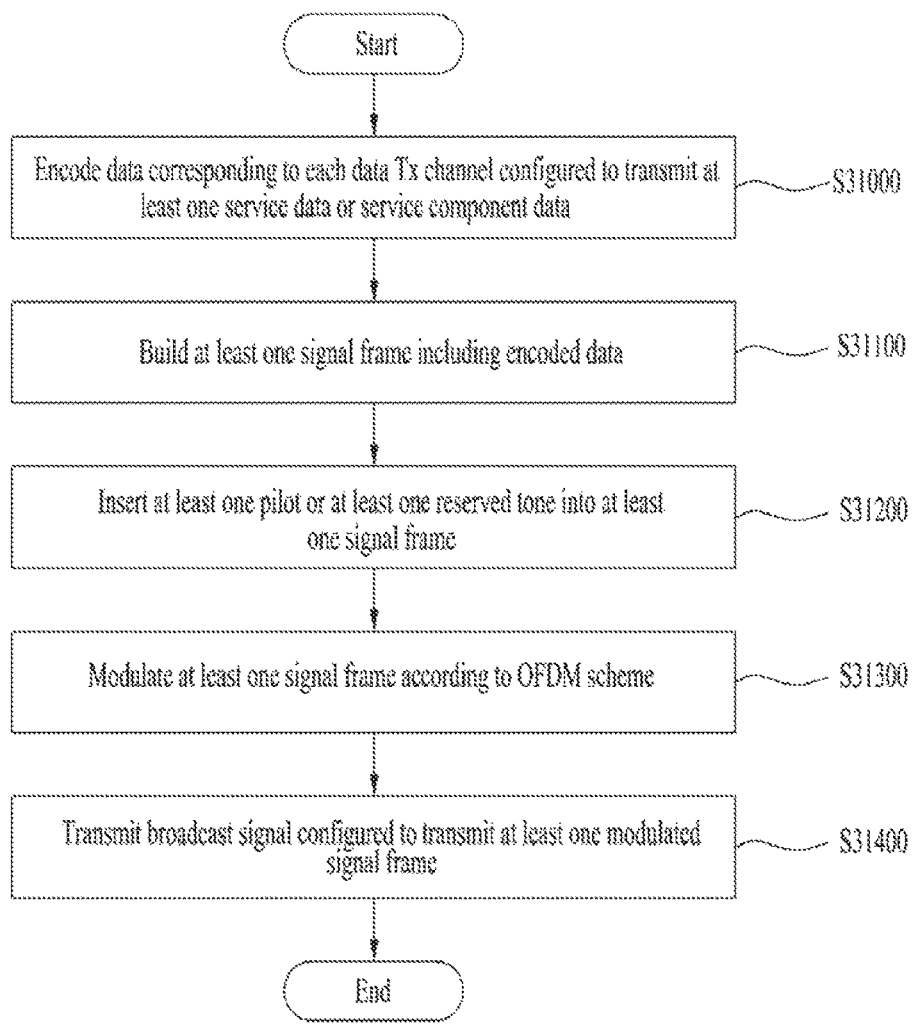
FIG. 59 is a flowchart illustrating a method for transmitting a broadcast signal according to an embodiment of the present invention.

FIG. 59 is a flowchart illustrating a method for transmitting a broadcast signal according to an embodiment of the present invention.

Referring to FIG. 59, the broadcast signal transmission apparatus encodes data corresponding to each data transmission channel through which at least one service data or at least one service component data is transmitted in step S31000. The encoder 1010 may perform the above encoding, and may be denoted by a BICM block 1010.

At least one service data may correspond to any one of broadcast service data for the fixed receiver or another broadcast service data for the mobile receiver. Each service data can be discriminated and transmitted in units of a frame. A detailed encoding method thereof has been disclosed as described above.

The broadcast signal transmission apparatus according to the embodiment can map the encoded data into constellation. Thereafter, the broadcast signal transmission apparatus according to the embodiment may perform time interleaving of the mapped data. As described above, Data Pipe (DP) data can be processed per DP path, and a detailed interleaving method has been disclosed as described above.

The broadcast signal transmission apparatus according to the embodiment may build at least one signal frame including time-interleaving and encoded data in step S31100. The frame builder 1020 according to the embodiment may build the above-mentioned signal frame, and the frame builder 1020 may also be denoted by a frame building block 1020. As described above, data processed through each path may be mapped to a data symbol region of the signal frame.

At least one signal frame according to the embodiment may include a plurality of OFDM symbols, and the OFDM symbol type may include a preamble, a Frame Signaling Symbol (FSS), a Normal data symbol, and a Frame Edge Symbol (FES).

The preamble according to the embodiment may include pilot mode information and PAPR_FLAG. In accordance with the embodiment, the pilot mode information indicates whether the pilot mode is a mobile mode or a fixed mode and the PAPR_FLAG indicates whether a PAPR reduction is used for the at least one signal frames.

Thereafter, the broadcast signal transmission apparatus according to the embodiment may insert at least one pilot into at least one signal frame in step S31200. The modulator 1030 may insert the above pilots, the modulator 1030 may be denoted by the OFDM Generation block 1030. In addition, the pilot and reserved tone insertion block 8000 may insert the above-mentioned pilots.

As can be seen from FIGS. 26 to 58, at least one pilot pattern may be differently allocated to the broadcast service for the fixed receiver or another broadcast service for the mobile receiver, and may be determined according to the FFT size and the guard interval size. A detailed description thereof has been disclosed as described above.

In addition, the broadcast signal transmission apparatus according to the embodiment may optimize the amplitudes of one or more pilots. In addition, the broadcast signal transmission apparatus according to the embodiment may insert at least one pilot into at least one signal frame on the basis of at least one pilot pattern.

The amplitudes of at least one pilot may be determined by at least one pilot pattern, the OFDM symbol type, and the Tx mode type. The Tx mode may be set to any one of SISO and MIMO. In addition, at least one pilot pattern may be determined by pilot mode information, and a detailed description thereof has been disclosed as described above.

The amplitudes of at least one pilot of FSS and FES may be decided by Dx, the amplitudes of at least one pilot of the normal data symbol may be decided by Dx and Dy, and a detailed description thereof has been disclosed as described above.

In addition, if PAPR_FLAG of the preamble is set to 1, the broadcast signal transmission apparatus according to the embodiment may insert at least one pilot into at least one signal frame on the basis of at least one pilot pattern, and may insert the reserved carriers (reserved tones) for PAPR reduction on the basis of the FFT size.

Thereafter, the broadcast signal transmission apparatus according to the embodiment may perform PAPR reduction on the basis of the tone reservation algorithm in a time domain. The modulator 1030 may perform the above PAPR reduction, and the modulator 1030 may be denoted by the OFDM Generation block 1030.

At least one reserved carrier (reserved tone) may have the same position for each FFT size (the at least one reserved carrier keeps the same position for each FFT size). For example, at least one reserved carrier (reserved tone) may have the same position for each FFT size in SISO and MIMO.

At least one reserved carrier according to the embodiment may have the same position in FSS and FES. In addition, at least one reserved carrier according to the embodiment may have different positions in the FSS and normal data symbol.

Thereafter, the broadcast signal transmission apparatus according to the embodiment may OFDM-modulate at least one signal frame using the OFDM scheme in step S31300. The modulator 1030 may perform OFDM. As described above, the OFDM parameters may be decided according to the FFT size, and a detailed description thereof has been disclosed as described above.

Thereafter, the broadcast signal transmission apparatus may transmit at least one broadcast signal including at least one modulated signal frame in step S31400. The transmitter according to the embodiment may transmit the above-mentioned broadcast signal.

Figure 60:
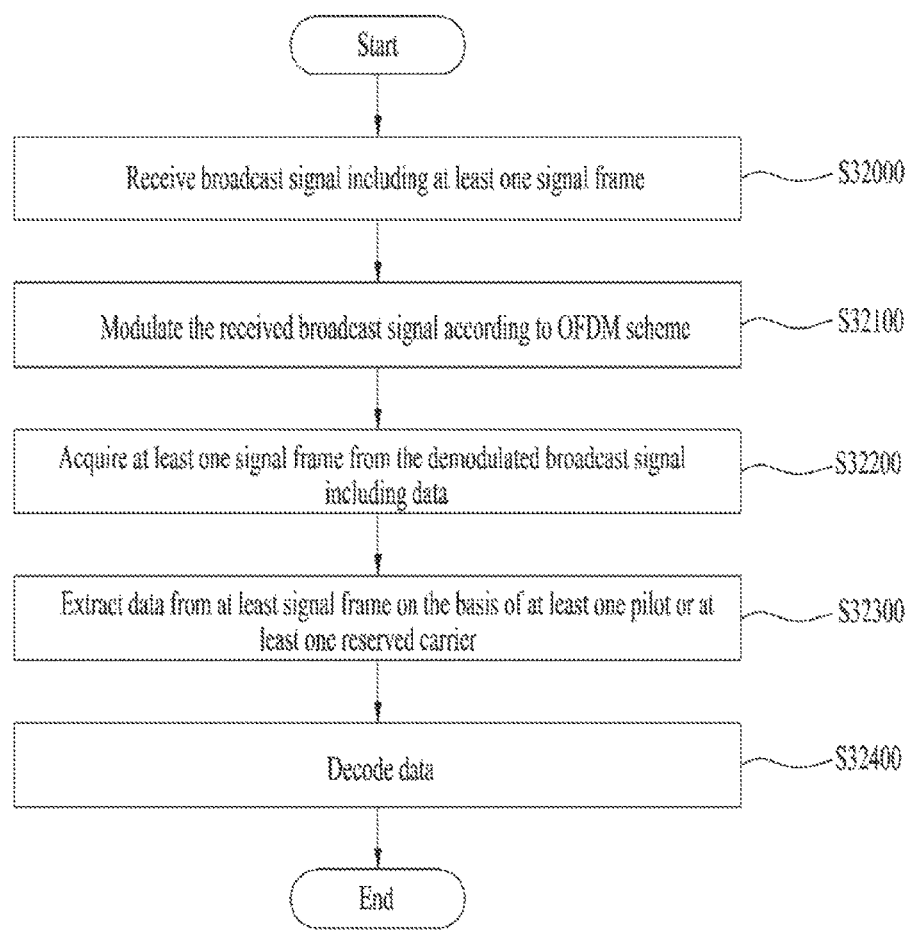
FIG. 60 is a flowchart illustrating a method for receiving a broadcast signal according to an embodiment of the present invention.

FIG. 60 is a flowchart illustrating a method for receiving a broadcast signal according to an embodiment of the present invention.

FIG. 60 is a reverse process of the broadcast signal transmission method of FIG. 59.

Referring to FIG. 60, the broadcast signal reception apparatus according to the embodiment may receive the broadcast signal including at least one signal frame using the receiver in step S32000.

Thereafter, the broadcast signal reception apparatus according to the embodiment may perform OFDM processing of the received broadcast signal using the OFDM parameters using the demodulator in S32100. The demodulator may be denoted by the synchronization & demodulation module 9000. The OFDM parameters may be determined according to the FFT size, and a detailed description thereof has been disclosed as described above.

The broadcast signal reception apparatus according to the embodiment may acquire at least one signal frame from the demodulated broadcast signal including data using the frame parser in step S32200. The frame parser may be denoted by the frame parsing module 9010.

Data according to the embodiment may correspond to an output signal corresponding to each of the data transmission (Tx) channels, and each data Tx channel may transmit at least one service data or at least one service component data.

At least one signal frame according to the embodiment may include a plurality of OFDM symbols, and the OFDM symbol type may include a preamble, a Frame Signaling Symbol (FSS), a Normal data symbol, and a Frame Edge Symbol (FES).

The preamble according to the embodiment may include pilot mode information and PAPR_FLAG. In accordance with the embodiment, the pilot mode information indicates whether the pilot mode is a mobile mode or a fixed mode and the PAPR_FLAG indicates whether a PAPR reduction is used for the at least one signal frames.

The broadcast signal reception apparatus according to the embodiment may detect at least one pilot or at least one reserved carrier contained in at least one signal frame using the frame parser.

As described above, at least one pilot or at least one reserved carrier may be inserted into at least one signal frame, may be differently allocated to the broadcast service for the fixed receiver and another broadcast service for the mobile receiver, and may be determined according to the FFT size and the guard interval size. A detailed description thereof has been disclosed as described above.

Thereafter, the broadcast signal reception apparatus according to the embodiment may extract data from at least one signal frame on the basis of at least one pilot using the frame parser in step S32300.

The modulated broadcast signal according to the embodiment may include at least one pilot based on at least one pilot pattern in at least one signal frame. The amplitudes of at least one pilot may be decided by at least one pilot pattern, the OFDM symbol type, and the Tx mode type. The Tx mode according to the embodiment may be set to any one of SISO and MIMO. In addition, at least one pilot pattern according to the embodiment may be determined by the pilot mode information.

The amplitudes of at least one pilot of FSS and FES may be determined by Dx, the amplitudes of at least one pilot of the normal data symbol may be decided by Dx and Dy, and a detailed description thereof has been disclosed as described above.

In addition, if PAPR_FLAG of the preamble is set to 1, the broadcast signal reception apparatus according to the embodiment may extract data from at least one signal frame on the basis of at least one pilot and at least one reserved carrier using the frame parser in step 32300.

The demodulated broadcast signals according to the embodiment may include at least one pilot based on at least one pilot pattern in at least one signal frame, and may include at least one reserved carrier for PAPR reduction on the basis of the FFT size.

At least one reserved carrier (reserved tone) may have the same position per FFT size (the at least one reserved carrier keeps the same position for each FFT size). For example, at least one reserved carrier (reserved tone) may have the same position per FFT size in SISO and MIMO.

At least one reserved carrier according to the embodiment may have the same position in FSS and FES. In addition, at least one reserved carrier according to the embodiment may have different positions in the FSS and normal data symbol.

Thereafter, the broadcast signal reception apparatus according to the embodiment may perform time interleaving of DP data contained in at least one signal frame using the decoder.

Subsequently, the broadcast signal reception apparatus according to the embodiment may perform demapping of the deinterleaved DP data, and may obtain a desired service or service component by decoding the demapped DP data in step S32400. The decoder may be denoted by the demapping & decoding module 9020. As described above, each DP data may be processed through the corresponding DP path, and a detailed description thereof has been disclosed as described above.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting broadcast signals by an apparatus for transmitting broadcast signals, the method comprising:
   encoding data corresponding to each of data pipes;
   encoding signaling data;
   building at least one signal frame including the encoded data and the encoded signaling data;
   modulating data of the at least one signal frame by an Orthogonal Frequency Division Multiplex (OFDM) scheme;
   performing Peak to Average Power Ratio (PAPR) reduction for the modulated data using a tone reservation algorithm based on a Fast Fourier Transform (FFT) size; and
   transmitting time domain broadcast signals carrying the modulated data of the at least one signal frame,
   wherein the at least one signal frame comprises signaling symbols and data symbols,
   wherein the signaling symbols and the data symbols include sets of reserved carriers for the PAPR reduction, respectively, and wherein a set of reserved carriers for the signaling symbols is different from a set of reserved carriers for the data symbols.

2. The method of claim 1, wherein the signaling symbols include the encoded signaling data, and
wherein the data symbols include the encoded data.

3. The method of claim 2, wherein the time domain broadcast signals include pilot pattern information, and
wherein the pilot pattern information indicates a pilot pattern of pilots.

4. The method of claim 3, farther comprising:
inserting at least one pilot based on the pilot pattern information in the at least one signal frame,
wherein amplitudes of the at least one pilot depend on the pilot pattern, a type of an OFDM symbol, or a type of a transmission mode, and
wherein the transmission mode is one of a Single Input Single Output (SISO) or a Multiple Input Single Output (MIMO).

5. An apparatus for transmitting broadcast signals, the apparatus comprising:
a first encoder to encode data corresponding to each of data pipes;
a second encoder to encode signaling data;
a frame builder to build at least one signal frame including the encoded data and the encoded signal data;
a modulator to modulate data of the at least one signal frame by an Orthogonal Frequency Division Multiplex (OFDM) scheme;
a Peak to Average Power Ratio (PAPR) controller to perform PAPR reduction for the modulated data using a tone reservation algorithm based on a Fast Fourier Transform (FFT) size; and
a transmitter to transmit time domain broadcast signals carrying the at least one signal frame including the modulated data,
wherein the at least one signal frame comprises signaling symbols and data symbols,
wherein the signaling symbols and the data symbols include sets of reserved carriers for the PAPR reduction, respectively, and
wherein a set of reserved carriers for the signaling symbols is different from a set of reserved carriers for the data symbols.

6. The apparatus of claim 5, wherein the signaling symbols include the encoded signaling data, and
wherein the data symbols include the encoded data.

7. The apparatus of claim 6, wherein the time domain broadcast signals include pilot pattern information, and
wherein the pilot pattern information indicates a pilot pattern of pilots.

8. The apparatus of claim 7, further comprising:
a pilot insertion unit to insert at least one pilot based on the pilot pattern information in the at least one signal frame,
wherein amplitudes of the at least one pilot depend on the pilot pattern, a type of an OFDM symbol, or a type of a transmission mode, and
wherein the transmission mode is one of a Single Input Single Output (SISO) or a Multiple Input Single Output (MIMO).

9. A method for receiving broadcast signals by an apparatus for receiving broadcast signals, the method comprising:
receiving broadcast signals which include signaling symbols and data symbols on which Peak to Average Power Ratio (PAPR) reduction is performed according to a tone reservation algorithm based on a Fast Fourier Transform (FFT) size;
demodulating the signaling symbols and the data symbols by an Orthogonal Frequency Division Multiplex (OFDM) scheme;
decoding signaling data in the signaling symbols; and
decoding data corresponding to each data pipe in the data symbols,
wherein the signaling symbols and the data symbols include sets of reserve carriers for the PAPR reduction, respectively, and
wherein a set of reserved carries for the signaling symbols is different from a set of reserved carriers for the data symbols.

10. The method of claim 9, wherein the received broadcast signals further include pilot pattern information, and
wherein the pilot pattern information indicates a pilot pattern of pilots.

11. An apparatus for receiving broadcast signals, the apparatus comprising:
a tuner to receive broadcast signals which include signaling symbols and data symbols on which Peak to Average Power Ratio (PAPR) reduction is performed according to a tone reservation algorithm based on a Fast Fourier Transform (FFT) size;
a demodulator to demodulate the signaling symbols and the data symbols by an Orthogonal Frequency Division Multiplex (OFDM) scheme;
a first decoder to decode signaling data in the signaling symbols; and
a second decoder to decode data corresponding to each data pipe in the data symbols,
wherein the signaling symbols and the data symbols include sets of reserved carriers for the PAPR reduction, respectively, and
wherein a set of reserved carriers for the signaling symbols is different from a set of reserved carriers for the data symbols.

12. The apparatus of claim 11, wherein the broadcast signals received by the tuner further include pilot pattern information, and
wherein the pilot pattern information indicates a pilot pattern of pilots.

* * * * *